(12) United States Patent
Yildiz et al.

(10) Patent No.: US 6,674,738 B1
(45) Date of Patent: Jan. 6, 2004

(54) DECODING AND DETAILED ANALYSIS OF CAPTURED FRAMES IN AN IEEE 802.11 WIRELESS LAN

(75) Inventors: Kazim Orhan Yildiz, Wayne, NJ (US); Bing Chen, San Jose, CA (US)

(73) Assignee: Networks Associates Technology, Inc., Santa Clara, CA (US)

(*) Notice: Subject to any disclaimer, the term of this patent is extended or adjusted under 35 U.S.C. 154(b) by 172 days.

(21) Appl. No.: 09/954,389

(22) Filed: Sep. 17, 2001

(51) Int. Cl.[7] ............................................... H04L 12/28
(52) U.S. Cl. ........................................ 370/338; 370/474
(58) Field of Search .................................. 370/338, 252, 370/401, 242, 245, 465, 474

(56) References Cited

U.S. PATENT DOCUMENTS

| | | | | |
|---|---|---|---|---|
| 5,363,493 A | * | 11/1994 | Unverrich | 714/47 |
| 5,636,220 A | | 6/1997 | Vook et al. | 370/338 |
| 5,958,018 A | | 9/1999 | Eng et al. | 709/246 |
| 5,982,753 A | * | 11/1999 | Pendleton et al. | 370/252 |
| 5,991,287 A | | 11/1999 | Diepstraten et al. | 370/338 |
| 6,353,599 B1 | | 3/2002 | Bi et al. | 370/328 |
| 6,549,786 B2 | * | 4/2003 | Cheung et al. | 455/524 |
| 2002/0122413 A1 | | 9/2002 | Shoemake | 370/349 |

OTHER PUBLICATIONS

"WildPackets Release AiroPeek Wireless Packet Analyzer", http://www.wildpackets.com/corporate/news/00-12-22, Dec. 22, 2000, Walnut Creek, California.
"AiroPeek Wireless Protocol Analyzer," 4 pages: WildPackets, Inc.; Walnut Creek, CA 94596.
"AiroPeek for Windows Quick Tour," 26 pages; 1989-2001; WildPackets, Inc.; Walnut Creek, CA 94596.

* cited by examiner

Primary Examiner—Steven H. D Nguyen
Assistant Examiner—Duc Duong
(74) Attorney, Agent, or Firm—Silicon Valley IP Group, PC; Kevin J. Zilka; Christopher J. Hamaty

(57) ABSTRACT

A method and apparatus for detecting and diagnosing wireless network failures, provides for capturing, analyzing, and displaying detailed information relative to data packets and/or frames transmitted across a wireless network including an IEEE 802.11 LAN.

21 Claims, 73 Drawing Sheets

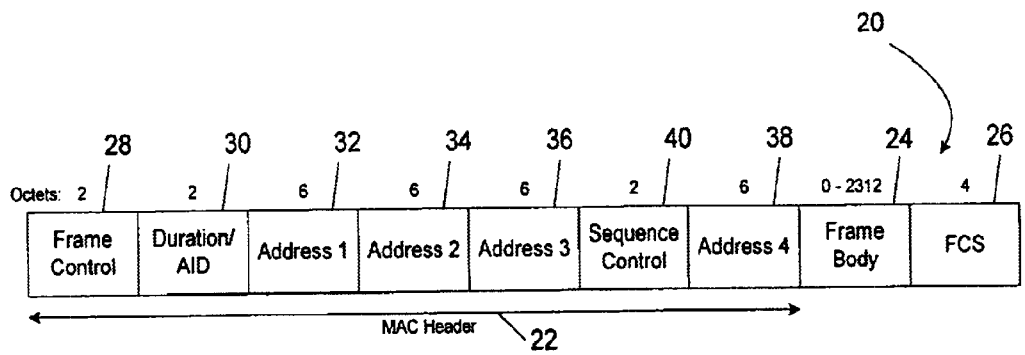
Figure 2A (MAC Frame Format)
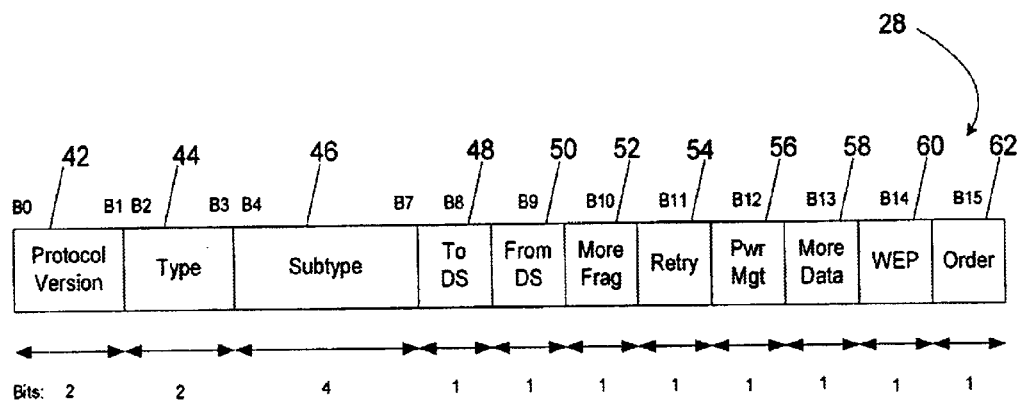
Figure 2B (Frame Control Field)
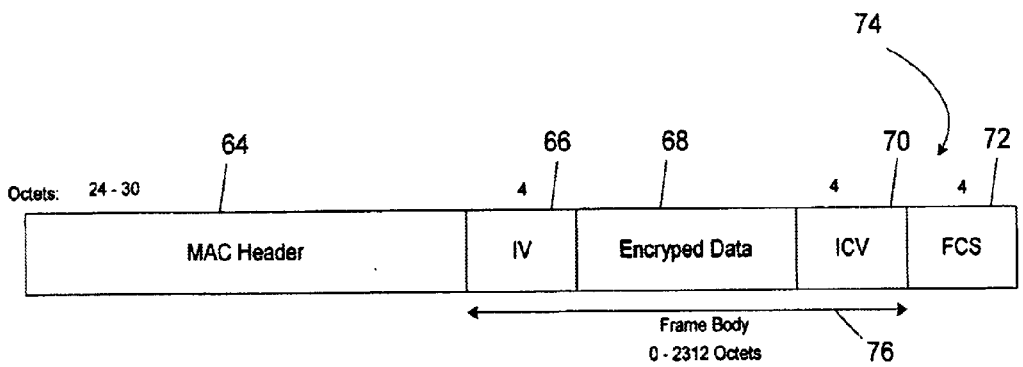
Figure 2C (WEP Encrypted Frame Format)

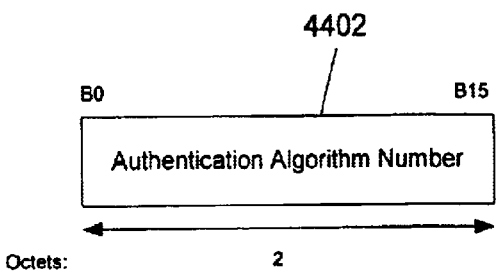
Figure 44A (Authentication Algorithm Number Fixed Field)
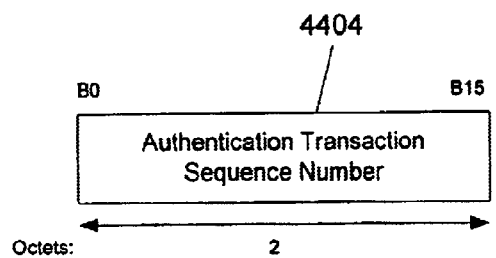
Figure 44B (Authentication Transaction Sequence Number Fixed Field)
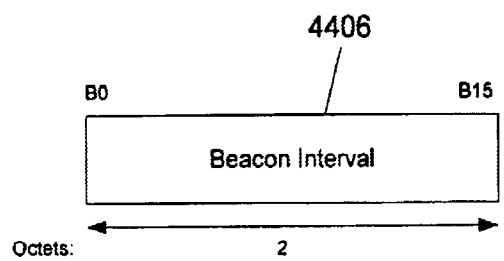
Figure 44C (Beacon Interval Fixed Field)
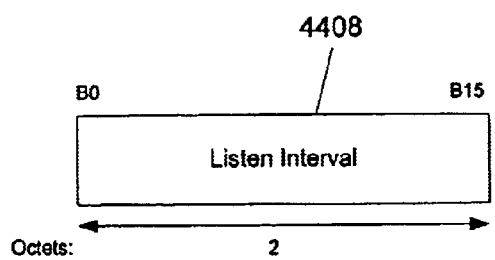
Figure 44D (Listen Interval Fixed Field)

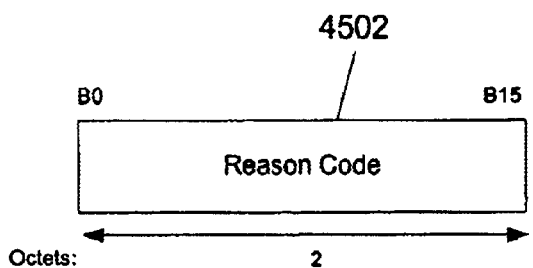
Figure 45A  (Reason Code Fixed Field)
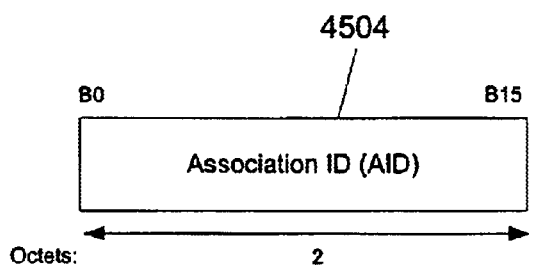
Figure 45B  (Association ID Fixed Field)
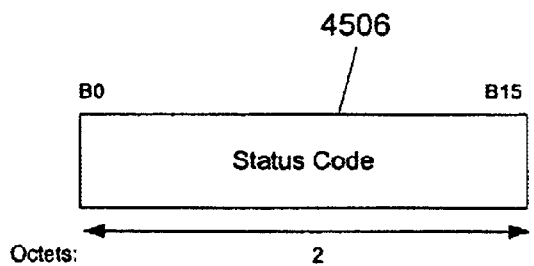
Figure 45C  (Status Code Fixed Field)
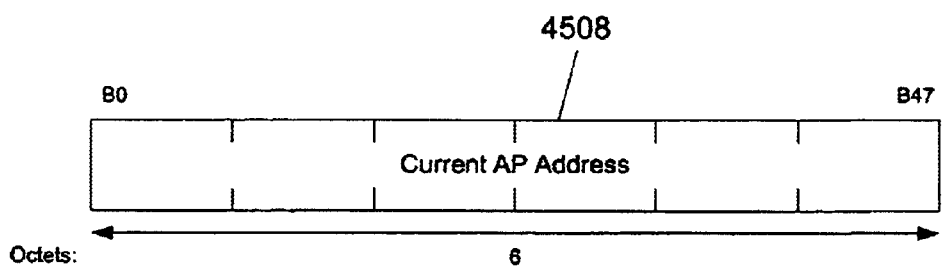
Figure 45D  (Current AP Address Fixed Field)

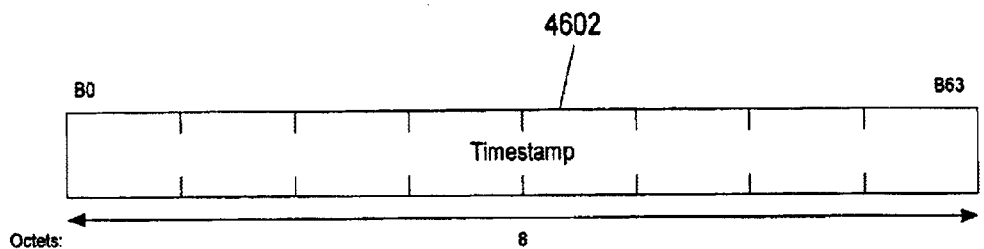
Figure 46A (Timestamp Fixed Field)
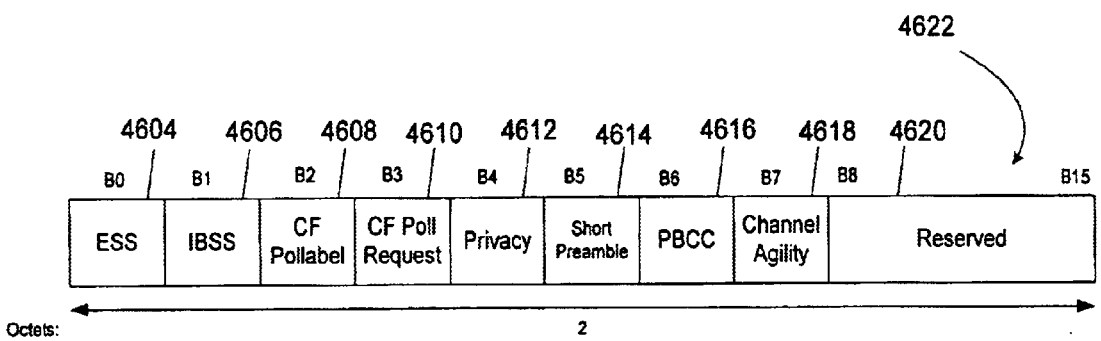
Figure 46B (Capability Information Fixed Field)
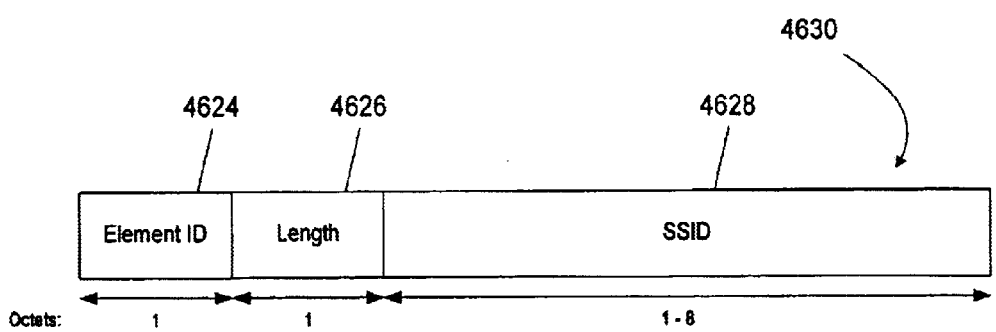
Figure 46C (SSID Information Element Format)

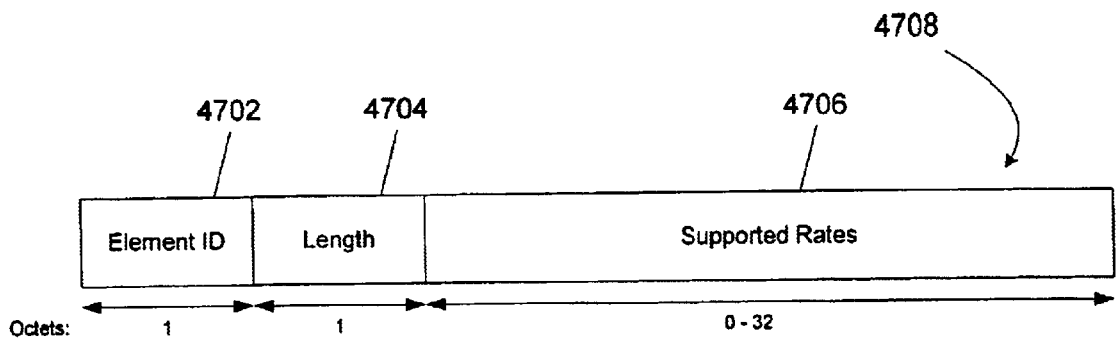
Figure 47A (Supported Rates Information Element Format)
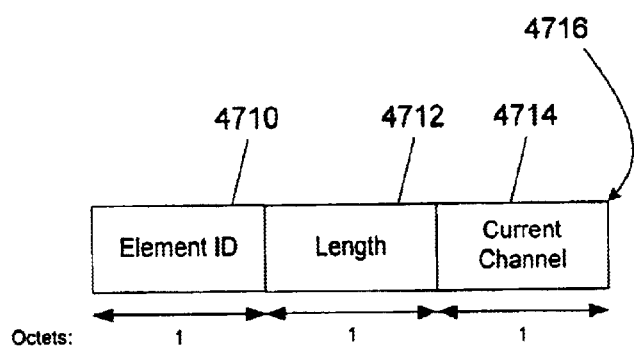
Figure 47B (DS Parameter Set Information Element Format)
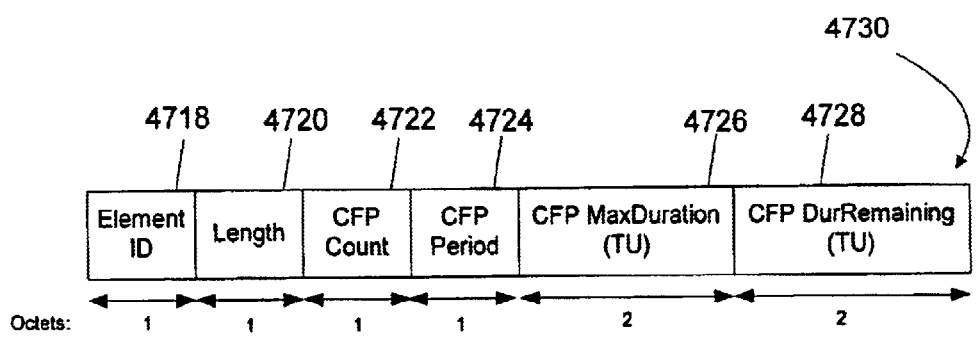
Figure 47C (CF Parameter Set Information Element Format)

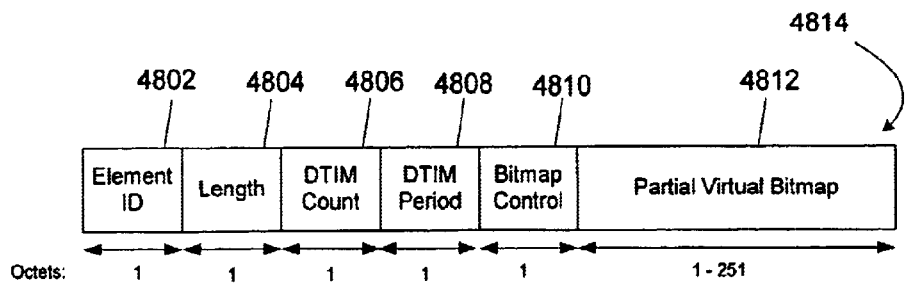
Figure 48A (TIM Information Element Format)
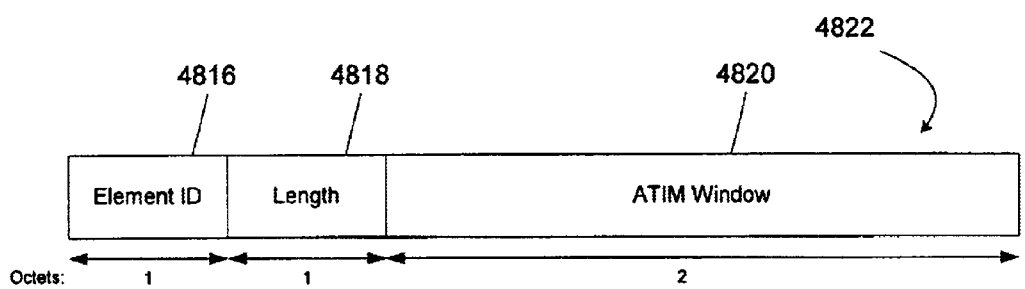
Figure 48B (IBSS Information Element Format)
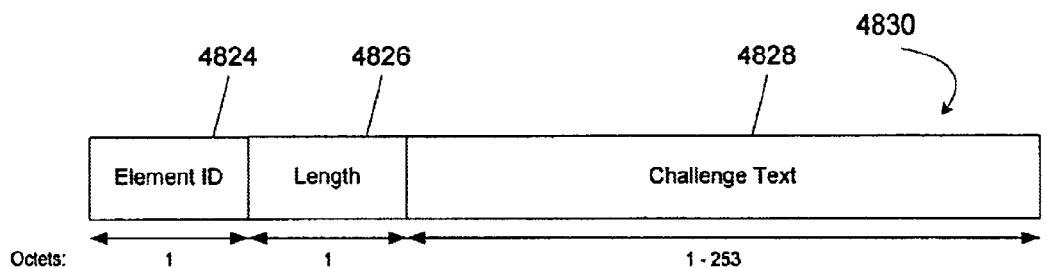
Figure 48C (Challenge Text Information Element Format)
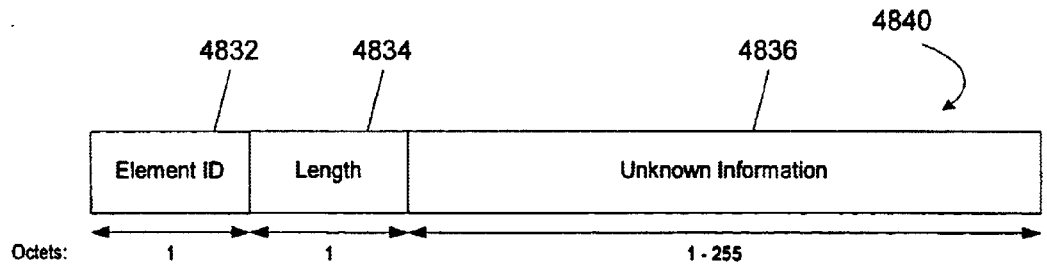
Figure 48D (Unknwon Information Element Format)

DECODING AND DETAILED ANALYSIS OF CAPTURED FRAMES IN AN IEEE 802.11 WIRELESS LAN

RELATED APPLICATIONS

This Application is related to Ser. No. 09/875,544, filed Jun. 6, 2001, for "Method and Apparatus For Filtering That Specifies The Types Of Frames To Be Captured And To Be Displayed For An IEEE 802.11 Wireless LAN;" and to Ser. No. 09/953,671, For: "Method and Apparatus For Capture, Analysis, and Display Of Packet Information Sent In An IEEE 802.11 Wireless Network," the teachings of all of which are incorporated herein to the extent that hey do not conflict herewith. The related Applications, and the present Application have the same Assignee.

FIELD OF INVENTION

The present invention relates generally to computerized communication networks for permitting computers to communicate with each other in an organized manner, and more particularly to a network troubleshooting tool for detecting, diagnosing, and repairing network failures, which tool includes a method for capturing, analyzing and displaying detailed information about data packets or frames transmitted across a wireless communications network such as IEEE802.11 local area network (LAN).

INVENTION BACKGROUND

Over the years, the wireless communication field enjoyed tremendous growth and popularity. Wireless technology now reaches or is capable of reaching nearly every place on the face of the earth. Hundreds of millions of people exchange information every day using pagers, cellular phones, and other wireless communication devices. With the success of wireless telephony and messaging services, wireless technology has also made significant inroads into the area of personal and business computing. Without the constraints imposed by wired networks, network users can move about almost without restriction and access a communication network from nearly any location, enabling wireless transmission of a variety of information types including data, video, voice and the like through the network.

Many different forms data communication protocols have been developed for enabling computers to communicate with one another in an orderly manner. For example, several proprietary versions of wireless local area networks (LANs) were implemented for testing and development. One wireless network standard that was recently adopted by the wireless community is the IEEE802.11 LAN, which led to a surge in use of wireless LANs. The IEEE802.11 standard establishes specifications on the parameters of both the medium access control and the physical layers for enabling wireless connectivity between fixed, portable, and moving stations within a local area. The term "station" refers hereinafter to an active or passive device part of a computer network that is capable of communicating at least one data packet or frame within the computer network. Such stations include, but not limited to, personal computers, servers, routers, printers, personal digital assistants, scanners and data collectors, palmtop computers, handheld PCs, pen-based computers, and the like.

According to the IEEE802.11 standard, the physical layer that handles transmission of data between stations, may utilize either direct sequence spread spectrum, frequency hopping spread spectrum or infrared (IR) pulse position modulation. The medium access control layer (MAC) comprises a set of protocols that is responsible for maintaining order in the use of the shared medium. In accordance with the MAC protocol, when a station has a data packet or frame to be transmitted, it first listens to ensure no other station is transmitting. If the channel is clear, it then transmits the packet. Otherwise, it chooses a random "backoff factor" that determines the amount of time the station must wait until it is allowed to transmit the packet. During periods in which the channel is clear, the transmitting station decrements its backoff counter, and when the channel is busy it does not decrement its backoff counter. When the backoff counter reaches zero, then the station transmits the packet. Since the probability that two stations will choose the same backoff factor is small, collisions between packets are thus minimized. In certain environments, before a packet is to be transmitted, the transmitting station initially sends a short request-to-send (RTS) packet containing information on the length of the time required to transmit the packet. If the receiving station hears the RTS, it responds with a short clear-to-send (CTS) packet. After this exchange, the transmitting station sends its packet. When the packet is successfully received, as determined by a cyclic redundancy check (CRC), the receiving station transmits an acknowledgement (ACK) packet.

Like wired network counterparts, wireless networks may, during operation, encounter network difficulties or anomalies including, but not limited to, data traffic congestion at peak usage, point failures, and the like. Such network difficulties negatively impact network responsiveness and throughput. As a result, network users experience productivity loss, network processing delays and other disruptions. A measure of a network's performance is often referred to as the quality of service. Quality of service is typically measured by responsiveness, including the amount of time expended waiting for images, text, and other data to be transferred, and by throughput of data across a communications channel. Other aspects may be application-specific, for example, quality of playback, jitter, quality of the data transmitted over the communication channel, and the like. In order to troubleshoot, maintain, and optimize the performance of communication networks, the data traffic flowing through the communication channel is monitored, tested and analyzed to provide rapid detection, diagnosis and correction of network failure and system breakdown, through use of tolls developed for this purpose. Network Associates, Inc., of Santa Clara, Calif., has been in the forefront of technology for many years in developing and providing software for managing and troubleshooting computer networks. The software is known as "Sniffer® Software".

In the course of testing and analyzing a network's quality of service, a network monitoring tool is typically used to access a passive station positioned at a point along a wired network connection or communication channel through which all of the data traffic of interest streams. By accessing the passive station with the network monitoring tool, all the data traffic passing through the corresponding network connection may be easily tracked and observed. Any irregularities in the data traffic flow may then be readily detected and analyzed to determine the source of a particular anomaly. This type of analysis is referred to as promiscuous mode analysis. Such wired network analysis techniques, however, would fail to monitor data traffic transmitted over wireless communication channels. In network systems where wireless and wired networks are connected, the monitoring tool accessing the passive station of the wired network portion would fail to perceive any of the data traffic transmitted along the wireless portion of the network.

For the foregoing reasons, there is a need to provide network analysis tools with a method for both extracting data packets or frames transmitted in a network such as between wireless stations, or between wireless stations and access points in a wireless LAN, and displaying the detail information contained in the data packets or frames for the user. The limitation of the processing power and available memory of the computers may make the real time detailed analysis of the frames virtually impossible. Therefore, the data packets or frames are captured in a buffer while the monitoring tool performs a real time analysis. The captured data packets or frames are later replayed for further detailed analysis and display.

SUMMARY OF INVENTION

The present invention is generally directed to a method for displaying and analyzing information contained in data packets or frames transmitted along a wireless communication channel. The method of the present invention provides the benefits of efficient network monitoring using a detailed offline analysis of the frames after they are captured in a buffer, thus greatly assisting the maintenance and troubleshooting of the network.

In particular, one aspect of the present invention is directed to a method of decoding information contained in an IEEE802.111 header of data packets or frames transmitted between stations in a wireless local area network, the method comprising steps of:

(a) establishing a direct wireless logical connection with the wireless communications network;

(b) receiving wirelessly, in real-time, data packets or frames transmitted in the wireless communication network;

(c) storing in a memory storage device, the data packets or frames captured; and (d) decoding and displaying the information contained in the IEEE802.11 header of the data packets or frames stored in the capture buffer.

In another aspect of the present invention, there is provided a network monitoring apparatus for capturing and selectively filtering data frames transmitted between stations in a wireless communications network. The apparatus of the present invention comprises:

a wireless network interface device working in a promiscuous mode within a wireless communications network, for capturing a plurality of frames transmitted through the network;

a user interface system comprising input and output devices for enabling a user to input and obtain information associated with plurality of captured frames;

a memory storage device for storing the plurality of captured frames from the wireless communications network; and a processor device electronically connected to a network interface device, the user interface system, and memory storage device, the processor device being programmed to execute a routine comprising the steps of:

(a) establishing a direct wireless logical connection with the wireless communications network via the network interface device;

(b) receiving wirelessly, in real-time, frames transmitted in the wireless communications network via direct wireless logical connection;

(c) receiving one or more frame attribute parameters inputted by a user through the user interface system;

(d) storing in the memory storage device, the frames received from the wireless network via direct wireless logical connection;

(e) decoding in detail and displaying to the user, the information contained in the frames stored in the memory storage device.

BRIEF DESCRIPTION OF THE DRAWINGS

Various embodiments of the present invention are described in detail with reference to the drawings, in which like items are identified by the same reference designation, wherein:

FIG. 2A shows a layout of the general frame format of a MAC frame for the IEEE802.11 standard;

FIG. 2B shows a detailed layout of the frame format of a Frame Control Field of the MAC frame shown in FIG. 2A;

FIG. 2C shows a layout of a WEP encrypted frame format.

FIG. 44A shows the layout for an Authentication Algorithm Number Fixed Field associated with the decoding routine of the present invention;

FIG. 44B shows the layout of a Authentication Transaction Sequence Number Fixed Field associated with the decoding routine of the present invention;

FIG. 44C shows the layout of a Beacon Interval Fixed Field associated with the decoding routine of the present invention;

FIG. 44D shows the layout of a Listen Interval Fixed Field associated with the decoding routine of the present invention;

FIG. 45A shows the layout of a Reason Code Fixed Field associated with the decoding routine of the present invention;

FIG. 45B shows the layout of an Association ID Fixed Field associated with the decoding routine of the present invention;

FIG. 45C shows a layout of a Status Code Fixed Field associated with the decoding routine of the present invention;

FIG. 45D shows a layout of a Current Access Point Address Fixed Field associated with the decoding routine of the present invention;

FIG. 46A shows a layout of a Timestamp Fixed Field associated with the decoding routine of the present invention;

FIG. 46B shows a layout of a Capability Information Fixed Field associated with the decoding routine of the present invention;

FIG. 46C shows a layout of an SSID Information Element Format associated with the decoding routine of the present invention;

FIG. 47A shows a layout of a Supported Rates Information Element Format associated with the decoding routine of the present invention;

FIG. 47B shows a layout of a DS Parameter Set Information Element Format associated with the decoding routine of the present invention;

FIG. 47C shows a layout of a CF Parameter Set Information Element Format associated with the decoding routine of the present invention;

FIG. 48A shows a layout of a TIM Information Element Format associated with the decoding routine of the present invention;

FIG. 48B shows a layout of an IBSS Information Element Format associated with the decoding routine of the present invention;

FIG. 48C shows a layout of a Challenge Text Information Element Format associated with the decoding routine of the present invention;

FIG. 48D shows a layout of an Unknown Information Element Format associated with the decoding routine of the present invention;

DETAILED DESCRIPTION OF THE INVENTION

The present invention is generally directed to a method and apparatus for capturing data packets and frames transmitted through a corresponding wireless communication channel and decoding and displaying to the user, the information contained in such frames. The present invention significantly improves one's understanding of the type of data traffic on the wireless network by way of a detailed analysis and decoding of the contents of the wireless header in the frames. A recently introduced "Sniffer® Wireless" product of Network Associates, Inc., of Santa Clara, Calif., incorporates various embodiments of the present invention.

The present invention is used in network analysis tools for wireless Local Area Network (LAN) systems conforming to the IEEE802.11 standard, but is not meant to be so limited. A wireless LAN system includes a plurality of devices or stations, such as workstations, printers, storage devices, servers, and the like connected to one another by wireless communications channels. The wireless LAN is configured so as to enable a message, usually a data packet or frame to be directed from a source to a destination. In this regard, each station of interest is provided with a network address that is unique to that particular station in the computer network. Typically, each station will have a single network address that is used by the system in order to locate that particular station. In this manner, any information or data that is to be transmitted or relayed to a specific station is accomplished by the use of the network addressing system. Although an IEEE802.11-based wireless LAN system is described in connection with the present invention, one of ordinary skill in the art will understand that the present invention may be applied in other types of communication networks.

Figure 1:
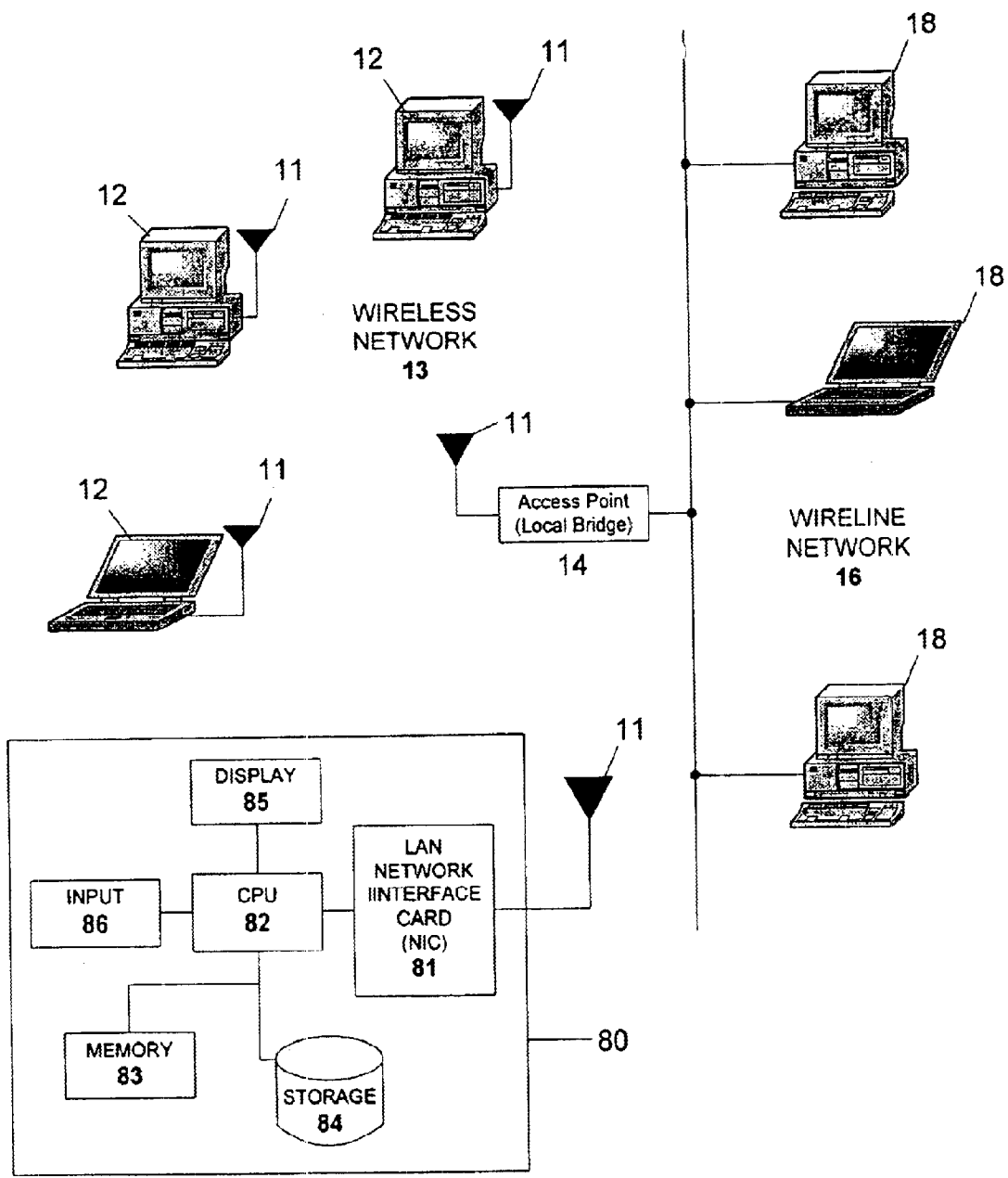
FIG. 1 shows a block schematic diagram of a computer network comprising a wireline network in communication with an IEEE802.11 wireless media Local Area Network (LAN)

With reference to FIG. 1, one configuration of a wireline and wireless LAN-based communication network 10 is shown. The network 10 comprises a plurality of wireless stations 12, and a wireless local bridge or access point 14 connected to a wireline network 16 of a plurality of wired stations 18. Each of the wireless stations 12 include a wireless network interface device 11 for interfacing with other wireless stations 12 and with the access point 14 to form a wireless network 13. Such a wireless network interface device, for example, is a Cisco Aironet Series 340 or Series 350 Wireless LAN Adapter, Cisco Systems, San Jose, Calif., or is a Symbol Technologies Spectrum 24 High Rate Adapter LA-4121-1020US. The wireless network interface device 11 transmits digital signals from the wireless stations 12 to the wireless medium to enable efficient signal transfer between a sending station and a receiving station, typically in the form of RF signals. The access point 14 enables communication between the wireless network stations 12 and the wired network stations 18, thereby expanding the associated LAN's capability. Note that although only one access point 14 is shown, in certain applications, a plurality of acccess points may be used. Information, control signals and other forms of digital data can be transmitted between stations 12 and 18 in the form of discrete data frames via network 10. The data frames, as one skilled in the art will recognize, are provided in a specific format commonly used in the transmission of data through the network 10.

A wireless network monitoring tool 80 of the present invention, as shown for example in FIG. 1, includes a wireless network interface device 11 connected to a wireless LAN network interface card (NIC) 81 for creating a connection with the LAN 10 so as to determine the topology of the LAN 10 and to monitor other network functions and data frame transmissions. The monitoring tool 80 further includes a processing unit or CPU 82 to receive information regarding the operation of the network 10. A memory 83 and a storage device 84 are connected to the processor 82 to provide temporary and permanent storage, respectively, of information required by the processor 82. A display unit 85 is connected to the processor 82 so as to display, generally in graphical form, information about the network 10 including its topology, data traffic stream, and functions and services. Through input devices 86 such as a keyboard, a mouse and the like, connected to the processor 82, and through a graphical user interface, a user can perform various analysis of the network 10 and monitor data transmissions. The display unit 85, the input devices 86, and the graphical user interface are collectively referred to as a user interface system. The monitoring tool 80 can be considered just another station in the wireless network, similar to the workstations, printers, storage devices, servers, and so forth, but it runs in a promiscuous mode, which will enable it to receive and analyze the packets sent to other stations as well.

The graphical user interface is preferably executed on a processor capable of supporting at least one of Windows NT 4.0, Windows 98SE, or Windows 2000 Professional. Any one of a number of commercial or proprietary processors may be used. Generally, the processor 82 of a Sniffer®

Wireless, for example, requires a minimum of 128 MB (Megabytes) of RAM, 256 MB (Megabytes) of Swap Space, and 4 MB (Megabytes) of available disk drive space. However, these requirements are meant to be limiting, and can vary with the type of processor used. The present invention can be built using available components or modules.

For the purposes of this invention, a frame represents a discrete logical unit of data transmitted through a communications network or channel from a sender station to a receiving station. The data is commonly a fragment of a much larger set of data, such as a file of text or image information. As the larger file is prepared for transmission, it is fragmented into smaller data units. Each fragment of data is packaged into a frame format, which comprises a header, payload, and trailer. The header prepends the payload and includes a set of framing bits, which are used for purposes of frame delineation and synchronization of the receiving station with the speed of transmission across the transmission link. Also included in the header are routing control information, and address information. Following the header is the payload, which contains the data unit being transmitted. Appending the payload is the trailer, which comprises data bits used for error detection and correction, and a final set of framing bits, or ending flag for purposes of frame delineation. The frame format of a frame is specific to the data communications protocol (i.e., IPX, IP, LLC, SNAP, etc.) being utilized in the network. The present invention is described in correspondence with the frame format used in IEEE802.11 LANs, although it will be understood that the present invention may also be modified for use in connection with other types of frame formats and data communications protocols.

The IEEE802.11 wireless LAN system includes a MAC (Medium Access Control) layer embodying a set of protocols which are responsible for maintaining order in the use of a shared medium. There are three types of frames that are transmitted at the MAC layer. The following list summarizes the frame types and subtypes and their main function or service in connection with the 802.11 MAC layer protocols:

1) IEEE802.11. Management Frames: The purpose of 802.11 management frames is to establish and maintain communications between stations and access points. Thus, management frames provide such services as association and authentication.

a) Association Request frame: A station will send this frame to an access point if it wants to associate with that access point. If the access point grants permission for association, the station will be associated with the access point.

b) Association Response frame: After receiving an Association Request frame, an access point sends an Association Response frame to indicate the result of an association request.

c) Reassociation Request frame: A station will send this frame to an access point if it wants to reassociate with that access point.

d) Reassociation Response frame: The access point sends the Reassociation Response frame to indicate the result of a reassociation request.

e) Probe Request frame: A station sends a probe response frame to obtain information from another station or access point.

f) Probe Response frame: If a station or access point receives a Probe Request frame, it will respond to the sending station with a Probe Request frame containing specific parameters about itself.

g) Beacon frame: In an infrastructure network, an access point periodically sends a Beacon frame that contains a timestamp and configuration information about the access point.

h) ATIM frame: A station which has frames buffered for other stations sends an ATIM (Announcement Traffic Indication Message) frame to each of these stations during an ATIM window immediately following, the transmission of a Beacon frame.

i) Disassociation frame: If a station or an access point wants to disassociate, it will send this frame.

j) Authentication frame: A station sends an Authentication frame to a station or an access point for which it requests secure communication.

k) Deauthentication frame: A station sends a Deauthentication frame to a station or access point for which it requests to end a secure communication.

2) IEEE802.11 Control Frames: After establishing association and authentication between stations and access points, control frames provide the functionality to assist in the delivery of data frames.

a) Request to Send (RTS): A station sends an RTS frame to a receiving station to negotiate the sending of a data frame that will follow.

b) Clear to Send (CTS): The station that is the receiver of the RTS frame sends a CTS frame to acknowledge the right for the sending station to send the data frames.

c) Acknowledgment (ACK): When a station receives an error-free frame, the station can send an ACK frame to the sending station to acknowledge that it successfully received the frame.

d) Power-Save Poll (PS Poll): If a station receives a PS Poll frame, it updates its network allocation vector (NAV), which is an indication of time periods that a station will not initiate a transmission.

e) Contention-Free End (CF End): The CF End frame designates the end of a contention free period.

f) CF End+CF-ACK: This frame acknowledges the Contention-Free End announcement of a CF End frame.

3) IEEE802.11 Data Frames: The main purpose of data frames is to carry information to the destination station for handoff to its applicable LLC (Logical Link Control) layer.

With reference to FIG. 2A, the frame format of a MAC frame 20 is shown. The frame 20 comprises generally a MAC header 22, a payload or frame body 24, and a trailer or frame check sequence 26. The MAC header 22 may further include at least one of the following information fields: a frame control field 28 for carrying control information being sent from station to station, a duration/ID field 30 for carrying information about the time duration the channel will be reserved or the association id, Address 1–4 fields 32, 34, 36, and 38, respectively, which convey the Basic Service Set Identification (BSSID), source address, destination address, sending station address, and receiving station address, respectively, and a sequence control field 40 which indicates the sequence and fragment numbers of the frame 20. The frame body 24 includes a variable length payload and carries information that pertains to the specific frame being sent. The data frame may contain a data unit. The control frames don't have a frame body 24. The MAC management frames may include specific parameters in the frame body 24 that pertain to a particular service or network functions the frame is implementing. The frame check sequence 26 contains information that is used to validate successful reception of frame 20. The frame format of the MAC frame 20, shown in FIGS. 2A and 2B, is true for all frames transmitted by a sending station to a receiving station, regardless of frame type. However, some of the fields may be omitted from control and management frames as explained in the IEEE802.11 standard.

As shown in FIG. 2B, the frame control field 28 which carries the critical control information may be further broken down into a protocol version subfield 42, a frame-type subfield 44, a frame-subtype subfield 46, a "To DS" and "From DS" subfields 48 and 50, respectively, a "More Frag" subfield 52, a Retry subfield 54, a Power Management subfield 56, a "More Data" subfield 58, a "WEP (wired equivalent privacy)" subfield 60, and an "Order" subfield 62. The protocol version subfield 42 indicates the version number of the data communication protocol creating the frame 20. The Type subfield 44 contains information that defines whether the frame 20 is a management, control, or data frame as indicated by the bits in Table 1 below. The Subtype subfield 46 contains information that defines the service or function of the frame 20 also shown in Table 1 below.

TABLE 1

Valid type and subtype combinations

| Type value b3 b2 | Type description | Subtype value b7 b6 b5 b4 | Subtype description |
| --- | --- | --- | --- |
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110–0111 | Reserved |
| 00 | Management | 1000 | Beacon |
| 00 | Management | 1001 | Announcement traffic indication message (ATIM) |
| 00 | Management | 1010 | Disassociation |
| 00 | Management | 1011 | Authentication |
| 00 | Management | 1100 | Deauthentication |
| 00 | Management | 1101–0111 | Reserved |
| 01 | Control | 0000–1001 | Reserved |
| 01 | Control | 1010 | Power Save (PS)-Poll |
| 01 | Control | 1011 | Request To Send (RTS) |
| 01 | Control | 1100 | Clear To Send (CTS) |
| 01 | Control | 1101 | Acknowledgement (ACK) |
| 01 | Control | 1110 | Contention-Free (CF)-End |
| 01 | Control | 1111 | CF-End + CF-Ack |
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null function (no data) |
| 10 | Data | 0101 | CF-Ack (no data) |
| 10 | Data | 0110 | CF-Poll (no data) |
| 10 | Data | 0111 | Cf-Ack + CF-Poll (no data) |
| 10 | Data | 1000–1111 | Reserved |
| 11 | Reserved | 0000–1111 | Reserved |

The "To DS" subfield 48 and the "From DS" subfield 50 defines whether the frame is destined to a distribution system or leaving a distribution system, respectively. The term "distribution system" refers to a system used to interconnect a set of basic service sets (BSS) and intergrated LANs to create an extended service set (ESS). The "To DS" subfield 48 and the "From DS" subfield 50 are set to zero for all management and control frames, because these frame are valid only within a basic service set (BSS). Depending on the bit sequence set in the "To DS" and "From DS" subfields 48 and 50 of a data frame, the contents of the Address 1–4 fields 32, 34, 36, and 38 will have a specific meaning. Table 2 lists the possible values of the address field depending on the bit sequence set for the "To DS (Distribution System)" and "From DS" subfields, as shown below.

TABLE 2

Address field contents for data frames

| To DS | From DS | Address 1 | Address 2 | Address 3 | Address 4 |
| --- | --- | --- | --- | --- | --- |
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

A station uses the contents of the "Address 1" field 32 to perform the address matching of target receiving stations. In cases where the "Address 1" field 32 contains a broadcast address (0xFFFFFFFFFFFF) or group address (multicast address), the BSSID is also validated to ensure that the broadcast or multicast originated in the same BSS (basic service set).

The receiving station uses the contents of the "Address 2" field 34 of the current frame to direct the acknowledgement (if acknowledgement is necessary). The DA (destination address) is the destination of the data residing in the "Frame Body" field 24 of frame 20. The SA (source address) is the address of the MAC entity that initiated the data that is carried in the "Frame Body" field 24. The RA (receiver address) is the address of the station contained in the access point in the wireless distribution system that is the next intended recipient of the frame. The TA (transmitter address) is the address of the station contained in the Access Point in the wireless distribution system that is transmitting the frame. The "BSSID (Basic Service Set Identification)" field contains either the MAC address of the Access Point or the BSSID of the IBSS(Independent Basic Service Set). If the content of the "Address 4" field 38 is shown as "N/A (not applicable)" then this address field is omitted from the frame.

The "More Frag" subfield 52 indicates whether another fragment of the same frame 20 will follow in a subsequent frame. IEEE802.11 protocol allows management and data frame types to be fragmented at the MAC layer in order to increase the possibility of delivery of the original large frame. The receiving station supports mechanism that will allow it to reassemble the fragmented frames originated from a sending station. The "Retry" subfield 54 indicates whether the frame 20 is a retransmission of an earlier frame where the reason for retransmission may be due to errors in the transmission of the first frame that resulted in an unsuccessful frame check sequence processing.

The Power Management subfield 56 indicates the power management mode that the sending station will reside after the current frame exchange sequence. The "More Data" subfield 58 alerts the receiving station in power-save mode to prepare to receive additional frames. The "Wired Equivalent Privacy" (WEP) subfield 60 indicates to the receiving station that the data contained in the frame body 24 has been processed by a wired equivalent privacy algorithm, that is, the data bits have been encrypted using a secret key for increased security and privacy. The order subfield 62 indicates whether the frame 20 was sent using the "Strictly Ordered" service class, which tells the receiving station that frames must be processed in a particular order and indicating the order sequence. The bit data contained in the corresponding fields and subfields of the frame 20, provides information as to the frame type and subtype as well as its service or function of the corresponding frame.

The Network Monitoring tool 80 (as shown in FIG. 1) operates to wirelessly "tap" into the wireless network 13 and capture the data frames transmitted in the network. In one embodiment of the present invention, the user, upon capturing the transmitted frames, may choose to decode and analyze the information contained in the captured frames. Even though the general structure of the IEEE802.11 frames fit the frame format of a MAC frame 20 shown in FIG. 2A, actual frame format depends on the frame type of the frame. Therefore the decoding and detailed analysis for each frame type are processed separately.

Figure 3:
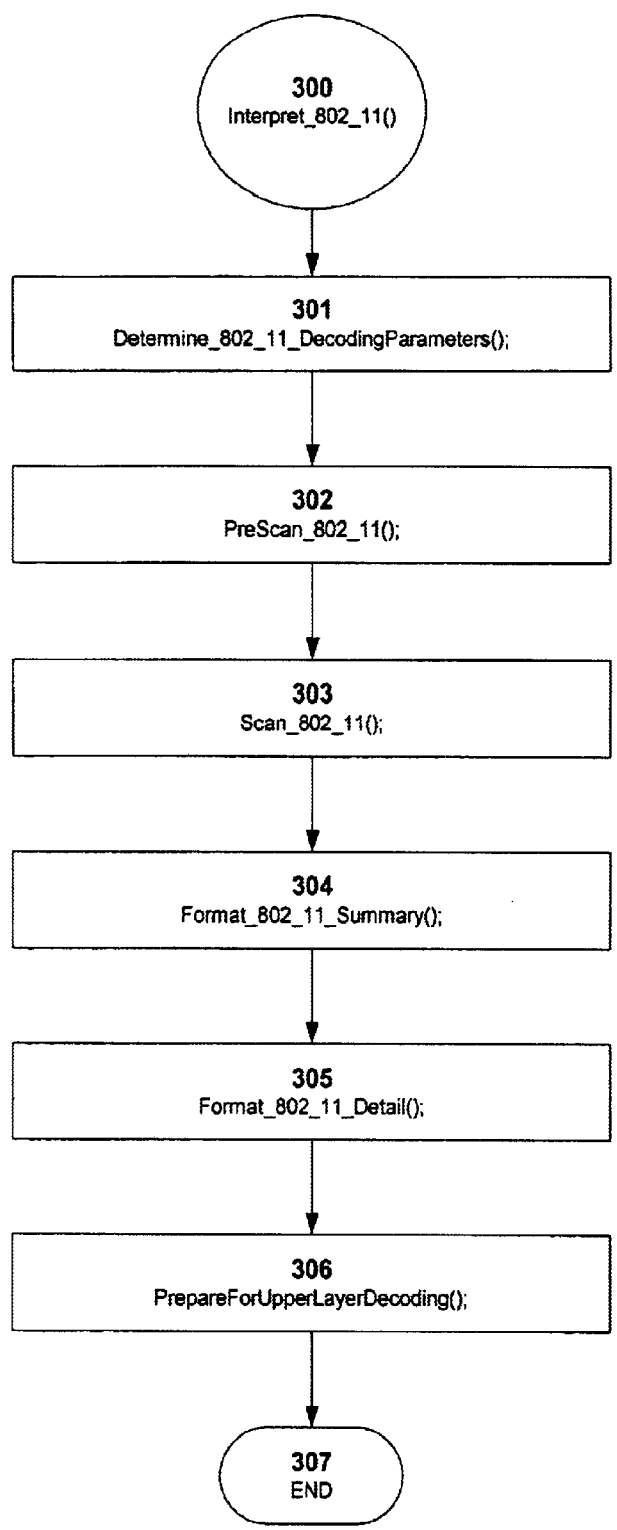
FIG. 3 shows a flowchart of a frame decoding routine for one embodiment of the present invention.
Figure 49:
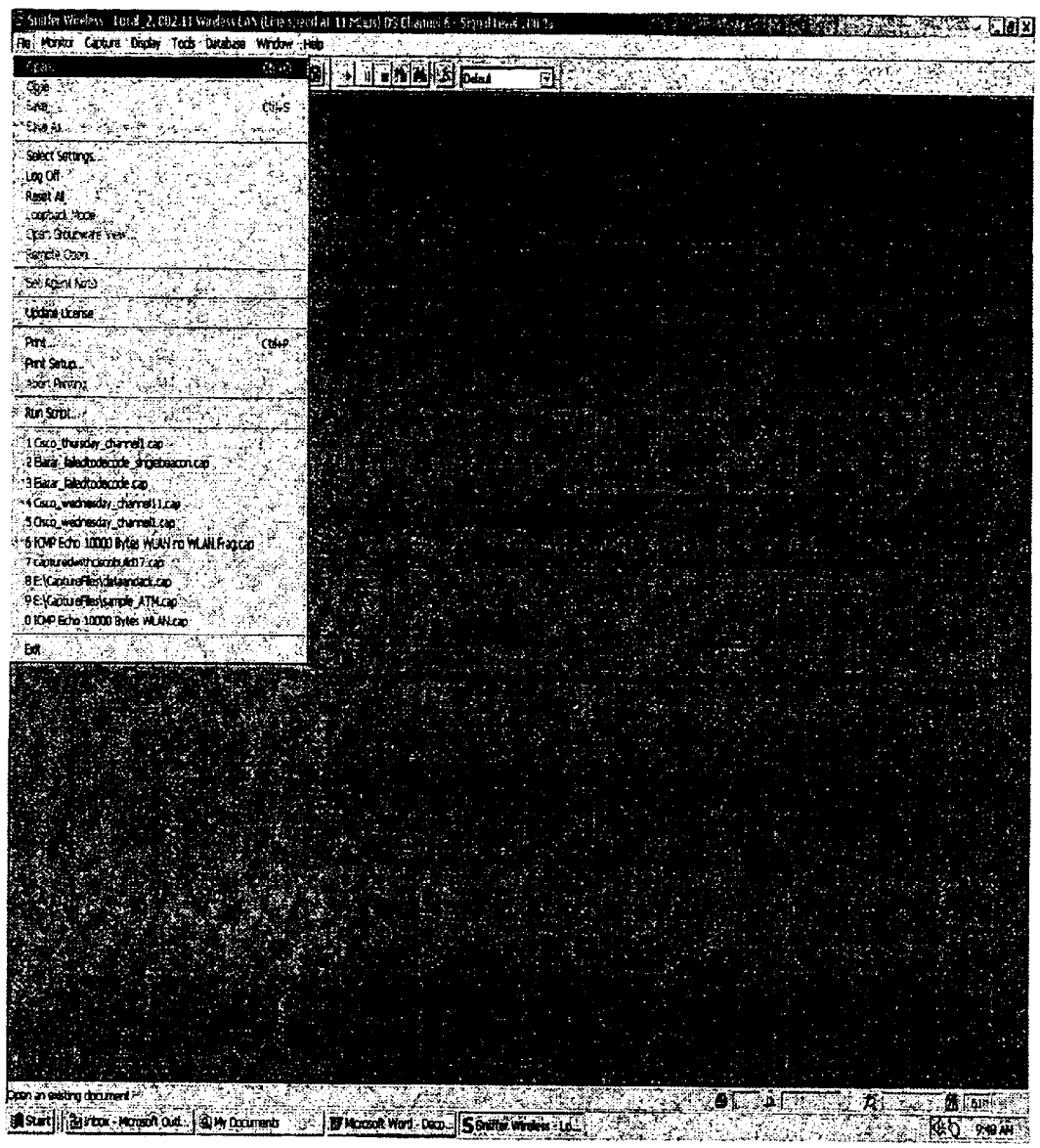
FIGS. 49 through 73, respectively, show screen displays for use in one embodiment of the invention.
Figure 50:
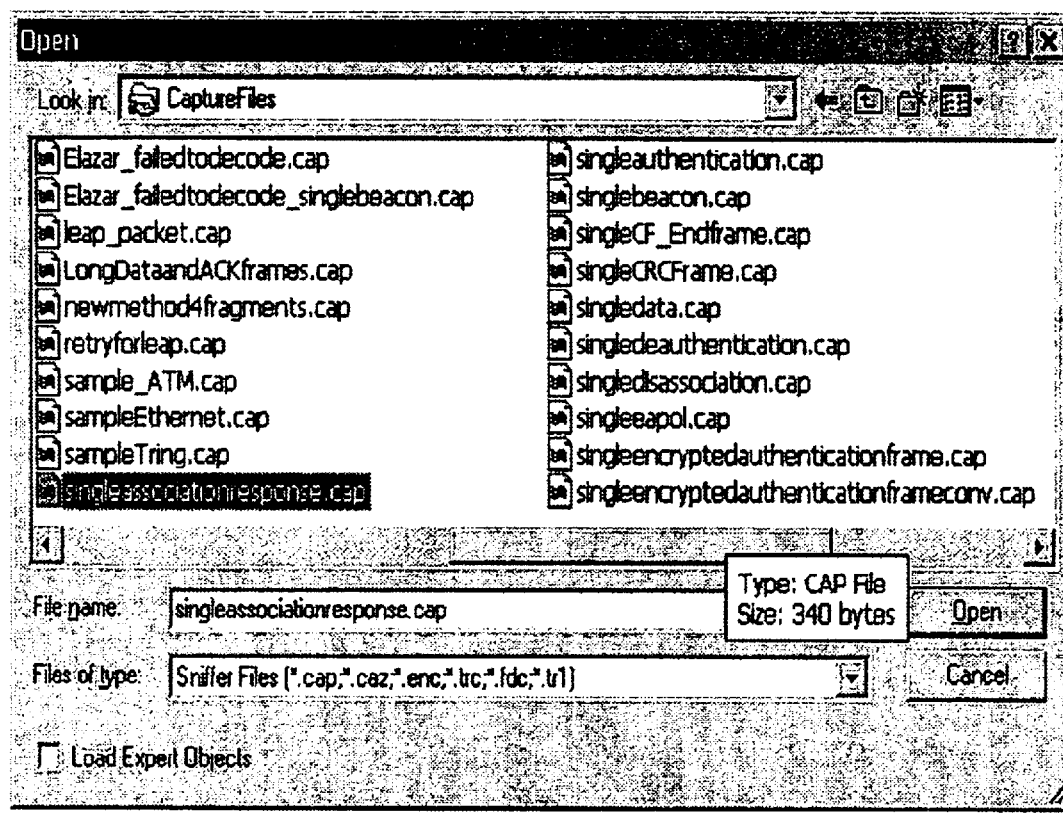

With reference to the flowcharts of FIG. 3 through 43, the operation of the present invention will be described in greater detail. With reference to FIG. 3, the routine of the present invention is initiated in step 300 of the Interpret__802__11( ) routine. In step 300 the user initiates the decoding process, typically by use of a menu on a display screen. For example, in FIG. 49, a display provided in the "Sniffer® Wireless" product of Network Associates, Inc. is shown. A user uses their mouse to open the "File" menu item. The user then selects the "Open" sub menu item by way of a mouse cursor. This process opens a dialog window as depicted in FIG. 50. The user selects the captured file to be loaded into the system memory 83. As the network monitoring tool 80 loads the captured file, the information contained in each frame is analyzed in detail by calling Interpret__802__11( ) routine at step 300 for each frame in the capture buffer 83 in the order they are stored into the buffer 83.

With respect to the flowchart of FIG. 3, the Interpret__802__11( ) programming routine is defined in steps 300 through 307. The Interpret__802__11( ) routine decodes the information contained in each bit of the IEEE802.11 header of the frames captured wirelessly from the network 10. The routine first determines the parameters which are necessary to decode the IEEE802.11 header further by executing a routine referred as Determine__802__11__DecodingParameters( ) at step 301 as described in greater detail by the flowchart of FIG. 4, In step 302 of FIG. 3, the routine next determines if the current frame is a part of a bigger fragmented frame, and if it needs to be reassembled by executing a routine called PreScan__802__11 ( ). The detail of the PreScan__802__11( ) routine is described in greater detail by the flowchart of FIG. 5. At step 303 of FIG. 3, the Interpret__802__11( ) routine then proceeds to determine and display the source and destination addresses of the frame by calling a routine called Scan__802__11( ) at step 303 as described in greater detail by the flowchart of FIG. 6. The Interpret__802__11( ) routine executes the Format__802__11__Summary( ) routine at step 304 to display the summary information about the contents of the frame as described in greater detail by the flowchart of FIG. 7. Then the routine proceeds to call the Format__802__11__Detail( ) routine at step 305 to perform a detailed analysis of the information contained in the IEEE802.11 header of the frame as described in greater detail by the flowchart of FIG. 8. The decoding of the information contained in the frame is done in a different routine for each layer. In order to determine the parameters required for further decoding of the contents of the frame by higher layer protocol interpreters, the Interpret__802__11( ) routine calls the PrepareForUpperLayerDecoding( ) routine at step 306 as described in greater detail by the flowchart of FIG. 26. The Interpret__802__11( ) 300 is terminated at step 307.

Figure 4:
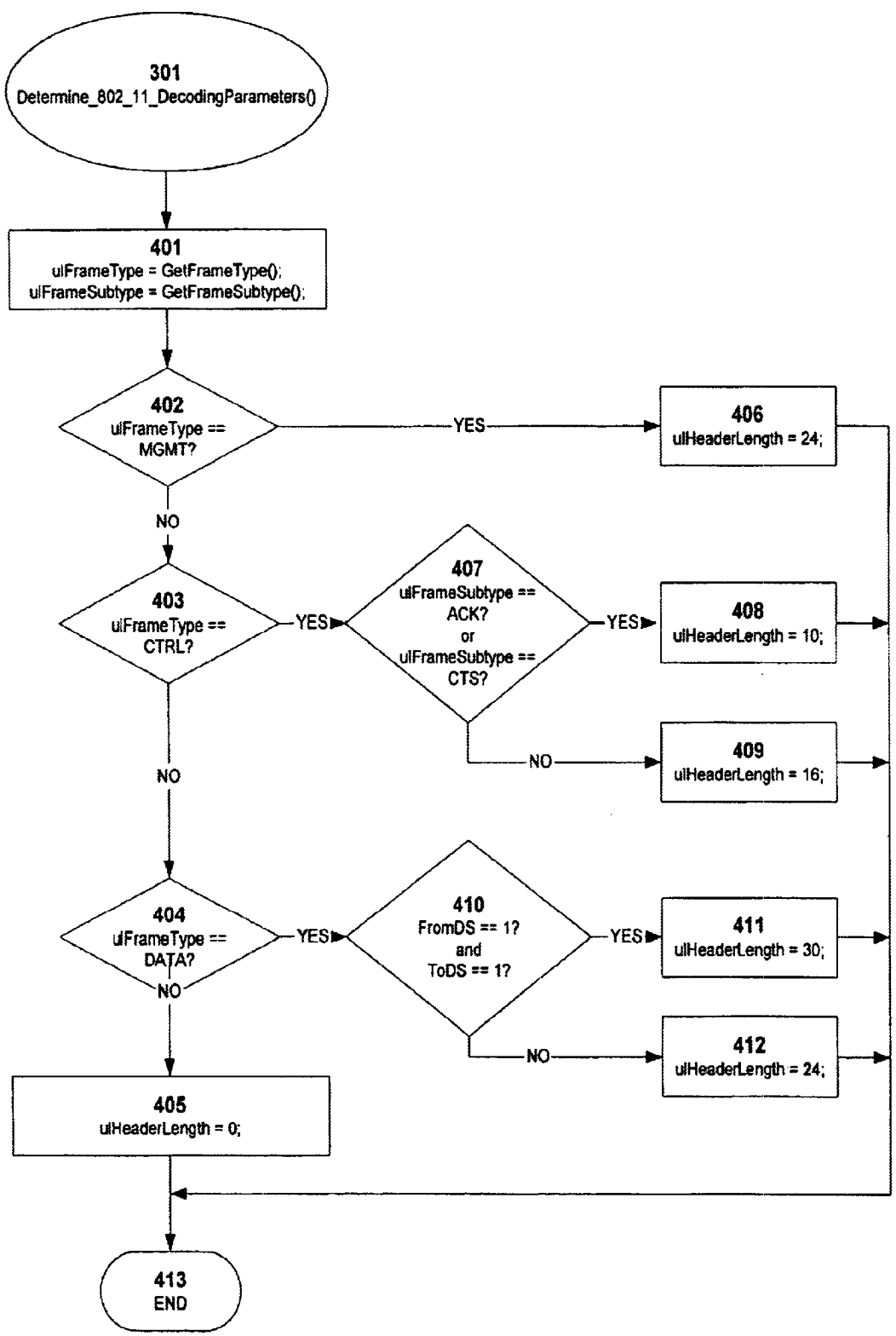
FIG. 4 shows a flowchart of a routine for determining the parameters used by the decoding routine of the present invention.

As shown in FIG. 4, the software initiates a routine called Determine__802__11__DecodingParameters( ) denoted at step 301. The routine referred generally at step 301 in FIG. 3, functions to determine the parameters required to decode the information in each frame. After initiating the routine 301, the programming or routine proceeds to execute GetFrameType( ) and GetFrameSubtype( ) functions at step 401 to determine the frame type and subtype of the current frame. The GetFrameType( ) and GetFrameSubtype( ) functions return the frame type and subtype by checking the "Type" and "Subtype" fields 44 and 46, respectively. The routine determines the frame type and subtype according to the corresponding bit values listed in Table 1. The results of the GetFrameType( ) and GetFrameSubtype( ) functions are stored in the "ulFrameType" and "ulFrameSubtype" variables. The routine proceeds to step 402 to determine if the frame type is a "Management" frame. If "Yes", then the routine proceeds to step 406 where the value of the variable "ulHeaderLength" is set to 24, which is the length (in octets) of the IEEE802.11 header for the management frames. If the result of step 402 is "No" then the routine proceeds to step 403 to determine if the frame type is a "Control" frame. If "Yes", then the routine proceeds to step 407 to determine if the frame subtype is either an "Acknowledgement (ACK)" or "Clear to Send (CTS)" frame. If "Yes", then the routine proceeds to step 408 to set the value of the variable "ulHeaderLength" is set to 10, which is the IEEE802.11 header length for ACK and CTS frames. If the result of step 407 is "No", which means the frame subtype of the Control frame is other than an ACK or CTS frame, the routine proceeds to step 409 to set the value of the variable "ulHeaderLength" to 16. If the frame type is not a Control frame at step 403, then the routine proceeds to step 404 to determine if the frame type is a "Data" frame. If "Yes", the routine proceeds to step 410 to determine if both of the ToDS and FromDS fields 48 and 50 are set to one. If "Yes", then the value of the variable "ulHeaderLength" is set to 30 at step 411, and if "No" it is set to 24. If the frame type is not a data frame at step 404, the routine proceeds to set the value of the variable "ulHeaderLength" to zero. The Determine__802__11__DecodingParemeters( ) routine of step 400 is terminated at step 413.

Figure 5:
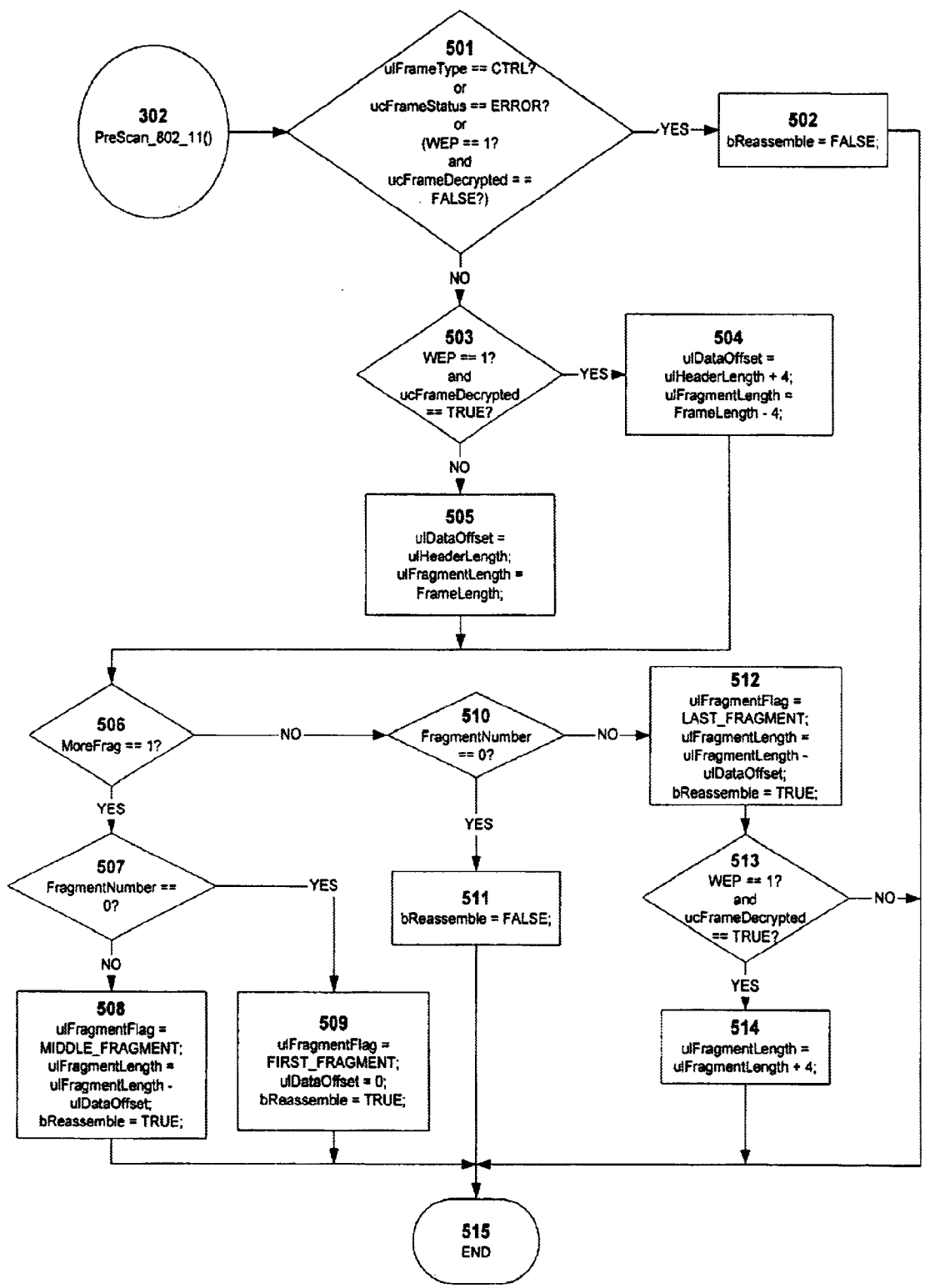
FIG. 5 shows a flowchart of a routine that determines the parameters necessary for assembling the fragmented frames associated with the decoding routine of the present invention.

With reference to FIG. 5, the program executes the PreScan__802 11( ) routine (step 302 of FIG. 3) as denoted by steps 501 to 515. The role of this routine is to determine the parameters needed to reassemble the fragmented frames. The program initiates the PreScan__802__11( ) routine at step 302. The routine proceeds to step 501 to determine if the frame type is a "Control" frame or a frame with an error or it is an encrypted frame. If "Yes", then the routine proceeds to step 502 to disable the reassembly for the current frame. The Control frames are not fragmented in the IEEE802.11 standard. The frames with an error are not used in assembly because the contents of the frames may be wrong. The encrypted frames will not be decoded at the higher layer, because the higher layer decoding functions will not understand the contents of the frame. If the result of step 501 is "No", then the routine proceeds to step 503 to determine if the current frame is originally encrypted but decrypted by the network analysis tool 80 upon receiving the frame. Since the decryption is done in place, the decrypted frame will have a 4-octet "IV" field 66 that contains the initialization vector for the encryption. At the end of the frame body field 76, there will be an "ICV" (Integrity Check Value) field 70, which is 4 octets in length. If the result of step 503 is "Yes", the routine proceeds to step 504 where the frame length is reduced by 4 octets due to "ICV" field 70, and the data offset that the upper layers start decoding will be increased from the protocol header length by 4 octets due to the length of the "IV" field 66. However, if the frame is not originally encrypted and later decrypted (step 503), then the data offset will be set to the length of the MAC header, and the fragment length will be set to the length of the frame at step 505. The routine then proceeds to step 506 to determine if "More Frag" field 52 is set to one (There will be more fragments belonging to the original large frame). If "Yes", then it proceeds to step 507 to determine if the fragment number of the current frame is zero. If "Yes", then the routine proceeds to step 509 where the fragment type is set to "First Fragment", the data offset is set to zero, and the reassembly is enabled. If the fragment number is not zero (step 507), then the routine proceeds to step 508, where the fragment type is set to "Middle Fragment", the fragment length is reduced by the data offset (which corresponds to IEEE802.11 header field 64 length plus the length of the "IV" field 66), and the reassembly is enabled. If the "More Frag" field 52 is not set to one, then the routine proceeds to step 510 to determine if the fragment number is zero. If "Yes", then it proceeds to step 511 where it disables the reassembly of the current frame because it is single fragment. However, if the fragment number is not equal to zero (step 510), then it proceeds to step 512, where it sets the fragment type to "Last Fragment", reduces the fragment length by data offset, and enables the reassembly. The routine then proceeds to step 513 to determine if the frame is a decrypted frame. If "Yes", it proceeds to step 514 to increase the fragment length by 4 octets due to the length of the "ICV" field 70. If "No" at Step 513, the routine proceeds to Step 515. The PreScan_802_11() routine ends at step 515.

Figure 6:
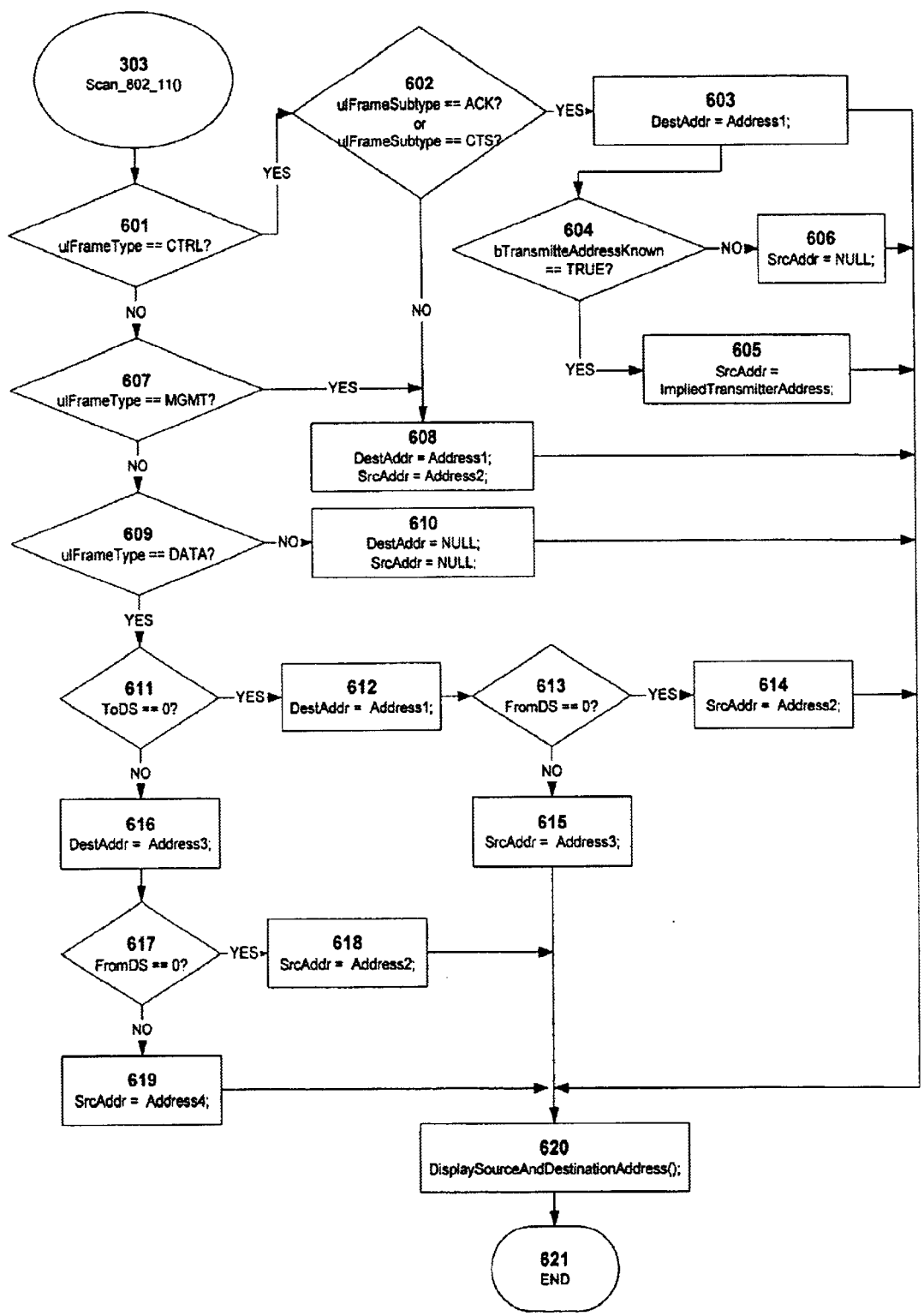
FIG. 6 is a flowchart of a routine for determining the source and destination address of the frame associated with the decoding routine of the present invention.
Figure 51:
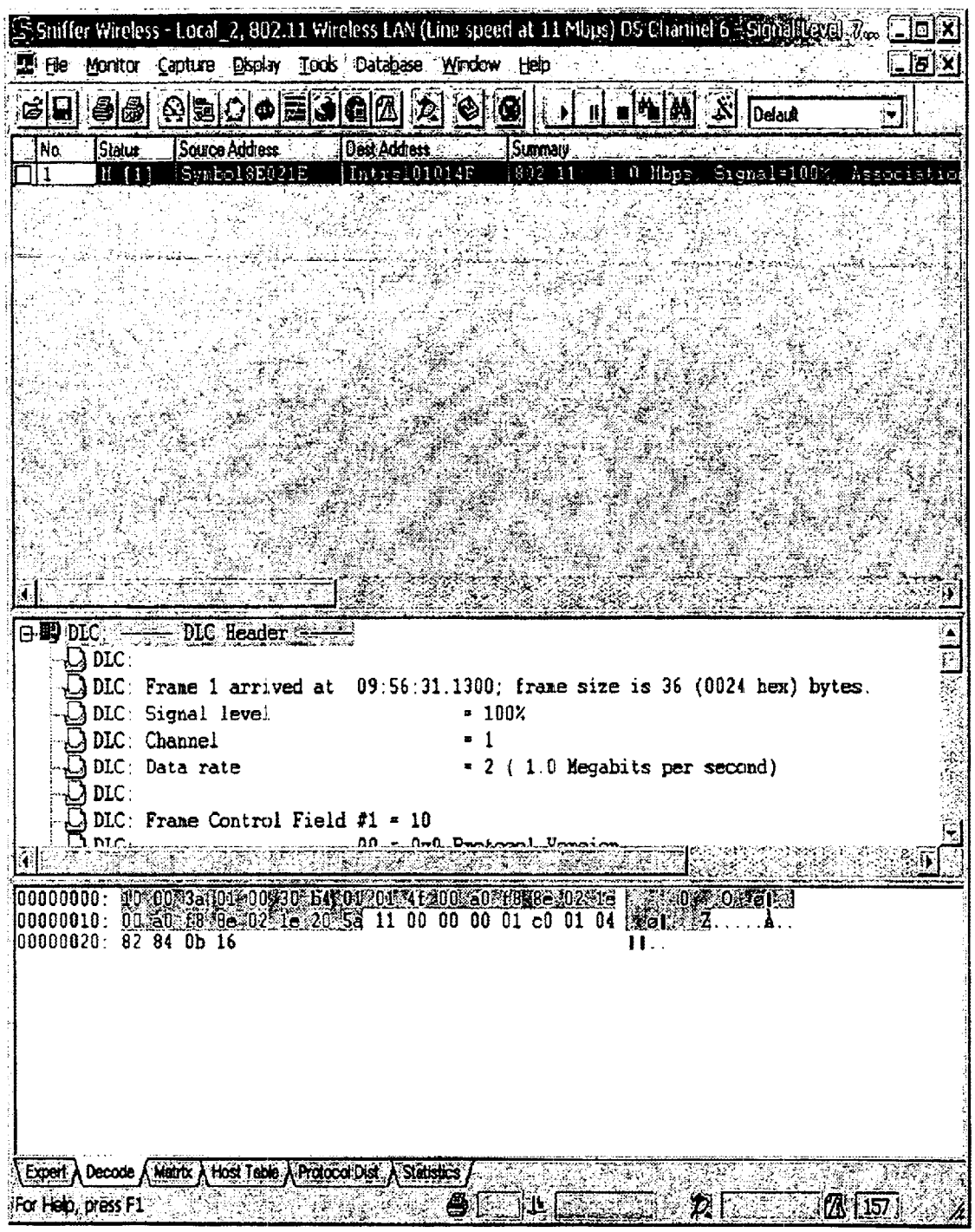

As shown in FIG. 6, the program executes the Scan_802_11() subroutine 303 generally shown in FIG. 3. The Scan_802_11() routine is responsible for determining and displaying the source and destination addresses of the frame. After initiation at Step 303, the routine than proceeds to step 601 to determine if the frame type is a "Control" frame. If "Yes", the routine proceeds to step 602 to determine if the frame subtype is either an "Acknowledgement (ACK)" or "Clear To Send (CTS)" frame. If "Yes", then it proceeds to step 603 to set the variable "DestAddr" to the contents of "Address1" field 32. The routine then proceeds to step 604 to determine if the transmitter address is known. The transmitter address for "ACK" and "CTS" frames can not be determined from the contents of the frame, because these frames do not carry the Address2 field 34. If the software inside the Network Interface Card (NIC) 81 can determine the address of transmitting station for these frame types it sets the variable "bTransmitteAddressKnown" to true and sets the contents of the "ImpliedTransmitterAddress" variable to the address of the transmitting station. The details of determining the transmitter address are beyond the scope of this invention, and are covered by the above-indicated Related application Ser. No. 09/875,544. If the transmitter address is known the routine proceeds to step 605 to set the variable "SrcAddr" to the value stored in the variable "ImpliedTransmitterAddress". If the result of step 604 is "No", then the variable "SrcAddr" is set to NULL at step 606. If the result of step 602 is "No", the routine proceeds to step 608 to set the "DestAddr" and "SrcAddr" variable to the contents of "Address1" and "Address2" fields 32 and 34 respectively. If the frame type is not a "Control" frame at step 601, the routine proceeds to step 607 to determine if the frame type is a "Management" frame. If "Yes", it proceeds to step 608 to set the "DestAddr" and "SrcAddr" variable to the contents of "Address1" and "Address2" fields 32 and 34 respectively. However, if the frame type is not a "Management" frame at step 607, the routine proceeds to step 609 to determine if the frame type is a "Data" frame. If "Yes", then it proceeds to step 611 to determine if "ToDS" bit field 48 is set to zero. If "Yes", it sets the "DestAddr" variable to the contents of "Address1" field 32 at step 612. It then proceeds to step 613 to determine if "FromDS" bit field 50 is set to zero. If "Yes", then the routine proceeds to step 614 where it sets the variable "SrcAddr" to the contents of "Address2" field 34. If the result of step 613 is "No", it proceeds to step 615 where it sets the variable "SrcAddr" to the contents of "Address3" field 36. If the "ToDS: bit field 48 is not set to zero at step 611, the routine proceeds to step 616 where it sets the variable "DstAddr" to the contents of the "Address3" field 36. The routine then proceeds to step 617 to determine if "ToDS" bit field 48 is set to zero. If "Yes", then it proceeds to step 618 to set the variable "SrcAddr" to the contents of the "Address2" field 34. If the result of step 617 is "No", then it proceeds to step 619 to set the variable "SrcAddr" to the contents of the "Address4" field 38. The routine proceeds to step 620 after it executes the steps 603, 605, 606, 608, 610, 614, 615, 618, or 619. At step 620, the routine executes the DisplaySourceAndDestinationAddress() routine. The implementation of this routine is proprietary to Network Associates, Inc. of Santa Clara, Calif., and beyond the scope of this invention. However, the output of this function can be seen in FIG. 51. The Scan_802_11() terminates at step 621.

Figure 7:
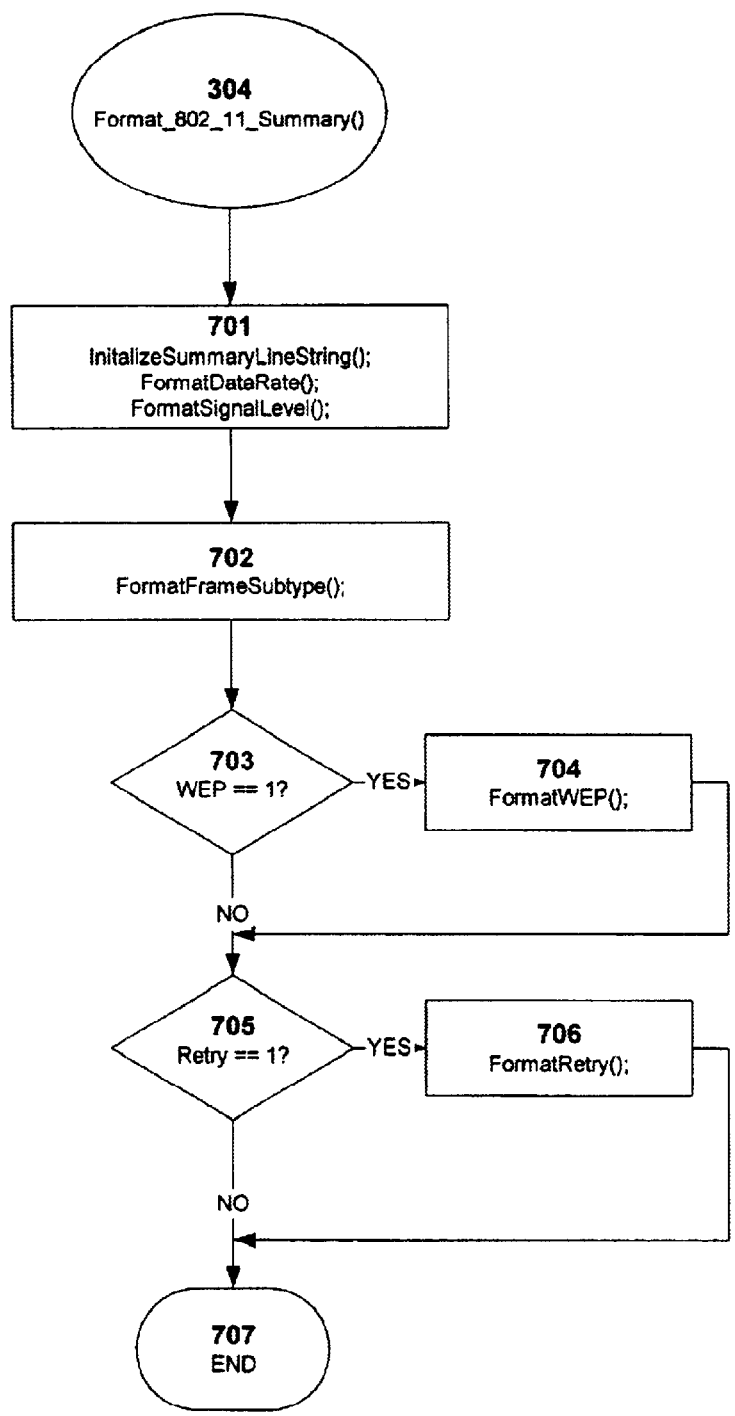
FIG. 7 shows a flowchart of a routine for determining the summary line display of frames associated with the decoding routine of the present invention.
Figure 52:
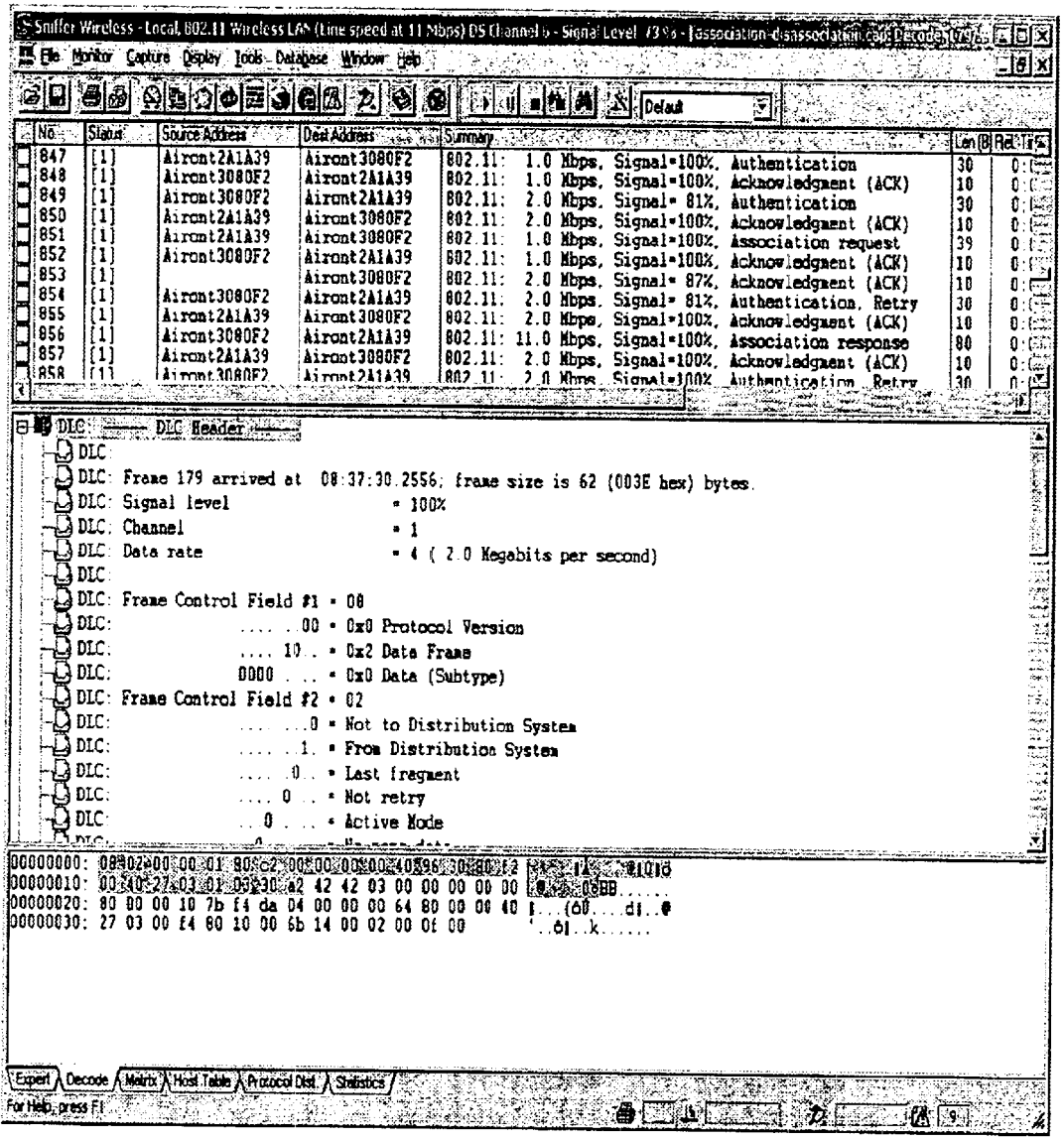

As shown FIG. 7, the program executes the Format_802_11_Summary() routine 304 generally shown in FIG. 3. The Format_802_11_Summary() routine is responsible for determining and displaying a short concise summary information about the frame. After the initialization step 304, the routine proceeds to step 701 where it initializes a string to be used as the summary line. It also formats the data rate and the signal strength level as determined by the Network Interface Card(NIC) 81. The routine then proceeds to step 702 where it formats the name of the frame subtype according to the corresponding bit values listed in Table 1. It then proceeds to step 703 to determine if the "WEP" bit field 60 is set to one. If "Yes", it adds the "WEP" string to the summary line at step 704. It then proceeds to step 705 to determine if the "Retry" bit field 54 is set to one. If "Yes", then it adds to the summary line a "Retry" string. The details of formatting the summary line string are beyond the scope of this invention. Some sample summary lines are shown in FIG. 52. The Format_802_11_Summary() routine terminates at step 707.

Figure 8:
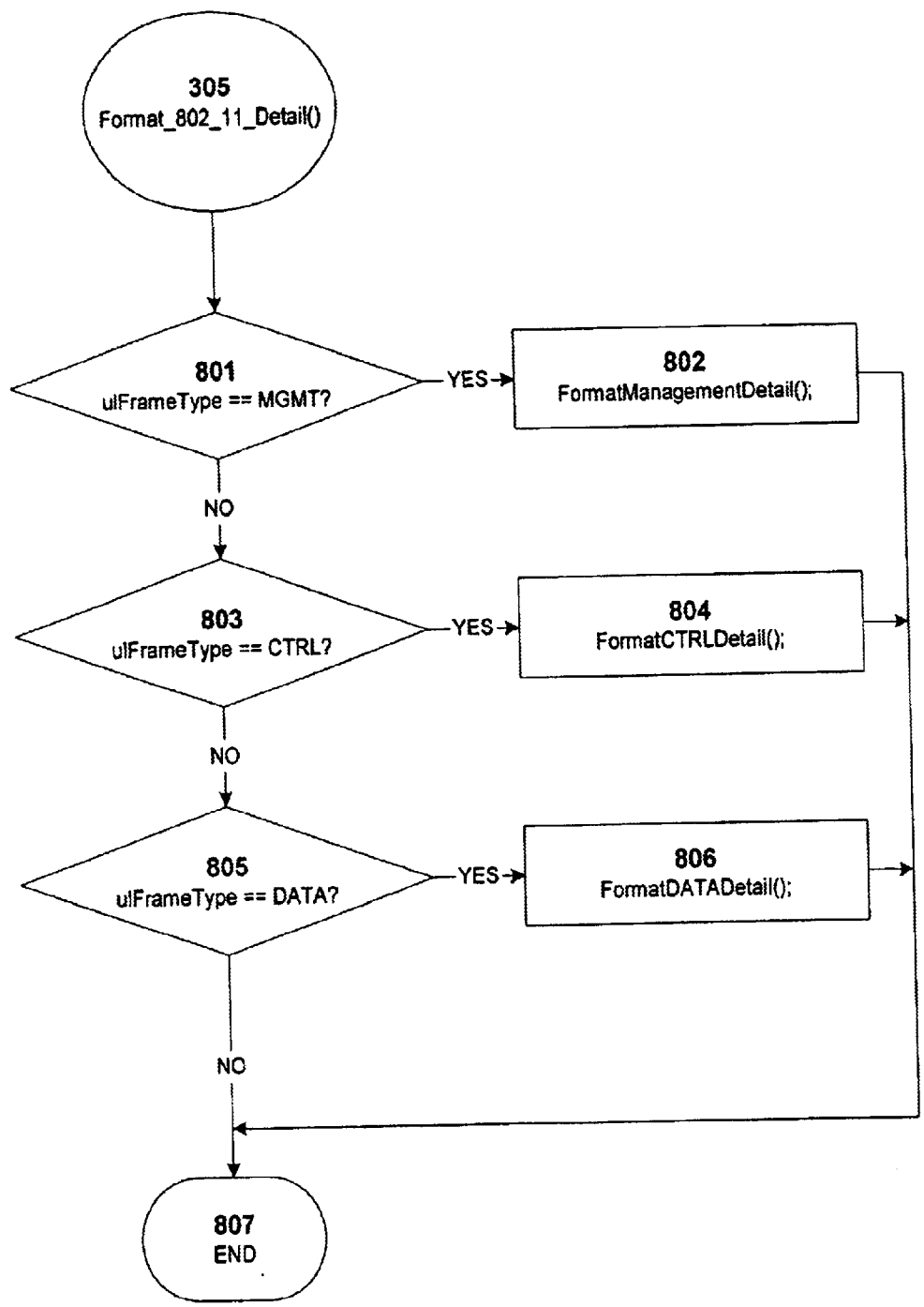
FIG. 8 shows the flowchart of a routine for formatting and displaying in detail the contents of frames associated with the decoding routine of the present invention.

With reference to FIG. 8, the program executes the Format_802_11_Detail() routine (step 305 of FIG. 3) as denoted by steps 801 to 807. The role of this routine 305 is to decode the information contained in each frame in detail, and to display it to the user. Upon initiation of step 305, the Format_802_11_Detail() routine is activated. The routine then proceeds to step 801 to determine if the frame type is a "Management" frame. If "Yes", the routine proceeds to step 802 to execute the FormatCTRLDetail() subroutine as described in greater detail in the flow chart of FIG. 9. If the frame type is not "Management" frame at step 801 the routine proceeds to step 803 to determine if the frame type is a "Control" frame. If "Yes", the routine proceeds to step 804 to execute the FormatDATADetail() subroutine as described in greater detail in the flow chart of FIG. 20. If "No", then it proceeds to step 805 to determine if the frame type is "Data" frame. If "Yes", it proceeds to step 806 where it executes execute the FormatControlDetail() subroutine as described in greater detail in the flow chart of FIG. 25. The Format_802_11_Detail() routine terminates at step 807.

Figure 9:
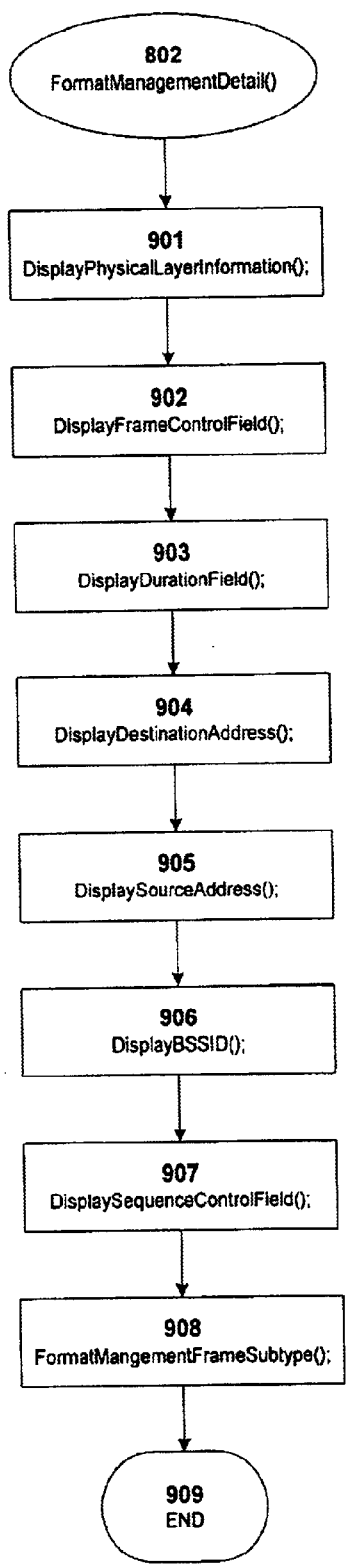
FIG. 9 shows the flowchart of a routine for formatting and displaying in detail the contents of management frames associated with the decoding routine of the present invention.

With reference to FIG. 9, the program executes the FormatManagementDetail() subroutine(step 802 of FIG. 8) as denoted by steps 901 to 909. The role of this routine is to decode the information contained in management frames in detail, and to display it to the user. Upon initiation of step 802, the FormatManagementDetail( ) routine is activated. The routine then proceeds to step 901, where it executes the DisplayPhysicalLayerInformation( ) routine to display the physical layer related information determined by the Network Interface Card (NIC) 81 as described in detail by the flowchart of FIG. 27. The routine then proceeds to step 902 to execute the DisplayFrameControlField( ) routine as described in detail by the flowchart of FIG. 28. The routine proceeds to step 903 where it displays the contents of the duration field 30. It treats the contents of the duration field 30 as a little-endian unsigned integer of two octets in length. The value of "Duration" field 30 corresponds in microseconds that the medium is reserved by the sending station. The detail implementation of displaying the contents of the "Duration" field 30 is beyond the scope of this invention. The routine then proceeds to step 904 where it displays the destination address by executing the DisplayDestinationAddress( ) routine as described in detail by the flowchart of FIG. 29. The routine executes the DisplaySourceAddress( ) routine at step 905 as described in detail by the flowchart of FIG. 30. The routine then proceeds to step 906 to execute the DisplayBSSID( ) routine as described in detail by the flowchart of FIG. 31. The routine then proceeds to step 907 where it displays the fragment and sequence numbers by executing the DisplaySequenceControlField( ) routine as described in detail by the flowchart of FIG. 34. It then proceeds to step 908 to display the information specific to each frame subtype by executing the FormatMangementFrameSubtype( ) as described in detail by the flowchart of FIG. 10.

Figure 10:
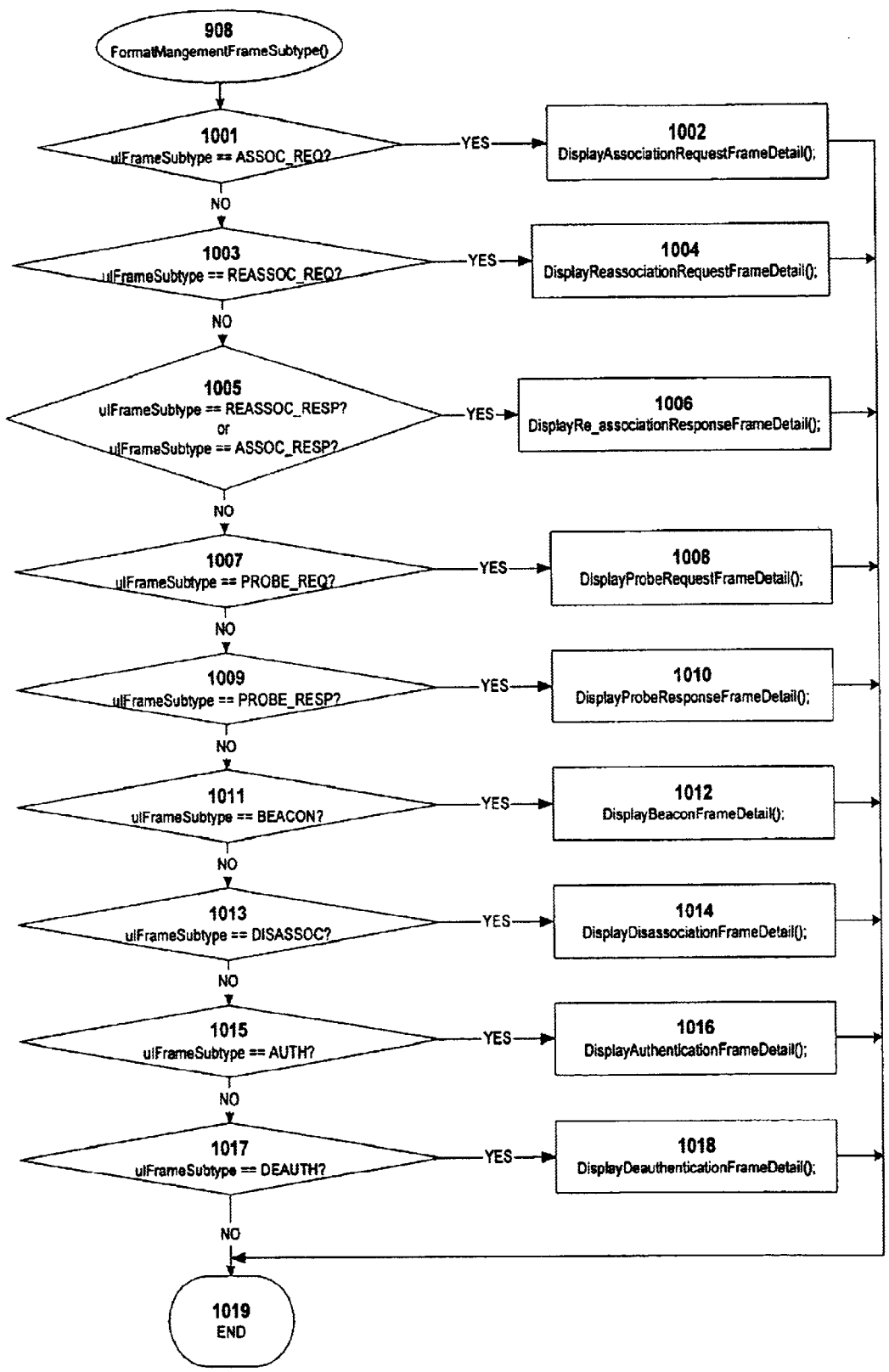
FIG. 10 shows the flowchart of a routine for formatting and displaying in detail the contents of management subtype frames associated with the decoding routine of the present invention.

As shown FIG. 10, the program executes the FormatMangementFrameSubtype( ) routine 908 generally shown in FIG. 9. The task of this routine is to decode and display the information contained in the frame body 24 section of management frame subtypes. The routine is activated upon initiation of Step 908, and it proceeds to step 1001 to determine if the frame subtype is a "Association Request" frame. If "Yes", then the routine proceeds to step 1002 to execute the DisplayAssociationRequestFrameDetail( ) routine as described in detail by the flowchart of FIG. 11. If "No", then the routine proceeds to step 1003 to determine if the frame subtype is a "Reassociation Request" frame. If "Yes", then it executes the DisplayReassociationRequestFrameDetail( ) routine at step 1004. The DisplayReassociationRequestFrameDetail( ) routine is described in detail by the flowchart of FIG. 12. If the result of step 1003 is "No", then the routine proceeds to step 1005 to determine if the frame subtype is either an "Association Response" or "Reassociation Response" frame. If "Yes", the routine proceeds to step 1006, where it executes the DisplayRe_associationResponseFrameDetail( ) routine as described in detail by the flowchart of FIG. 13. If "No", then the routine proceeds to step 1007 to determine if the frame subtype is a "Probe Request" frame. If "Yes", the routine proceeds to step 1008, where it executes the DisplayProbeRequestFrameDetail( ) routine as described in detail by the flowchart of FIG. 14. If the result of step 1007 is "No", then the routine proceeds to step 1009 to determine if the frame subtype is a "Probe Response" frame. If "Yes", the routine proceeds to step 1010 to execute a DisplayProbeResponseFrameDetail( ) routine as described in detail by the flowchart of FIG. 15. If the frame subtype is not a "Probe Response" at step 1009, the routine proceeds to step 1011 to determine if the frame subtype is a "Beacon" frame. If "Yes", the routine proceeds to step 1012, where it executes the DisplayBeaconFrameDetail( ) routine as described in detail by the flowchart of FIG. 16. If "No" at step 1011, the routine proceeds to step 1013 to determine if the frame subtype is a "Disassociation" frame. If "Yes", then it proceeds to step 1014 to execute the DisplayDisassociationFrameDetail( ) routine as described in detail by the flowchart of FIG. 17. If "No", then it proceeds to step 1015 to determine if the frame subtype is a "Authentication" frame. If "Yes", then the routine proceeds to step 1016, where it executes the DisplayAuthenticationFrameDetail( ) routine as described in detail by the flowchart of FIG. 18. If the result of step 1015 is "No", then the routine proceeds to step 1017 to determine if the frame type is a "Deauthentication" frame. If "Yes", then it proceeds to step 1018 to execute the DisplayDeauthenticationFrameDetail( ) routine as described in detail by the flowchart of FIG. 19. The FormatMangementFrameSubtype( ) routine terminates at step 1019.

Figure 11:
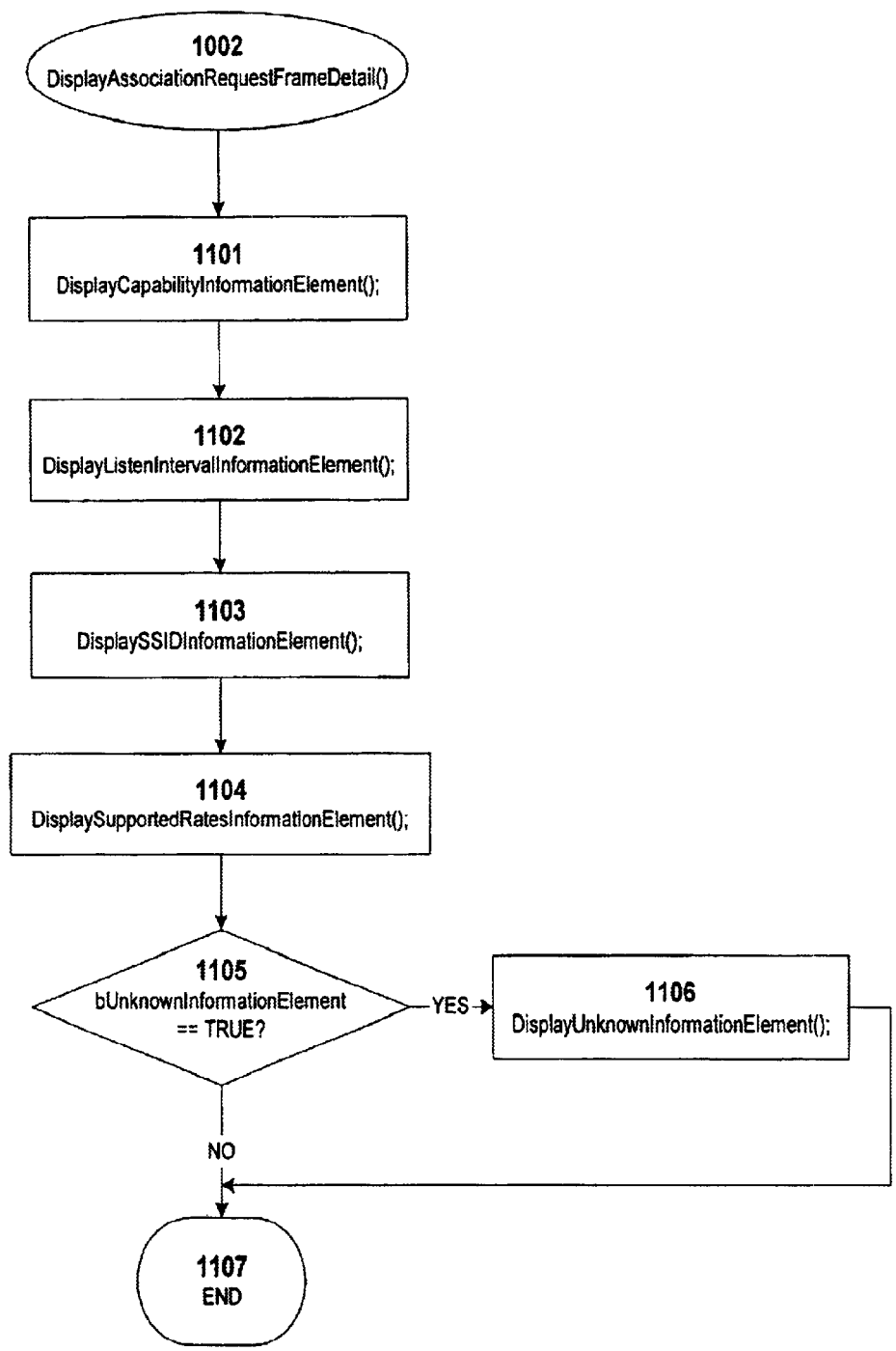
FIG. 11 shows a flowchart of a routine for formatting and displaying in detail the contents of Association Request frames associated with the decoding routine of the present invention.
Figure 53:
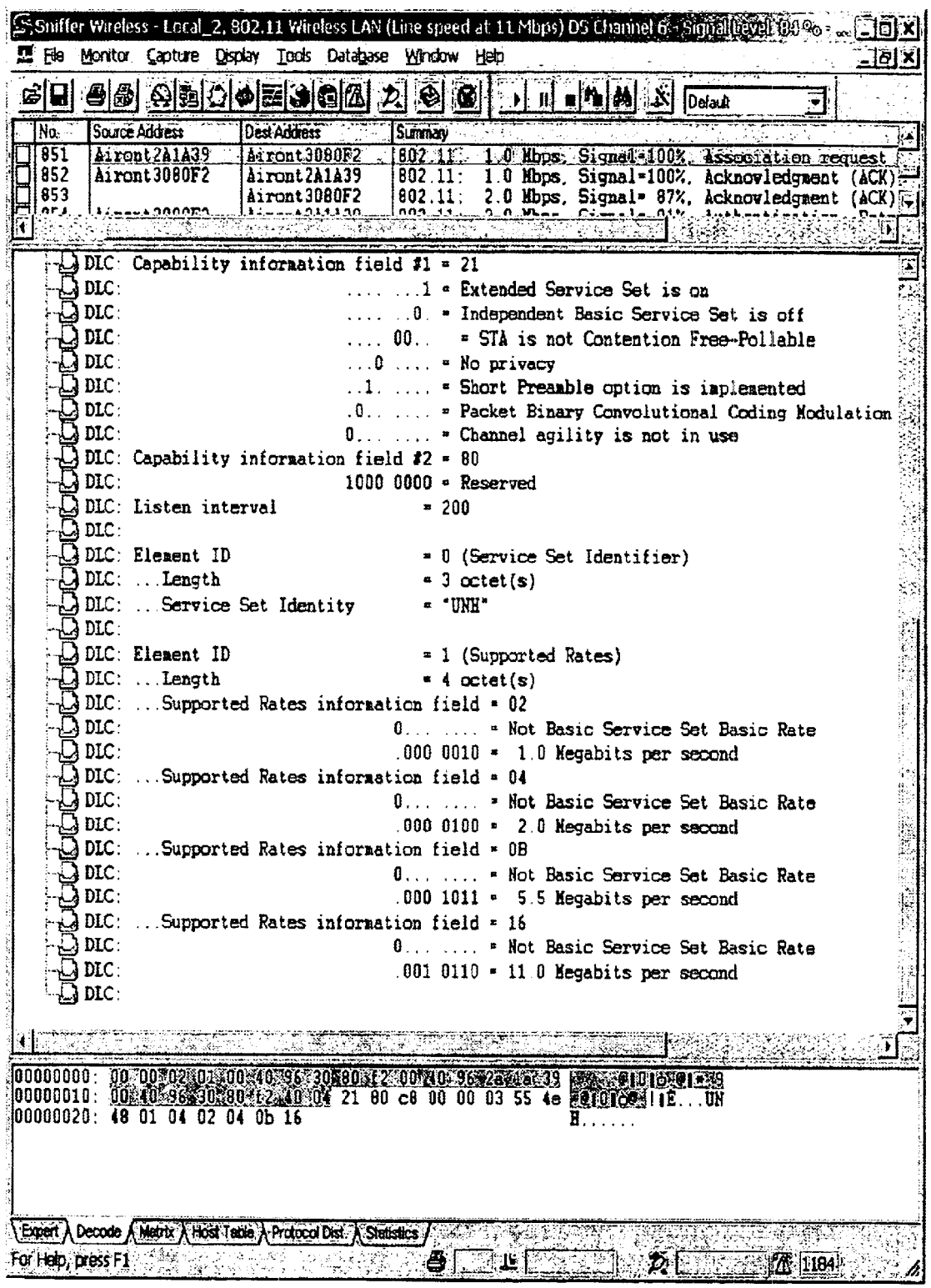

With reference to FIG. 11, the program executes the DisplayAssociationRequestFrameDetail( ) routine (step 1002 of FIG. 10) as denoted by the steps 1101 to 1107. The role of this routine is to decode and display the information contained in the frame body field 24 of the "Association Request" management frame subtype. Upon initiation of step 1002, the DisplayAssociationRequestFrameDetail( ) routine is activated. The routine then proceeds to step 1101 to execute the DisplayCapabilityInformationElement( ) routine as described in detail by the flowchart of FIG. 35. It then proceeds to step 1102 to display the contents of the "Listen Interval" field 4408. Listen interval is 2 octets in length. This field is used to indicate to the Access Point how often a station wakes to listen to the Beacon management frames. It is expressed in units of Beacon interval. The routine then proceeds to step 1103 to execute the DisplaySSIDInformationElement( ) routine as described in detail by the flowchart of FIG. 36. The routine then proceeds to step 1104 to execute the DisplaySupportedRatesInformationElement( ) routine as described in detail by the flowchart of FIG. 37. The routine then proceeds to step 1105 to determine if there is an unknown information element at the end of the frame. If "Yes", then it proceeds to step 1106 to execute the DisplayUnknownInformationElement( ) routine as described in detail by the flowchart of FIG. 38. The DisplayAssociationRequestFrameDetail( ) routine terminates at step 1107, from Step 1106, or from Step 1105 if "No." Display of a typical "Association Request" frame body is shown in FIG. 53.

Figure 12:
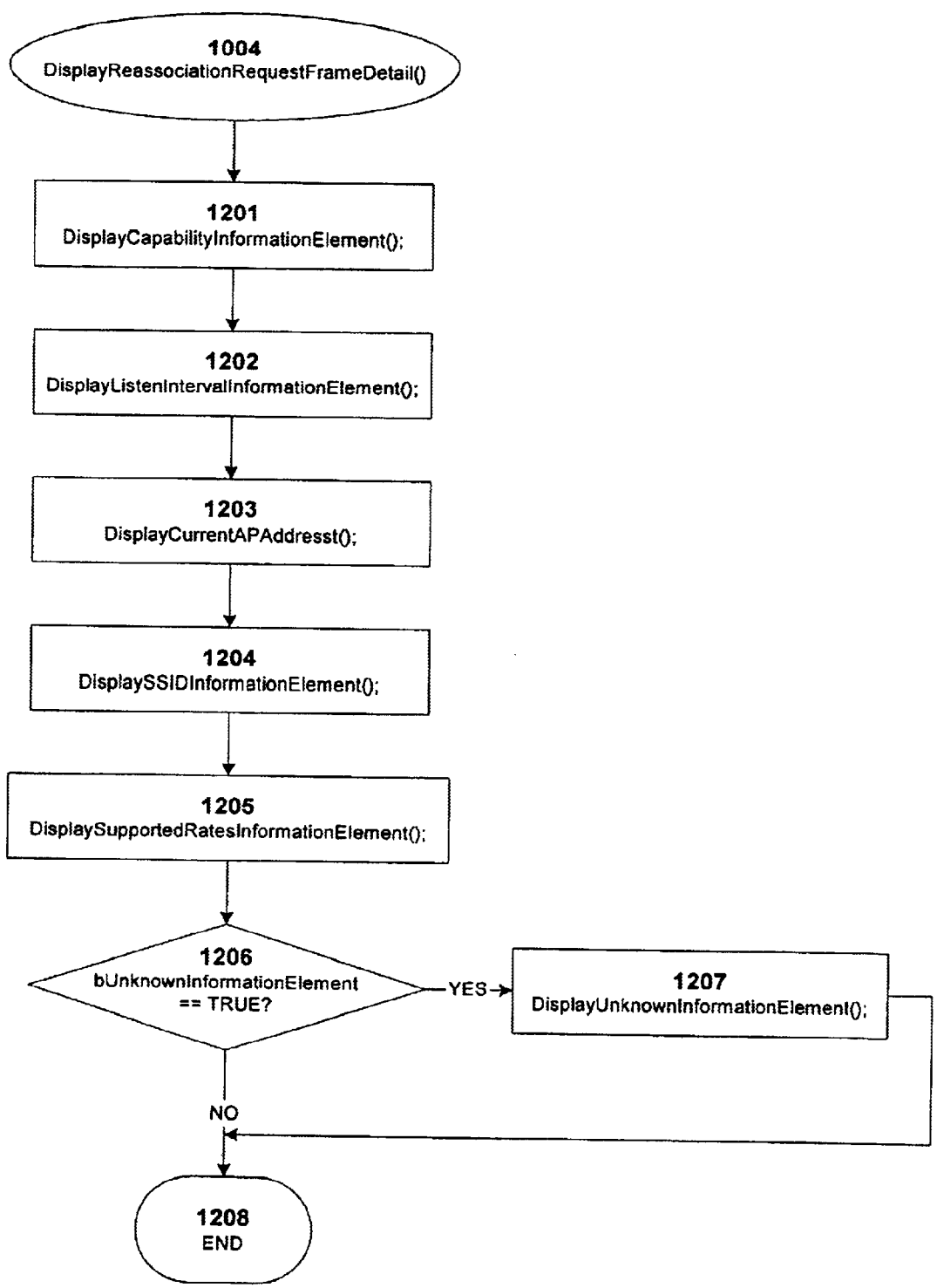
FIG. 12 shows a flowchart of a routine for formatting and displaying in detail the contents of Reassociation Request frames associated with the decoding routine of the present invention.
Figure 30:
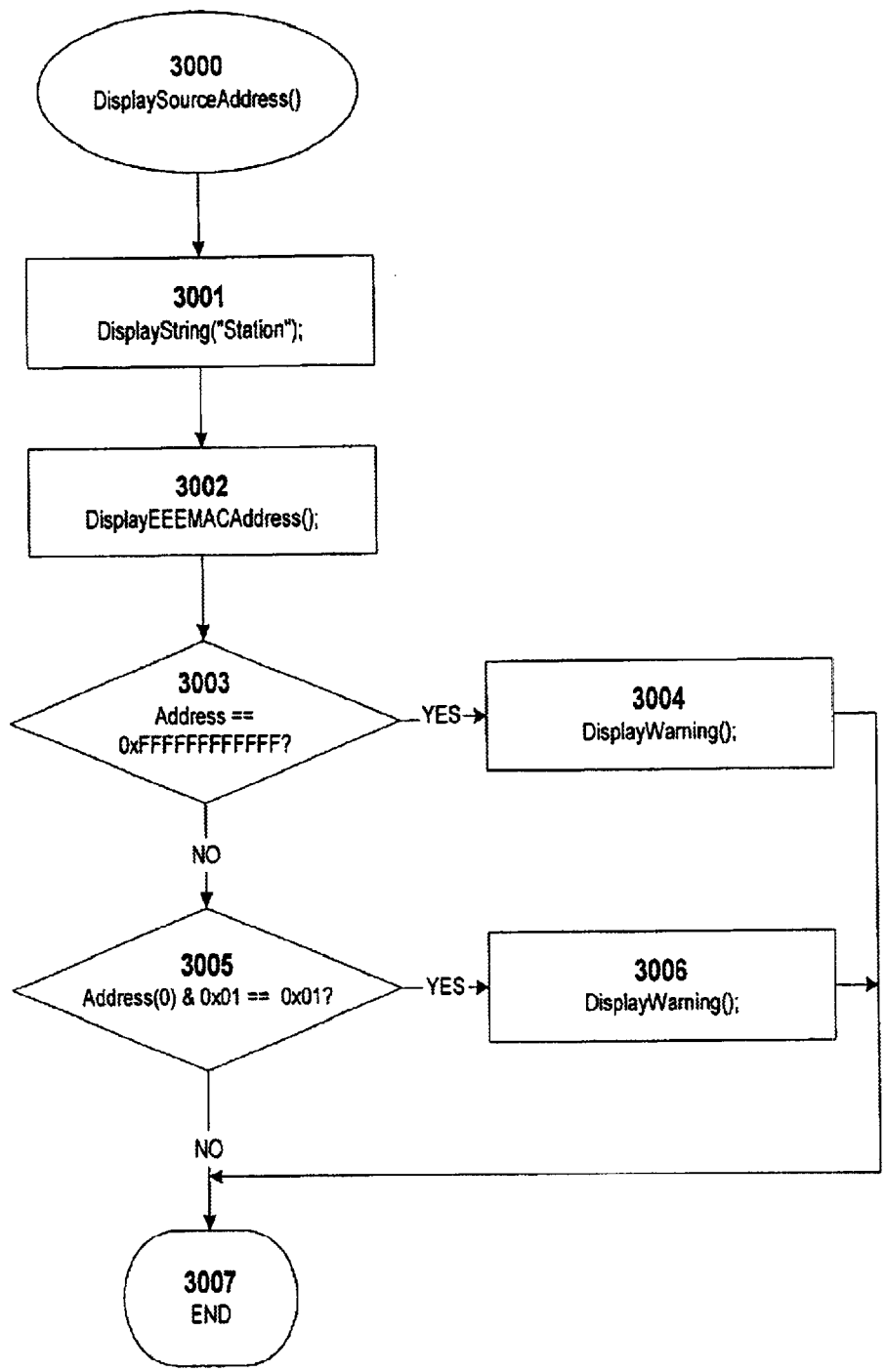
FIG. 30 shows the flowchart of a routine for formatting and displaying in detail the contents of a Source Address Field associated with the decoding routine of the present invention.
Figure 54:
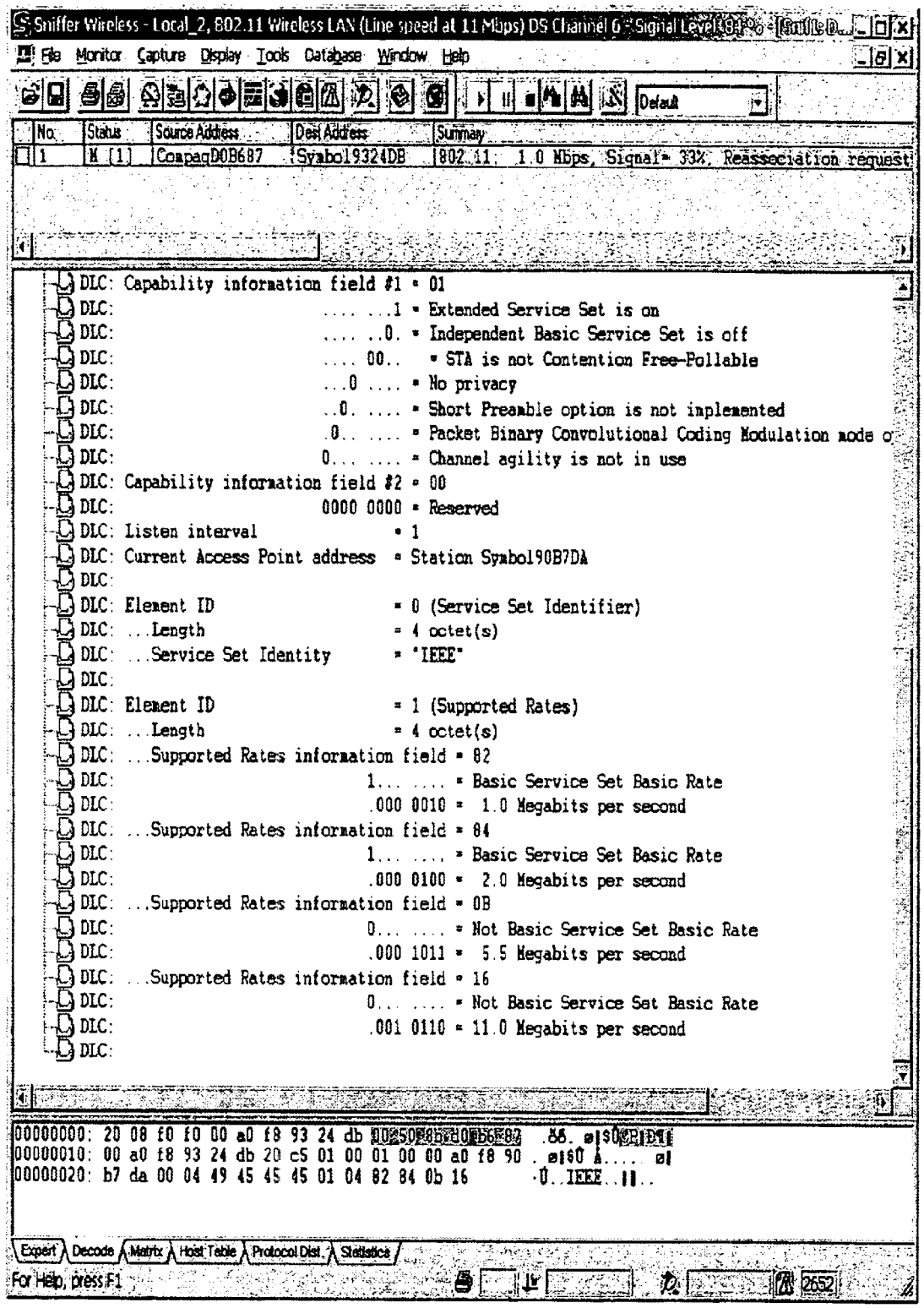

With reference to FIG. 12, the program executes the DisplayReassociationRequestFrameDetail( ) routine (step 1004 of FIG. 10) as denoted by the steps 1201 to 1208. The role of this routine is to decode and display the information contained in the frame body field 24 of the "Reassociation Request" management frame subtype. Upon initiation of step 1004, the DisplayReassociationRequestFrameDetail( ) is activated. The routine then proceeds to step 1201 to execute the DisplayCapabilityInformationElement( ) routine as described in detail by the flowchart of FIG. 35. It then proceeds to step 1202 to display the contents of the "Listen Interval" field 4408. Listen interval is 2 octets in length. This field is used to indicate to the Access Point how often a station wakes to listen to the Beacon management frames. It is expressed in units of Beacon interval. The routine then proceeds to step 1203 to display the MAC address of the current Access Point. The program displays the current AP address field 4508 by calling the DisplaySourceAddress( )

routine of FIG. 30 with appropriate parameters. The routine then proceeds to step 1204 to execute the DisplaySSIDInformationElement( ) routine as described in detail by the flowchart of FIG. 36. The routine proceeds to step 1205 to execute the DisplaySupportedRatesInformationElement( ) routine as described in detail by the flowchart of FIG. 37. The routine then proceeds to step 1206 to determine if there is an unknown information element at the end of the frame. If "Yes", then it proceeds to step 1207 to execute the DisplayUnknownInformationElement( ) routine as described in detail by the flowchart of FIG. 38. The DisplayReassociationRequestFrameDetail( ) routine terminates at step 1208. Display of a typical "Ressociation Request" frame body is shown in FIG. 54.

Figure 13:
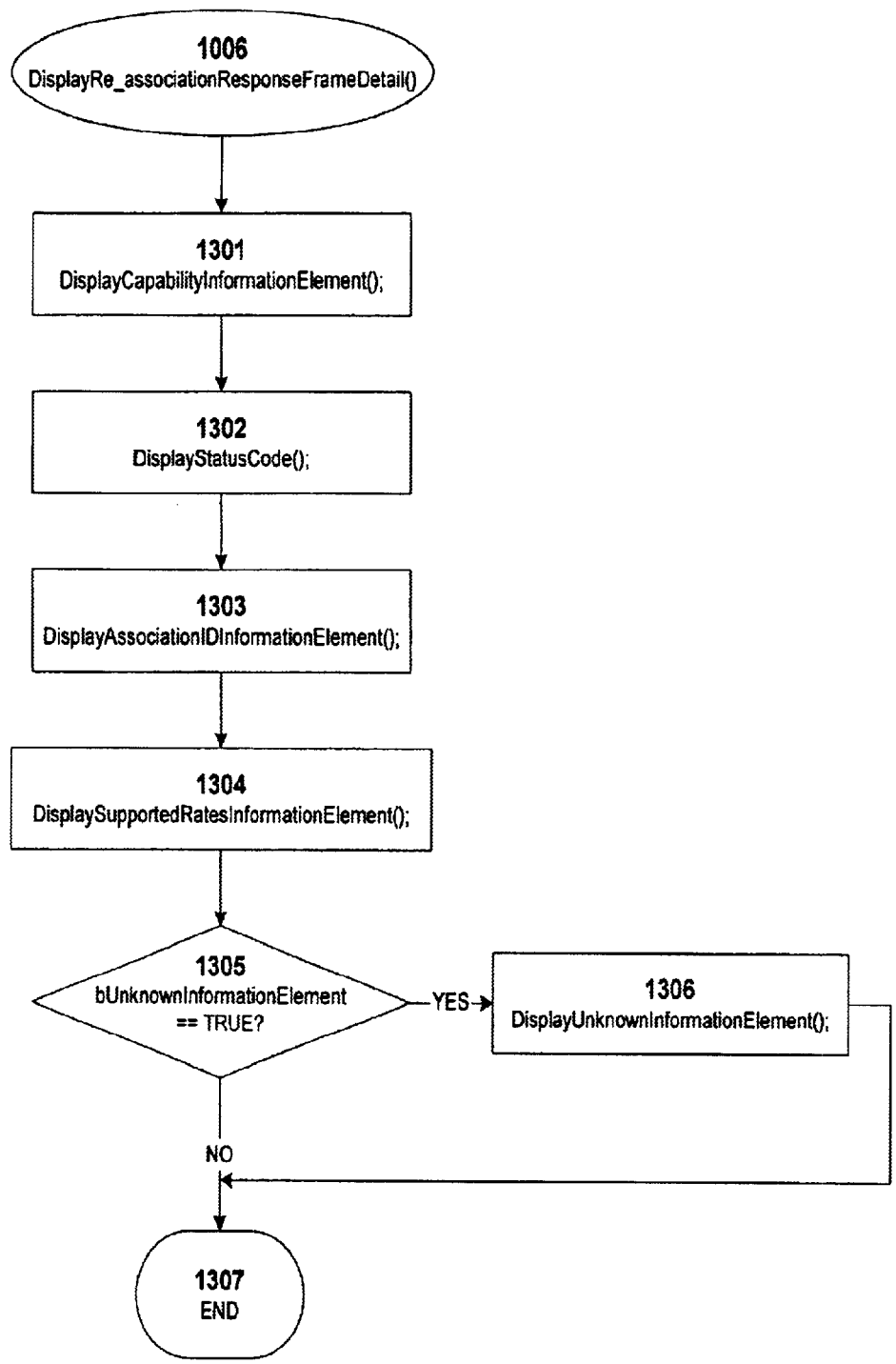
FIG. 13 shows the flowchart of a routine for formatting and displaying in detail the contents of Association Response and Reassociation Response frames associated with the decoding routine of the present invention.
Figure 55:
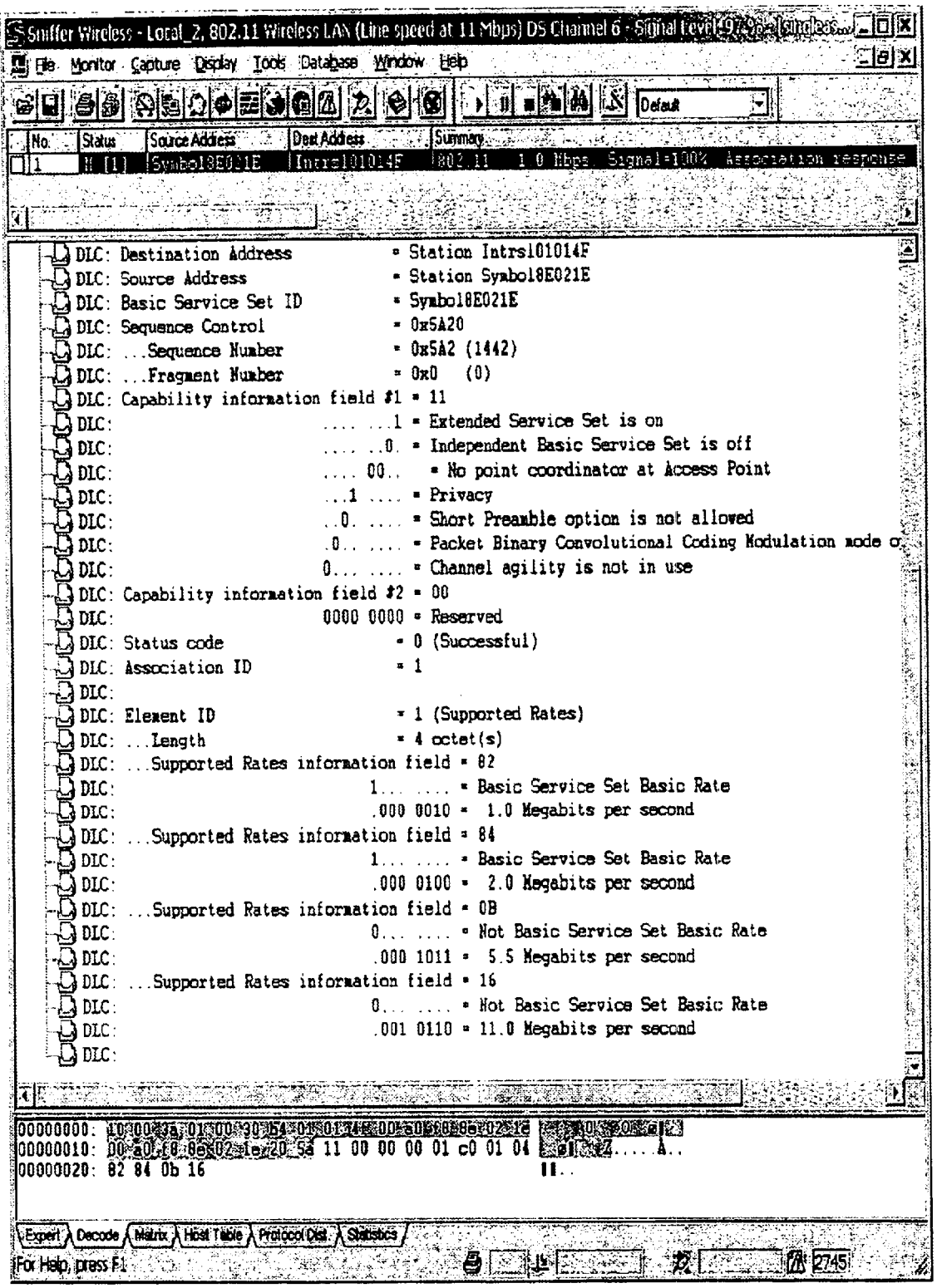

With reference to FIG. 13, the program executes the DisplayRe_associationResponseFrameDetail( ) routine (step 1006 of FIG. 10) as denoted by the steps 1301 to 1307. The role of this routine is to decode and display the information contained in the frame body field 24 of the "Association Response" and "Reassociation Response" management frame subtypes. Upon initiation of step 1006, the DisplayRe_AssociationResponseFrameDetail( ) routine is activated. The routine then proceeds to step 1301 to execute the DisplayCapabilityInformationElement( ) routine as described in detail by the flowchart of FIG. 35. It then proceeds to step 1302 to display the contents of the "Status Code" field 4506. The status code field is 2 octets in length. The routine displays the status code according to the code values shown in Table 3. The routine then proceeds to step 1303, where it displays the contents of the "Association ID" field 4504 as an unsigned integer of 2 octets in length at step. The two most significant bits of the association ID field 4504 must be set to ones. The association ID should be between 1 and 2007. The routine then proceeds to step 1304 to execute the DisplaySupportedRatesInformationElement( ) routine as described in detail by the flowchart of FIG. 37. The routine then proceeds to step 1305 to determine if there is an unknown information element at the end of the frame. If "Yes", then it proceeds to step 1306 to execute the DisplayUnknownInformationElement( ) routine as described in detail by the flowchart of FIG. 38. The DisplayRe_associationResponseFrameDetail( ) routine terminates at step 1307, from Step 1306, or from Step 1305 if "No." Display of a typical "Association Response" frame body is shown in FIG. 55.

Figure 14:
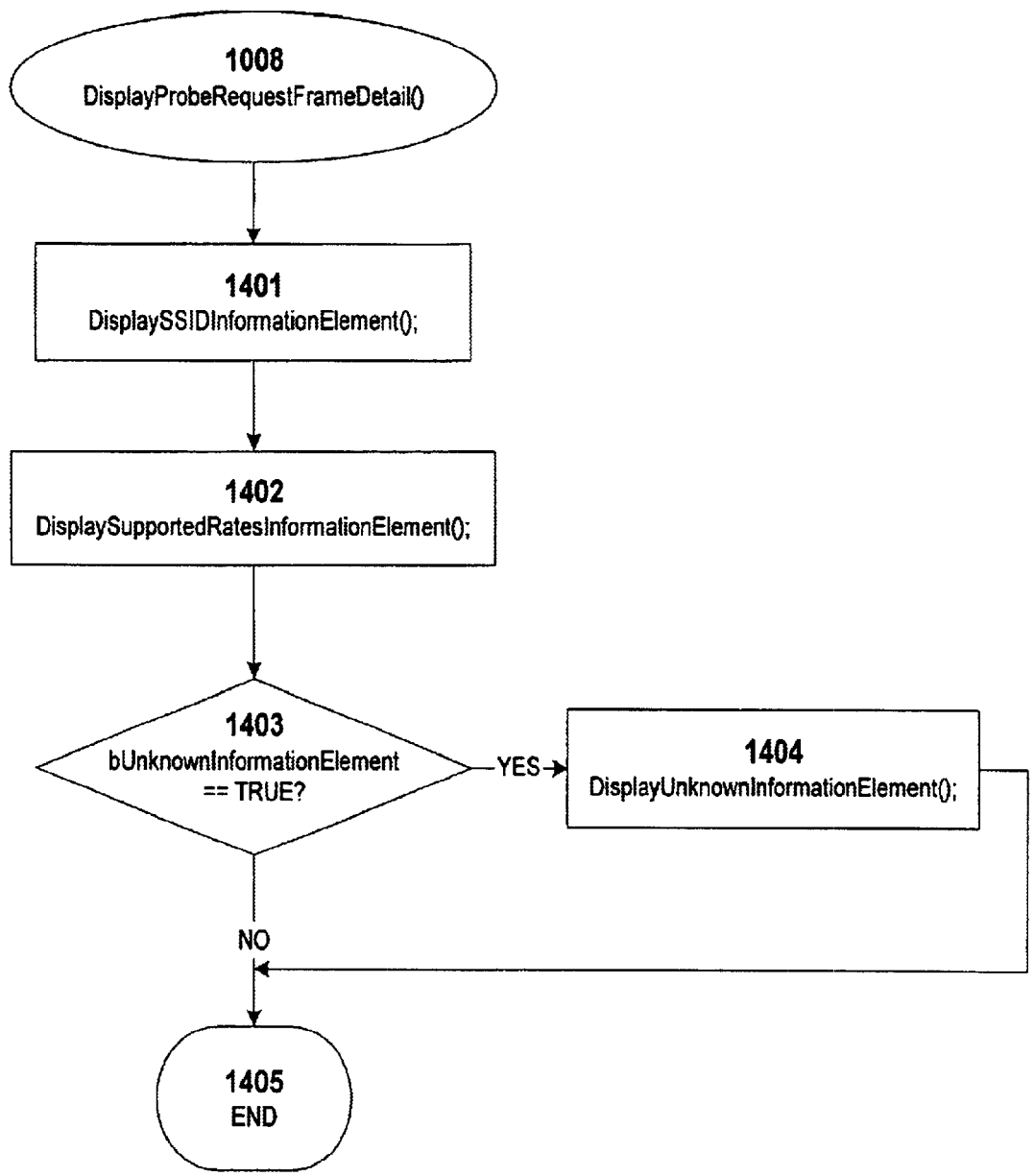
FIG. 14 shows the flowchart of a routine for formatting and displaying in detail the contents of Probe Request frames associated with the decoding routine of the present invention.
Figure 56:
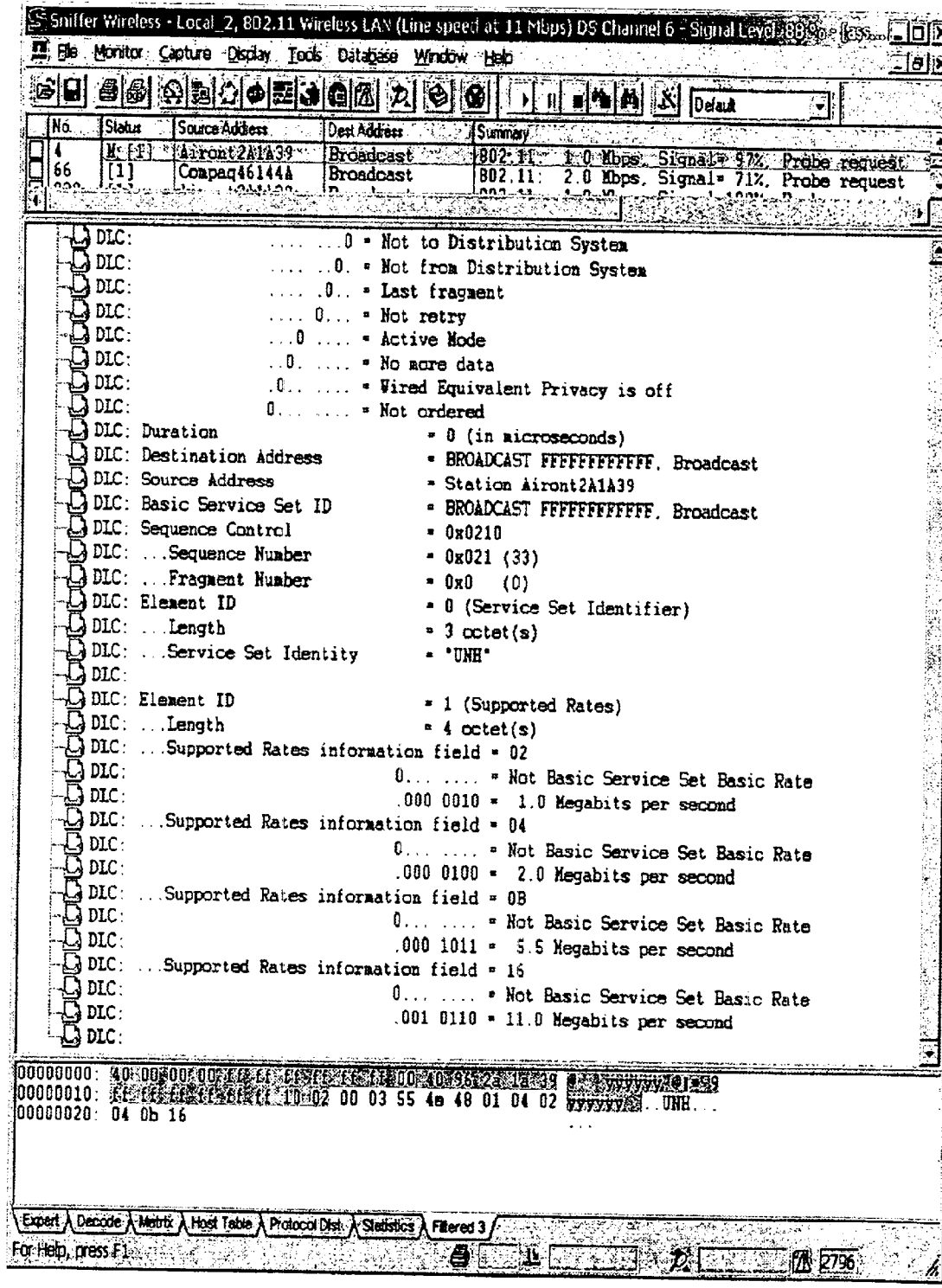

With reference to FIG. 14, the program executes the DisplayProbeRequestFrameDetail( ) routine (step 1008 of FIG. 10) as denoted by the steps 1401 to 1405. The role of this routine is to decode and display the information contained in the frame body field 24 of the "Probe Request" management frame subtype. Upon initiation of step 1008, the DisplayProbeRequestFrameDetail( ) routine is activated. The routine then proceeds to step 1401 to execute the DisplaySSIDInformationElement( ) routine as described in detail by the flowchart of FIG. 36. It then proceeds to step 1402 to execute the DisplaySupportedRatesInformationElement( ) routine as described in detail by the flowchart of FIG. 37. The routine then proceeds to step 1403 to determine if there is an unknown information element at the end of the frame. If "Yes", then it proceeds to step 1404 to execute the DisplayUnknownInformationElement( ) routine as described in detail by the flowchart of FIG. 38. The DisplayProbeRequestFrameDetail( ) routine terminates at step 1405 from Step 1404, or from Step 1403 if "No." Display of a typical "Probe Request" frame body is shown in FIG. 56.

TABLE 3

Status codes

| Status code | Meaning |
|---|---|
| 0 | Successful |
| 1 | Unspecified failure |
| 2–9 | Reserved |
| 10 | Cannot support all requested capabilities in the Capability Information Field |
| 11 | Reassocitaion denied due to inability to confirm that association exists |
| 12 | Association denied due to reason outside of IEEE802.11 standard |
| 13 | Responding station does not support the specified authentication algorithm |
| 14 | Received an Authentication frame with authentication transaction sequence number out of expected sequence |
| 15 | Authentication rejected because of challenge failure |
| 16 | Authentication rejected due to timeout waiting for next frame in sequence |
| 17 | Association denied because Access Point is unable to handle additional associated stations |
| 18 | Association denied due to requesting station not supporting all of the data rates in the Basic Service Set Basic Rate Set. |
| 19 | Association denied due to requesting station not supporting Short Preamble option |
| 20 | Association denied due to requesting station not supporting PBCC Modulation option |
| 21 | Association denied due to requesting station not supporting Channel Agility option |
| 22–65535 | Reserved |

Figure 15:
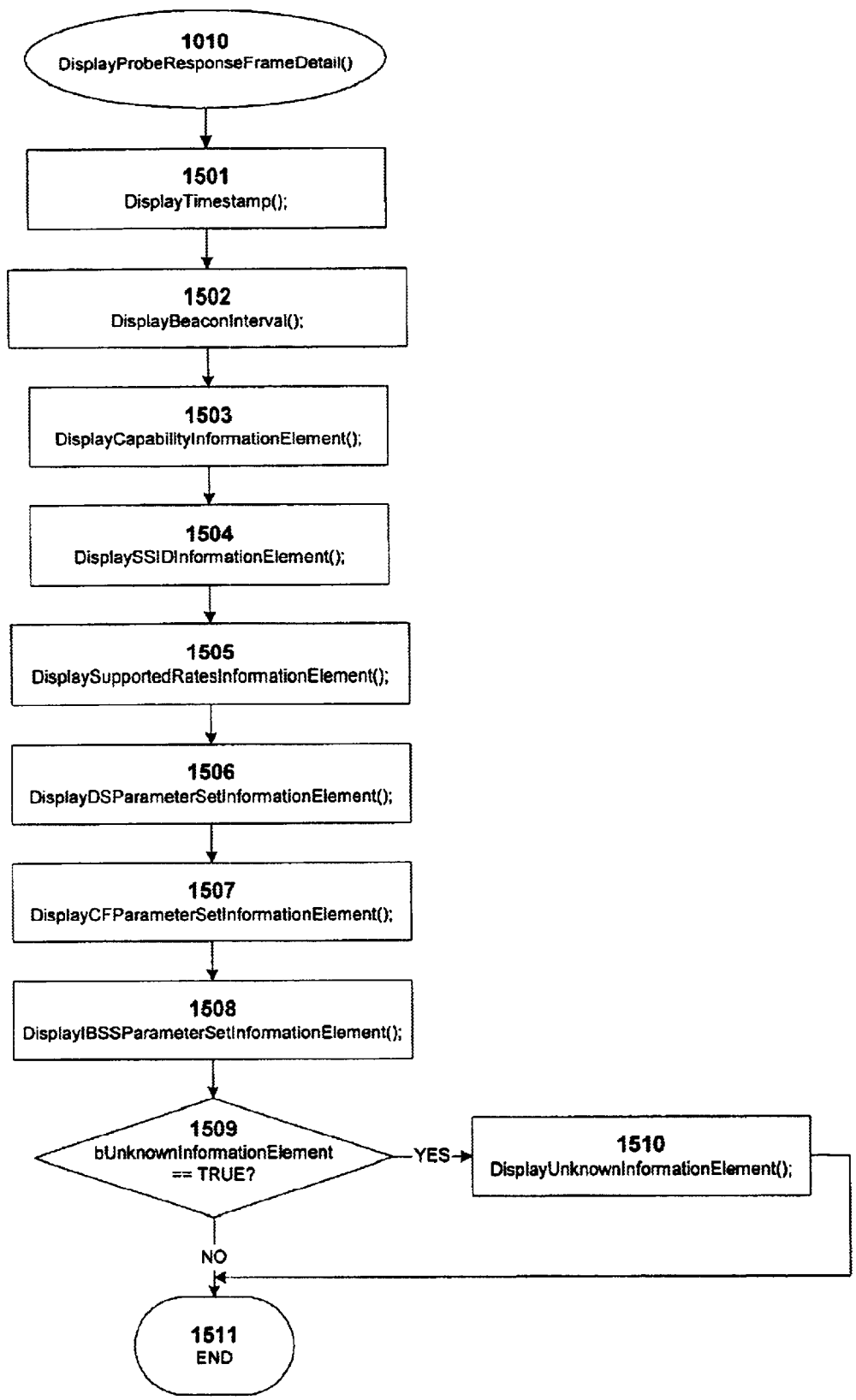
FIG. 15 shows the flowchart of a routine for formatting and displaying in detail the contents of Probe Response frames associated with the decoding routine of the present invention.
Figure 57:
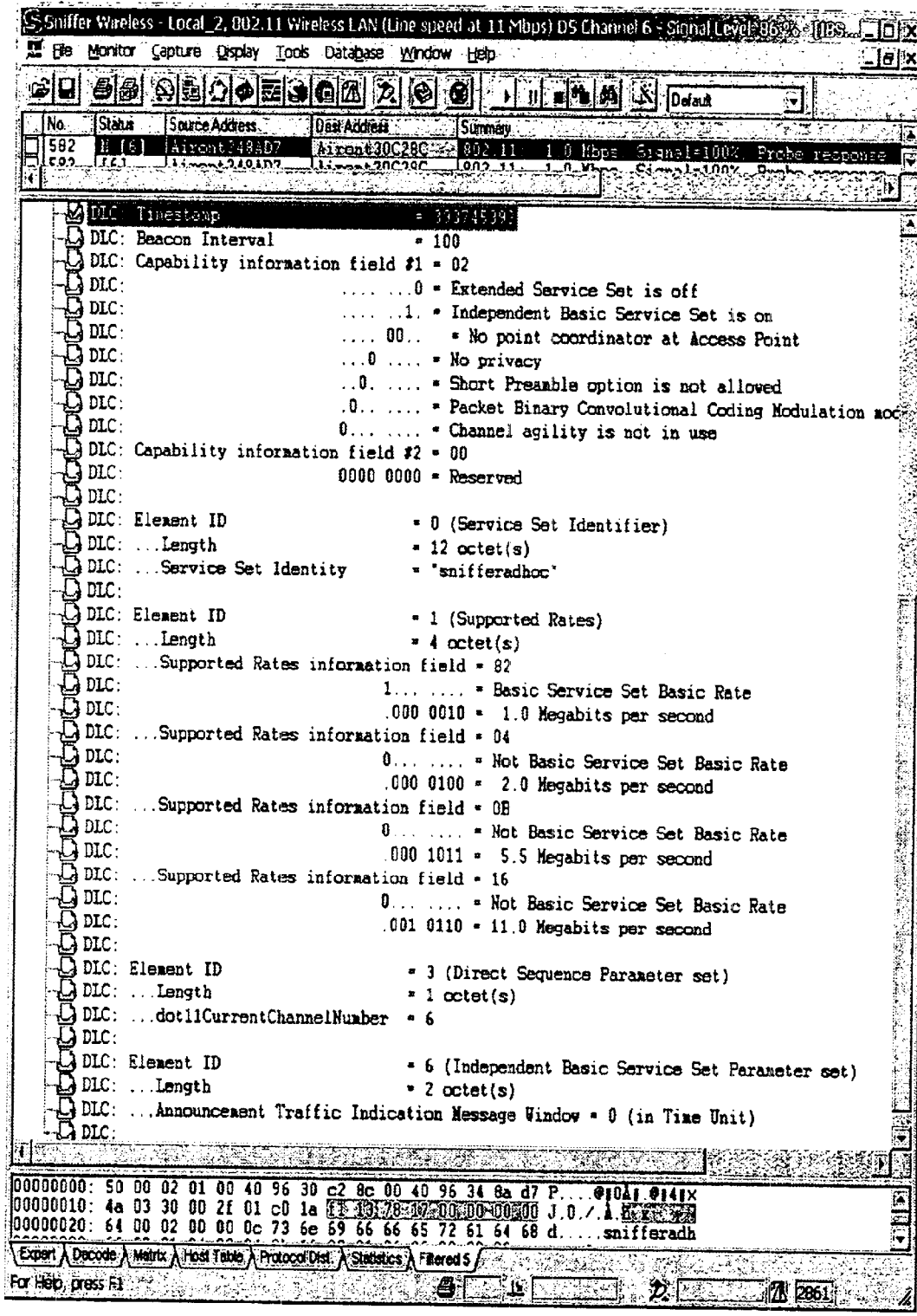

With reference to FIG. 15, the program executes the DisplayProbeResponseFrameDetail( ) routine (step 1010 of FIG. 10) as denoted by the steps 1501 to 1511. The role of this routine is to decode and display the information contained in the frame body field 24 of the "Probe Response" management frame subtype. Upon initiation of step 1010, the DisplayProbeResponseFrameDetail( ) routine is activated. The routine then proceeds to step 1501 to display the "Timestamp" field 4602 of FIG. 46A. The "Timestamp" field 4602 is 8 octets long. The routine treats the time stamp number as an 8 octet unsigned little endian integer. It then proceeds to step 1502 to display the "Beacon Interval" field 4406. The "Beacon Interval" field is 2 octets long. It represents the number of time units between target beacon transmission times. The routine then proceeds to step 1503, where it executes the DisplayCapabilityInformationElement( ) routine as described in detail by the flowchart of FIG. 35. It then proceeds to step 1504 to execute the DisplaySSIDInformationElement( ) routine as described in detail by the flowchart of FIG. 36. It then proceeds to step 1505 to execute the DisplaySupportedRatesInformationElement( ) routine as described in detail by the flowchart of FIG. 37. The routine proceeds to step 1506 to execute the DisplayDSParameterSetInformationElement( ) routine as described in detail by the flowchart of FIG. 39. If the frame contains a "CF Parameter Set" information element as transmitted by Access Points supporting a Point Coordination Function, the routine then proceeds to step 1507 to execute the DisplayDSParameterSetInformationElement( ) routine as described in detail by the flowchart of FIG. 40. The next element in the probe response frame is the "Independent Basic Service Set (IBSS) parameter set" if the sending station is operating in an Independent Basic Service Set. The routine then executes the DisplayIBSSParameterSetInformationElement( ) routine at step 1508 as described in detail by the flowchart of FIG. 41. The routine then proceeds to step 1509 to determine if there is an unknown information element at the end of the frame. If "Yes", then it proceeds to step 1510 to execute the DisplayUnknownInformationElement( ) routine as described in detail by the flowchart of FIG. 38. The DisplayProbeResponseFrameDetail( ) routine terminates at step 1511 from Step 1510, or from Step 1509 if "No." Display of a typical "Probe Response" frame body is shown in FIG. 57.

Figure 16:
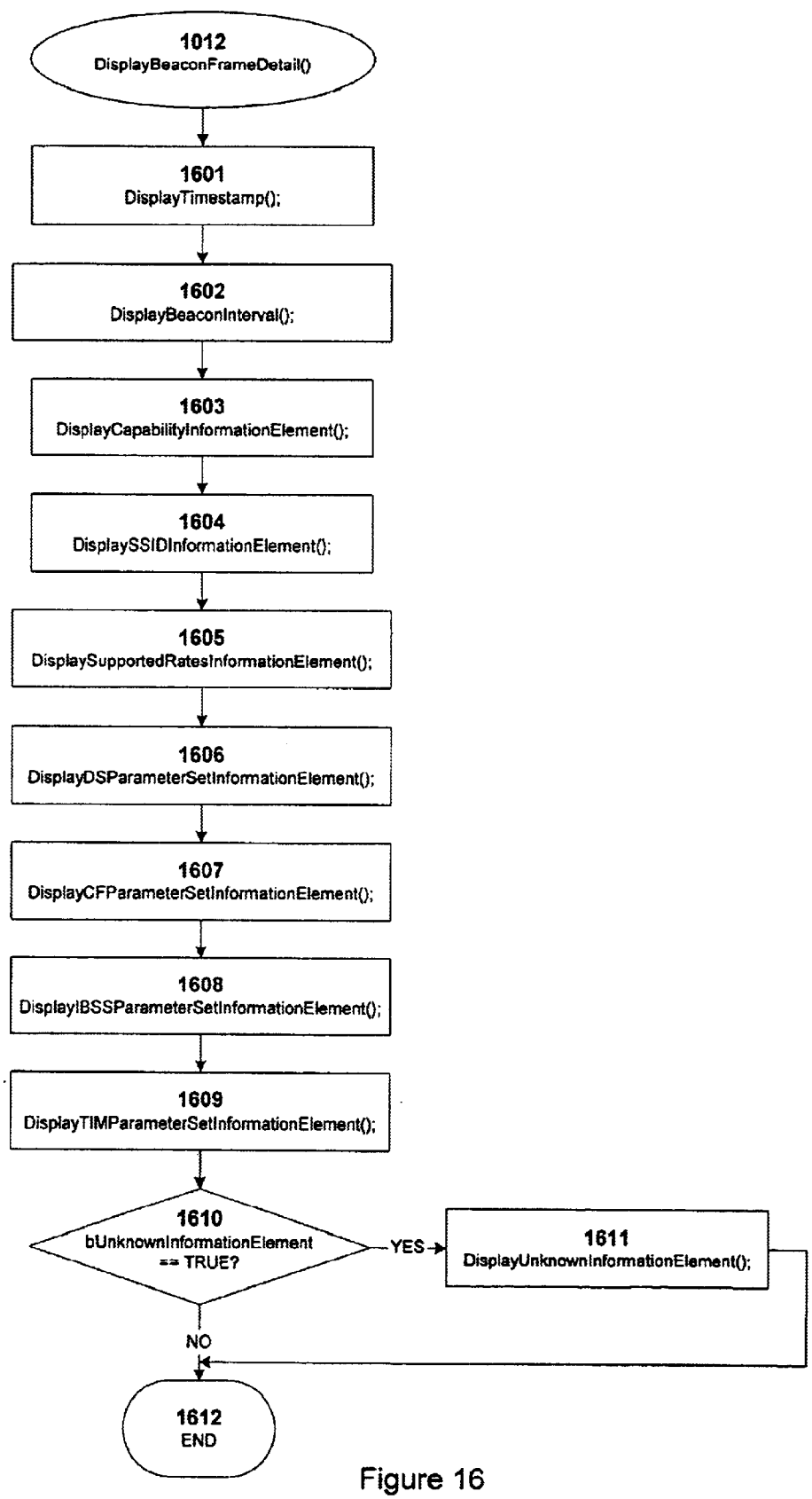
FIG. 16 shows the flowchart of a routine for formatting and displaying in detail the contents of Beacon frames associated with the decoding routine of the present invention.
Figure 58:
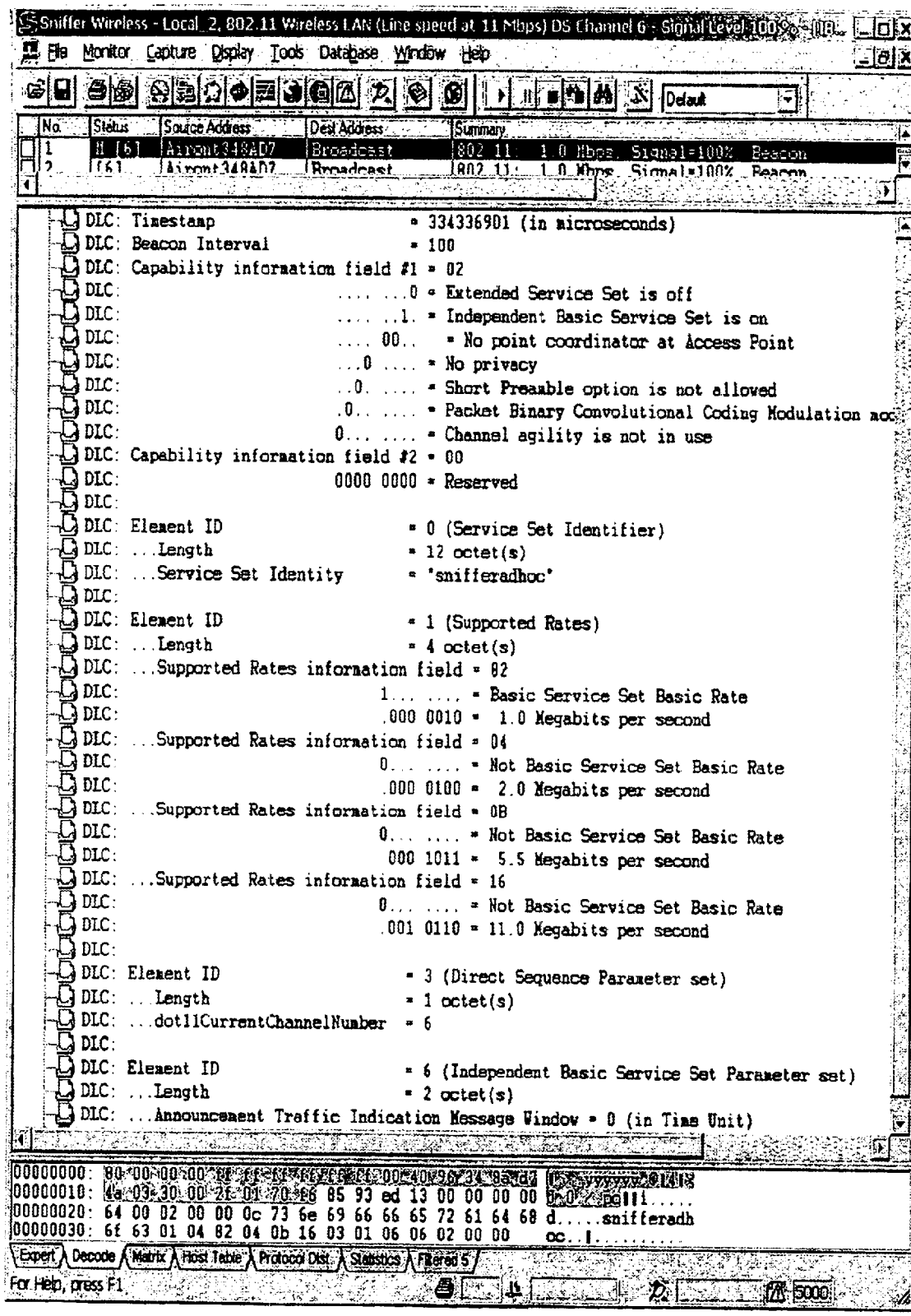

With reference to FIG. 16, the program executes the DisplayBeaconFrameDetail( ) routine (step 1012 of FIG. 10) as denoted by the steps 1601 to 16412. The role of this routine is to decode and display the information contained in the frame body field 24 of the "Beacon" management frame subtype. Upon initiation of step 1012, the DisplayBeaconFrameDetail( ) routine is activated. The routine then proceeds to step 1601 to display the "Timestamp" field 4602 of FIG. 46A. The "Timestamp" field 4602 is 8 octets long. The routine treats the time stamp number as an 8 octet unsigned little endian integer. It then proceeds to step 1602 to display the "Beacon Interval" field 4406. The "Beacon Interval" field is 2 octets long. It represents the number of time units between target beacon transmission times. The routine then proceeds to step 1603, where it executes the DisplayCapabilityInformationElement( ) routine as described in detail by the flowchart of FIG. 35. It then proceeds to step 1604 to execute the DisplaySSIDInformationElement( ) routine as described in detail by the flowchart of FIG. 36. It then proceeds to step 1605 to execute the DisplaySupportedRatesInformationElement( ) routine as described in detail by the flowchart of FIG. 37. The routine proceeds to step 1606 to execute the DisplayDSParameterSetInformationElement( ) routine as described in detail by the flowchart of FIG. 39. If the frame contains a "CF Parameter Set" information element as transmitted by Access Points supporting a Point Coordination Function, the routine then proceeds to step 1607 to execute the DisplayCFParameterSetInformationElement( ) routine as described in detail by the flowchart of FIG. 40. The next element in the beacon frame is the "Independent Basic Service Set (IBSS) parameter set" if the sending station is operating in an Independent Basic Service Set. The routine then executes the DisplayIBSSParameterSetInformationElement( ) routine at step 1608 as described in detail by the flowchart of FIG. 41. The routine proceeds to step 1609 to execute the DisplayTIMParameterSetInformationElement( ) routine as described in detail by the flowchart of FIG. 42. The routine then proceeds to step 1610 to determine if there is an unknown information element at the end of the frame. If "Yes", then it proceeds to step 1611 to execute the DisplayUnknownInformationElement( ) routine as described in detail by the flowchart of FIG. 38. The DisplayBeaconFrameDetail( ) routine terminates at step 1612 from Step 1611, or from Step 1610 if "No." Display of a typical "Beacon" frame body is shown in FIG. 58.

Figure 17:
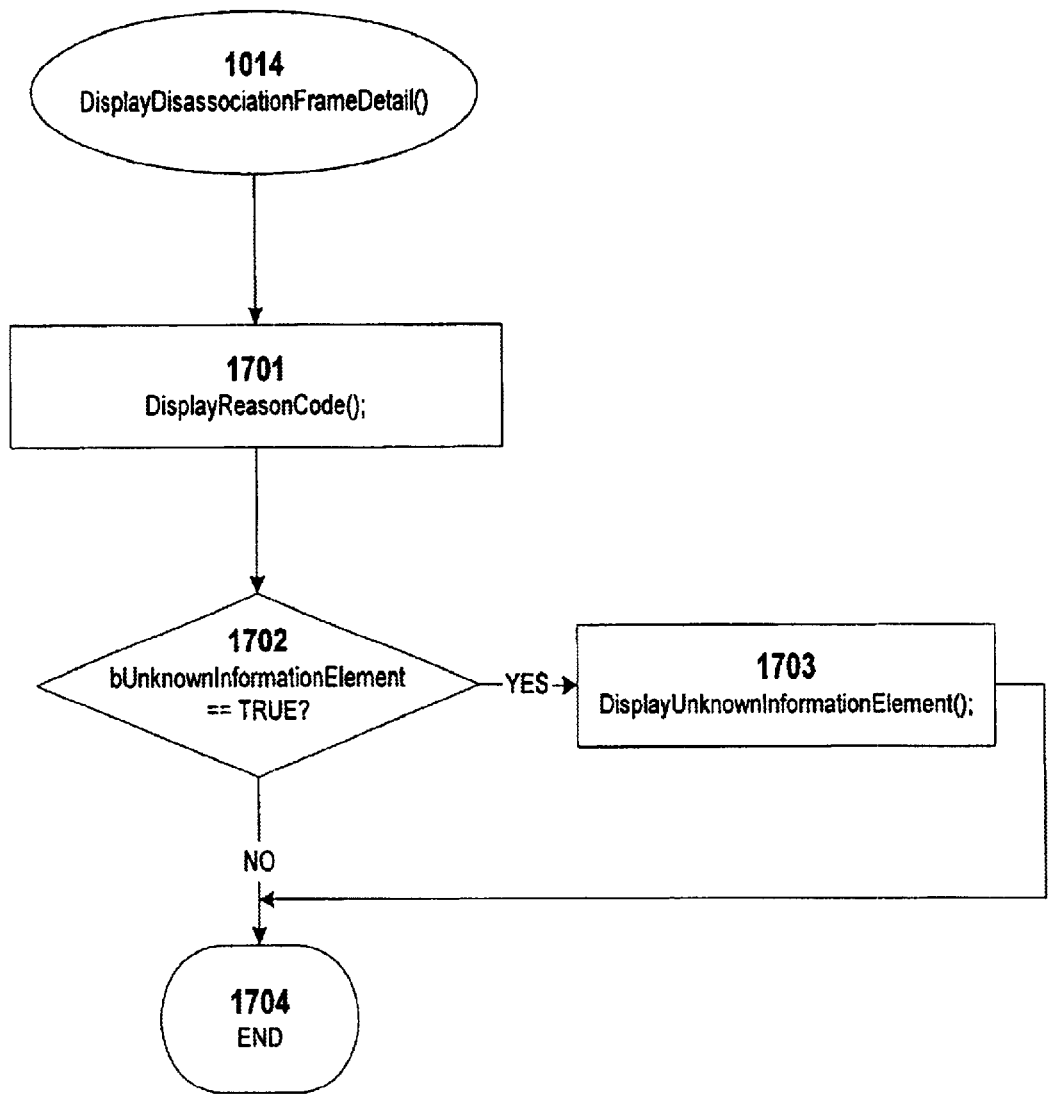
FIG. 17 shows the flowchart of a routine for formatting and displaying in detail the contents of Disassociation frames associated with the decoding routine of the present invention.
Figure 59:
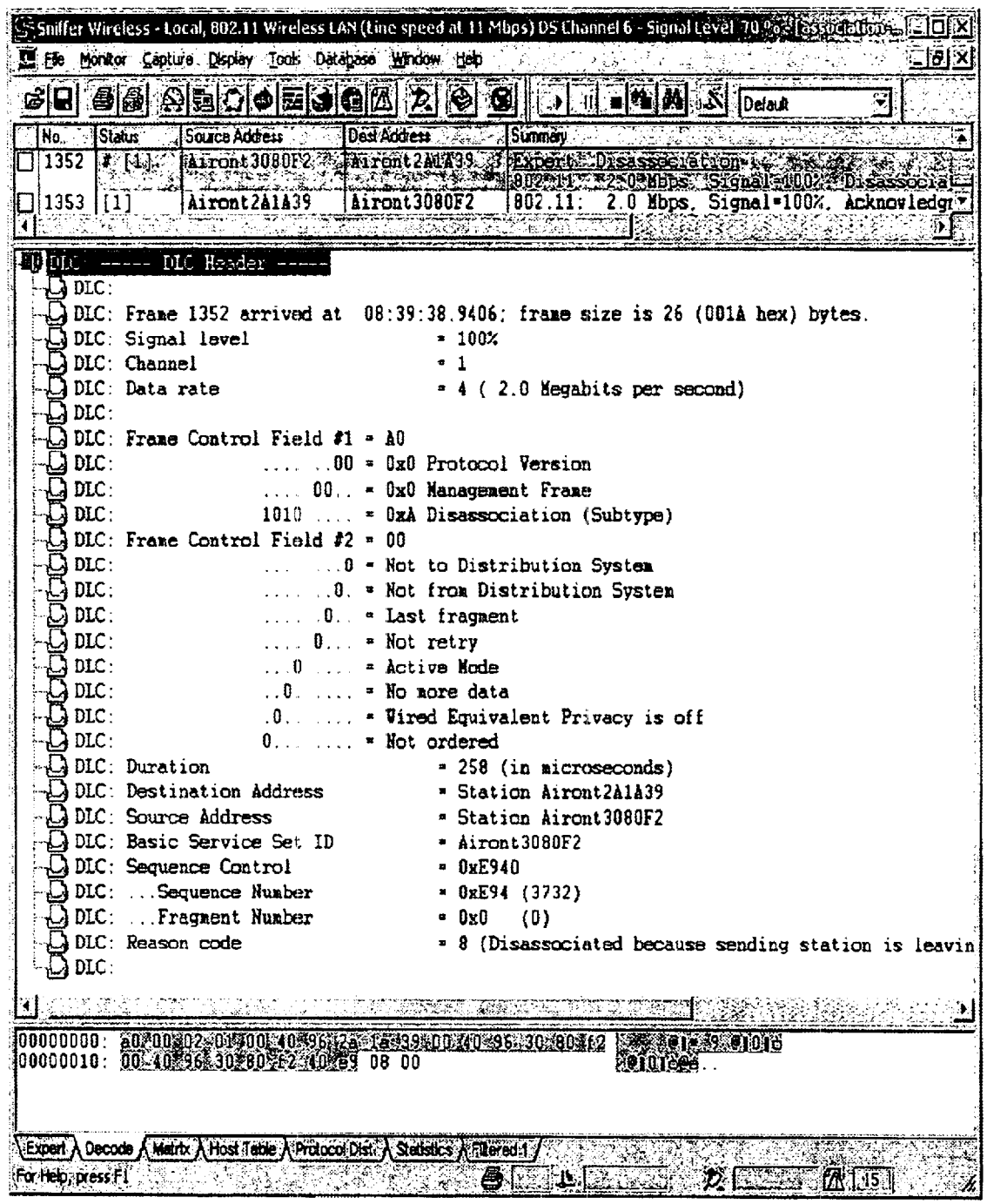

With reference to FIG. 17, the program executes the DisplayDisassociationFrameDetail( ) routine (step 1014 of FIG. 10) as denoted by the steps 1701 to 1704. The role of this routine is to decode and display the information contained in the frame body field 24 of the "Disassociation" management frame subtype. Upon initiation of step 1014, the DisplayDisassociationFrameDetail( ) routine is activated. The routine then proceeds to step 1701 to display the contents of the "Reason Code" field 4502. The Reason Code is an unsigned number that is 2 octets long. The routine displays a message corresponding to the "Reason Code" field 4502 according to the values listed in Table 4. The routine then proceeds to step 1702 to determine if there is an unknown information element at the end of the frame. If "Yes", then it proceeds to step 1703 to execute the DisplayUnknownInformationElement( ) routine as described in detail by the flowchart of FIG. 38. The DisplayDisassociationFrameDetail( ) routine terminates at step 1704 from Step 1703, or from Step 1702 if "No." Display of a typical "Disassociation" frame body is shown in FIG. 59.

TABLE 4

Reason codes

| Reason code | Meaning |
|---|---|
| 0 | Reserved |
| 1 | Unspecified reason |
| 2 | Previous authentication no longer valid |
| 3 | Deauthenticated because sending station is leaving (or has left) IBSS or ESS |
| 4 | Disassociated due to inactivity |
| 5 | Disassociated because Access Point is unable to handle all currently associated stations |
| 6 | Class 2 frame received from nonauthenticated station |
| 7 | Class 3 frame received from nonassociated station |
| 8 | Disassociated because sending station is leaving (has left) BSS |
| 9 | Station requesting (re)association is not authenticated with responding station |
| 10–65535 | Reserved |

Figure 18:
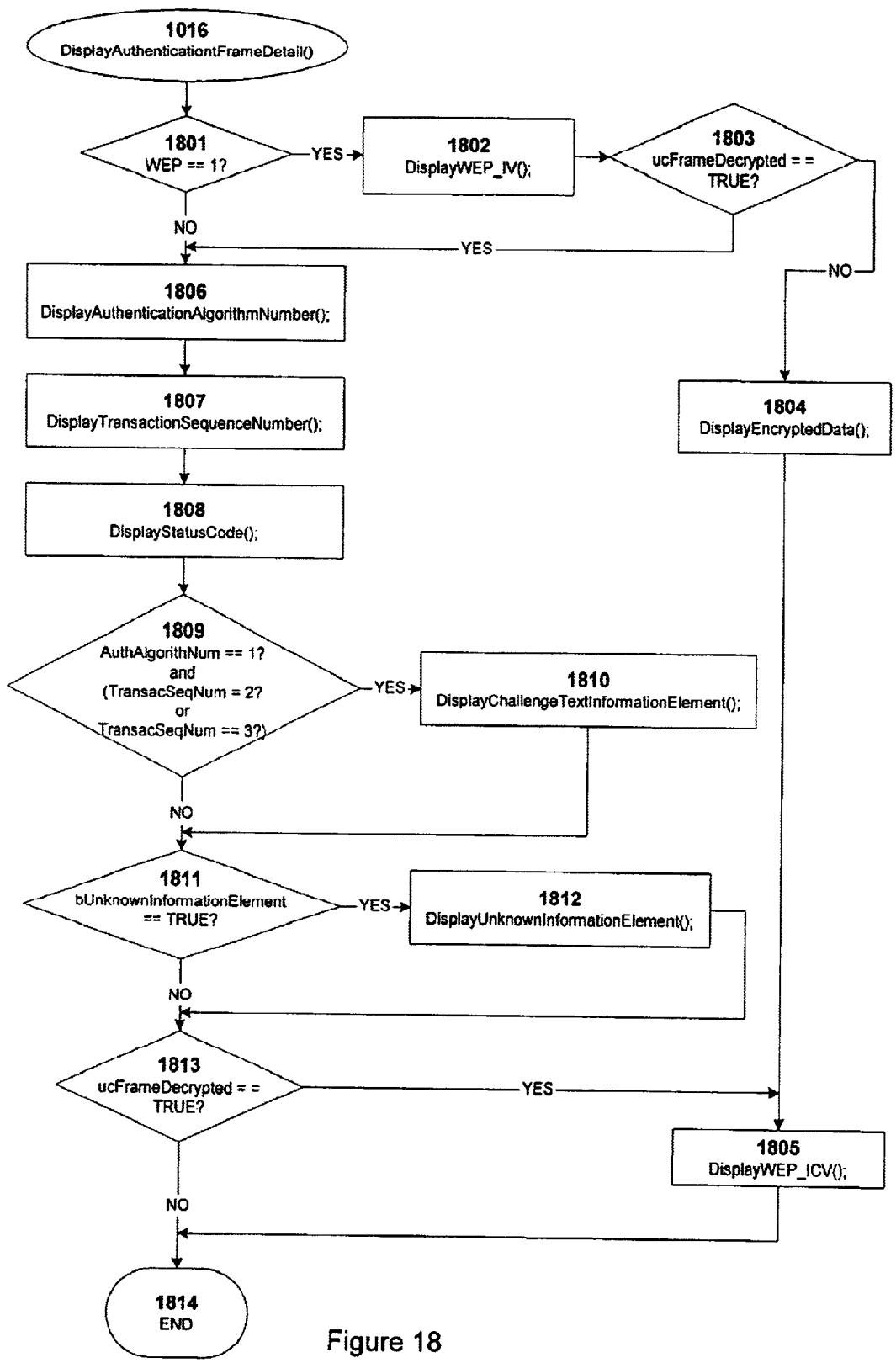
FIG. 18 shows the flowchart of a routine for formatting and displaying in detail the contents of Authentication frames associated with the decoding routine of the present invention.
Figure 60:
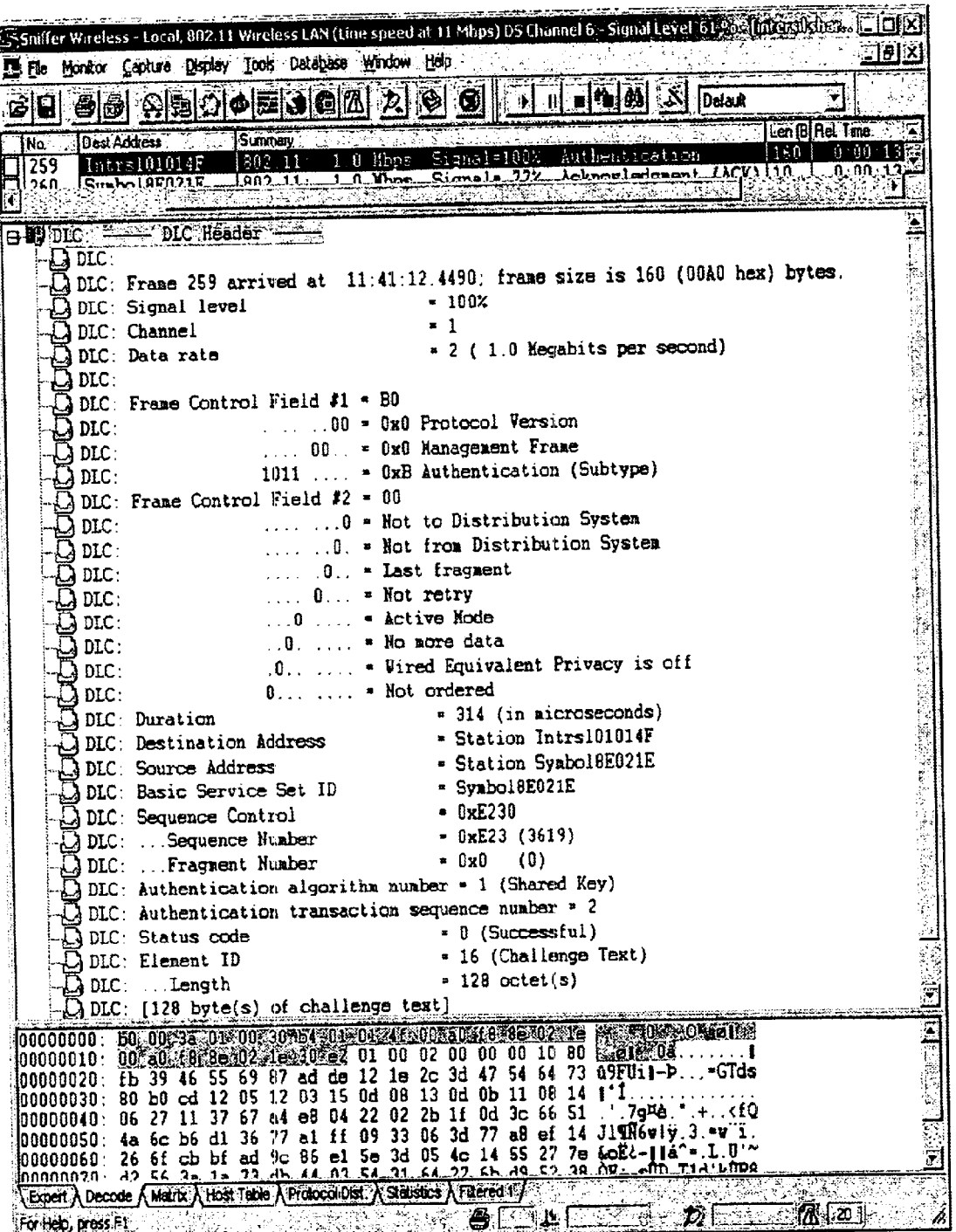
Figure 61:
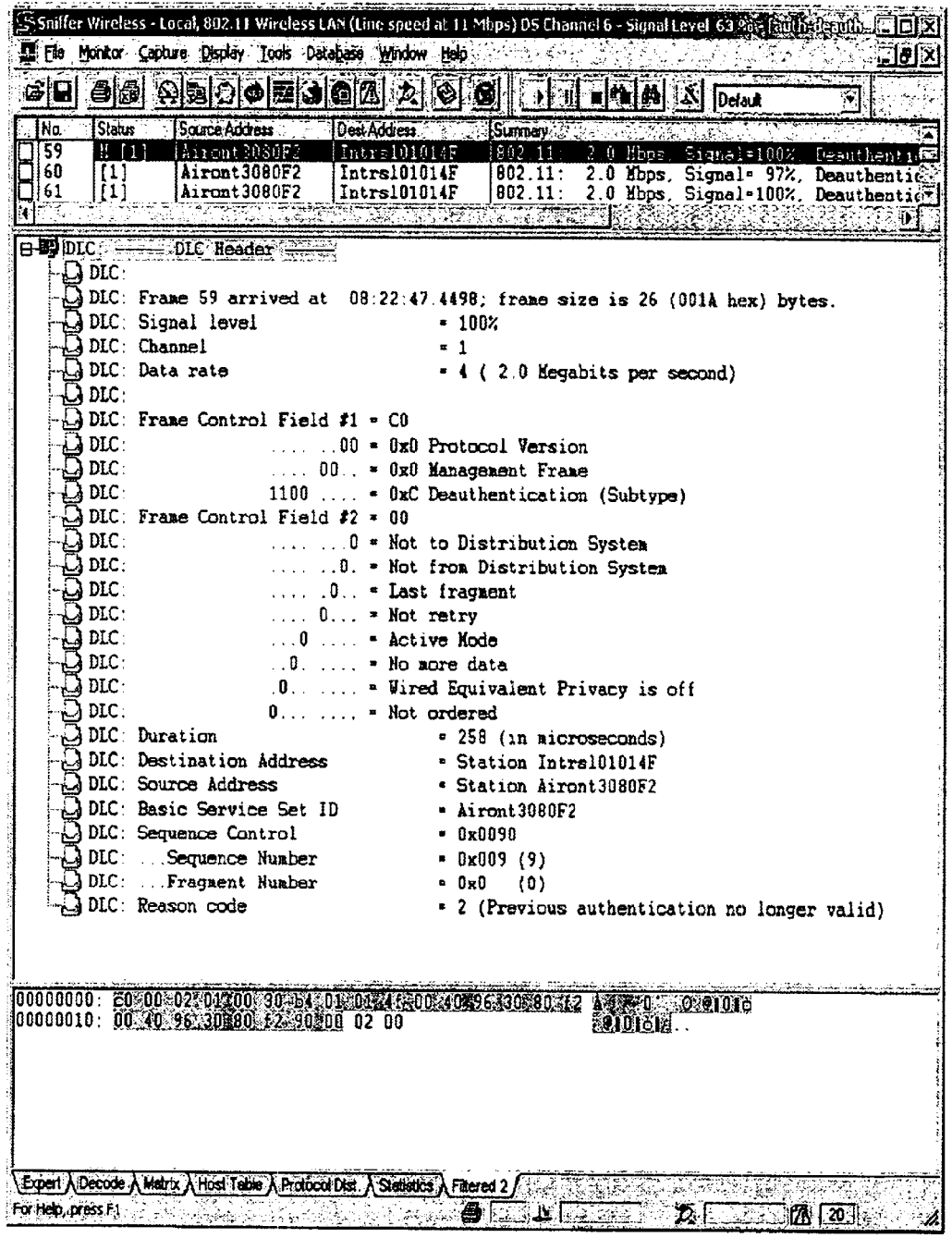

With reference to FIG. 18, the program executes the DisplayAuthenticationFrameDetail( ) routine (step 1016 of FIG. 10) as denoted by the steps 1801 to 1814. The role of this routine is to decode and display the information contained in the frame body field 24 of the "Authentication" management frame subtype. Upon initiation of step 1016, the DisplayAuthenticationFrameDetail( ) routine is activated. The routine then proceeds to step 1801 to determine if the "WEP" bit field 60 is set to one. If "Yes", the frame is originally encrypted and the routine proceeds to step 1802 to display the contents of the WEP-IV field 66 (See FIG. 2C) of length 4 octets. The first three octets contain the initialization vector for the decoding engine. The two most significant bits of the last octet holds the key number used to encrypt the data. The remaining bits of the last octet are reserved for future use. The routine then proceeds to step 1803 to determine if the frame is decrypted. If "No", then the routine proceeds to step 1804 to display the contents of the encrypted data. The routine then proceeds to step 1805 to display the contents of the WEP-ICV field 70. The WEP-ICV field is 4 octets in length and carries the "Integrity Check Value" of the encrypted data. The routine then proceeds to termination step 1814. If the frame is not originally encrypted (step 1801) or the frame is decrypted (step 1803) the routine proceeds to step 1806 to display the contents of the "Authentication Algorithm Number" field 4402. Authentication algorithm number is an unsigned number that is 2 octets long. The current allowed values are 0, which corresponds to Open System Authentication; and 1, which corresponds to Shared Key Authentication. The routine proceeds to step 1807 to display the contents of the "Authentication Transaction Sequence Number" field 4404. The authentication transaction sequence number is an unsigned number that is 2 octets long. This number is used to identify the frame number used in the authentication exchange sequence. It proceeds to step 1808 to display the contents of the "Status Code" field 4506. The status code field is 2 octets in length. The routine displays the status code according to the code values shown in Table 3. The routine proceeds to step 1809 to determine if the "Authentication Algorithm Number" is equal to 1 (Shared key), and the transaction sequence number is either 2 or 3. If "Yes", the routine proceeds to step 1810 to execute the DisplayChallengeTextInformationElement( ) routine as described in detail by the flowchart of FIG. 43. The routine then proceeds to step 1811 to determine if there is an unknown information element at the end of the frame. If "Yes", then it proceeds to step 1812 to execute the DisplayUnknownInformationElement( ) routine as described in detail by the flowchart of FIG. 38. The routine then proceeds to step 1813 to determine if the frame is a decrypted frame. If "Yes", the routine proceeds to step 1805 to display the contents of the WEP-ICV field 70. The DisplayAuthenticationFrameDetail( ) routine terminates at step 1814 either from Step 1805, or from Step 1813 if "No." Authentication frames are exchanged between the stations to authenticate the requesting station by the responding station. The authentication transaction sequence transaction number depends on the frame direction. Display of a typical "Authentication" frame with transaction sequence number 2 is shown in FIG. 60.

Figure 19:
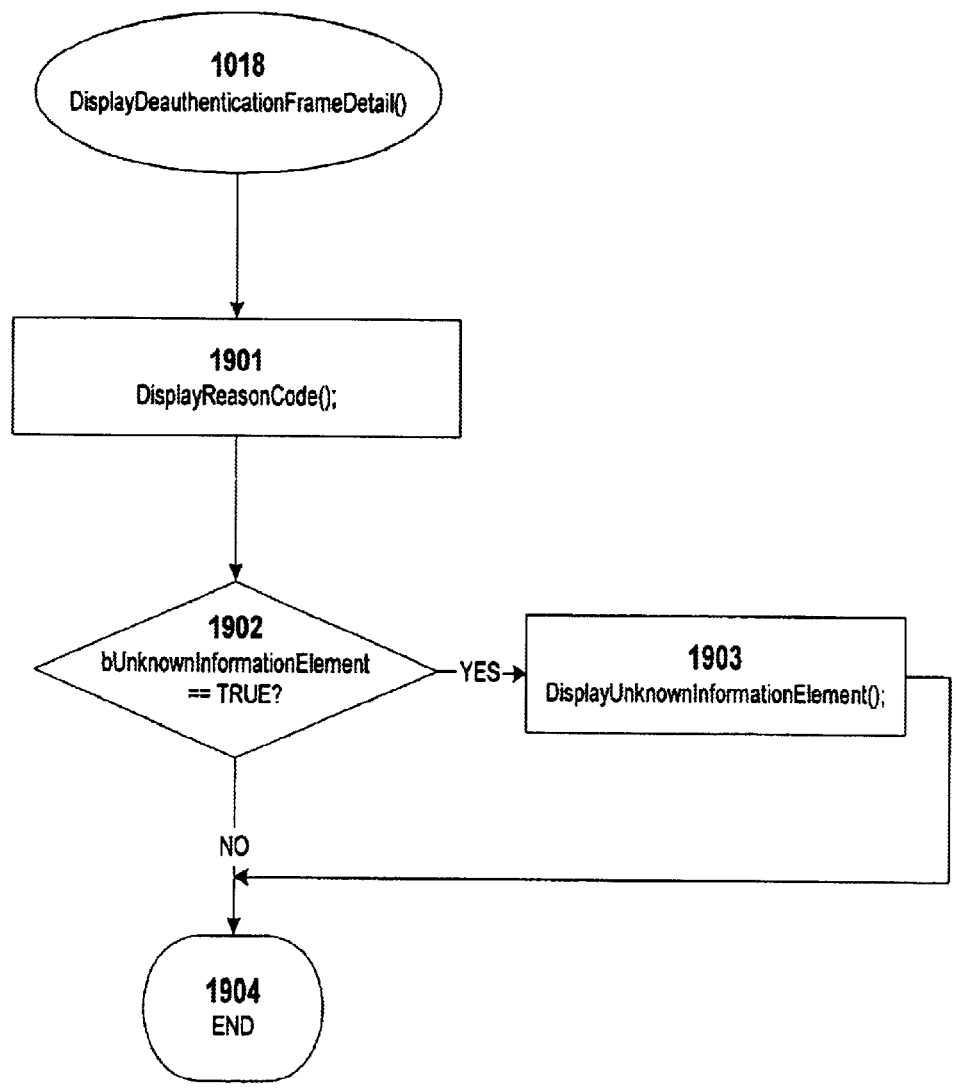
FIG. 19 shows the flowchart of a routine for formatting and displaying in detail the contents of Deauthentication frames associated with the decoding routine of the present invention.
Figure 62:
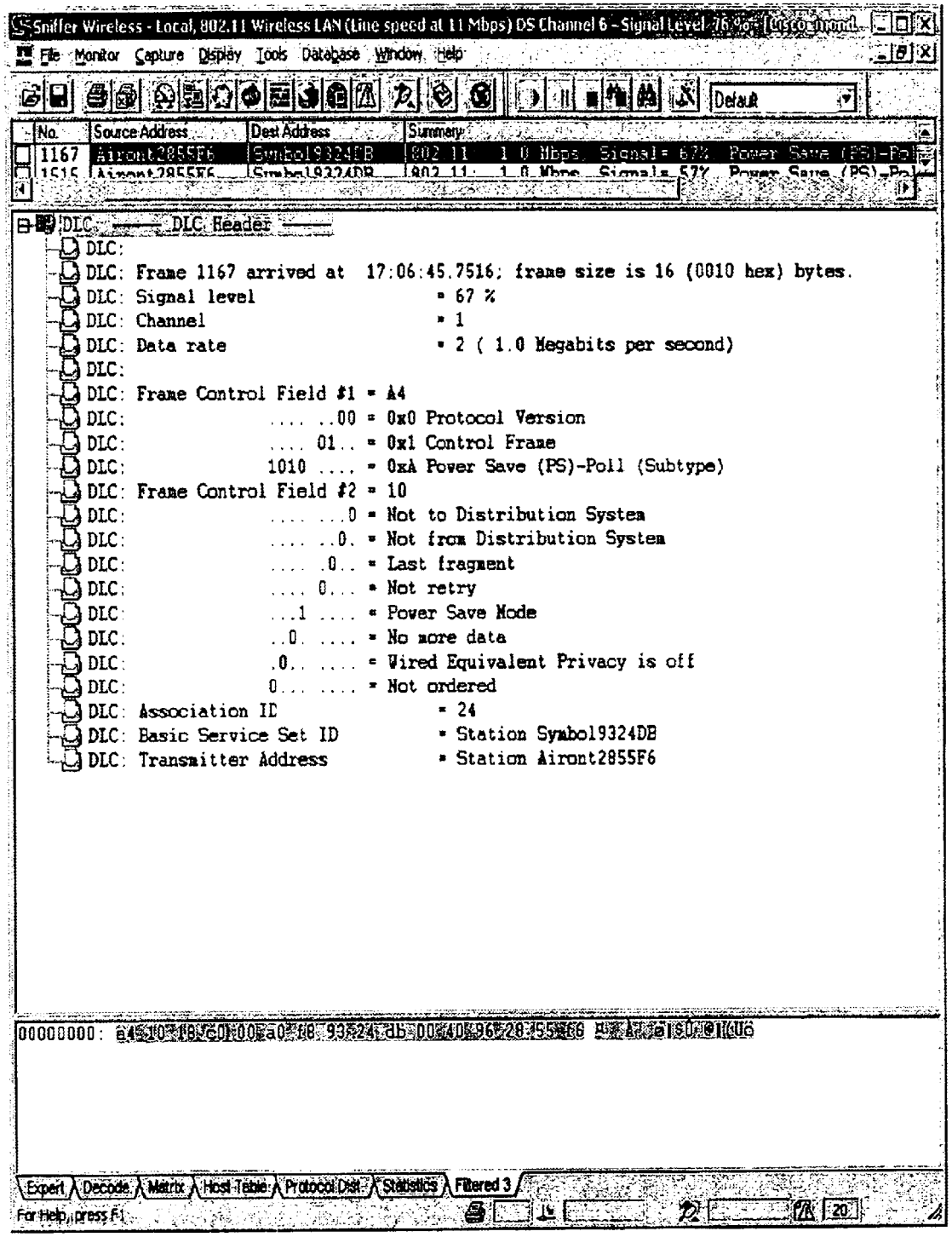

With reference to FIG. 19, the program executes the DisplayDeauthenticationFrameDetail( ) routine (step 1018 of FIG. 10) as denoted by the steps 1901 to 1904. The role of this routine is to decode and display the information contained in the frame body field 24 of the "Deauthentication" management frame subtype. Upon initiation of step 1018, the DisplayDeauthenticationFrameDetail( ) routine is activated. The routine then proceeds to step 1901 to display the contents of the "Reason Code" field 4502. The Reason Code is an unsigned number that is 2 octets long. The routine displays a message corresponding to the "Reason Code" field 4502 according to the values listed in Table 4. The routine then proceeds to step 1902 to determine if there is an unknown information element at the end of the frame. If "Yes", then it proceeds to step 1903 to execute the DisplayUnknownInformationElement( ) routine as described in detail by the flowchart of FIG. 38. The DisplayDeauthenticationFrameDetail( ) routine terminates at step 1904 from step 1903, or from step 1902 if "No". Display of a typical "Deauthentication" frame body is shown in FIG. 62.

Figure 20:
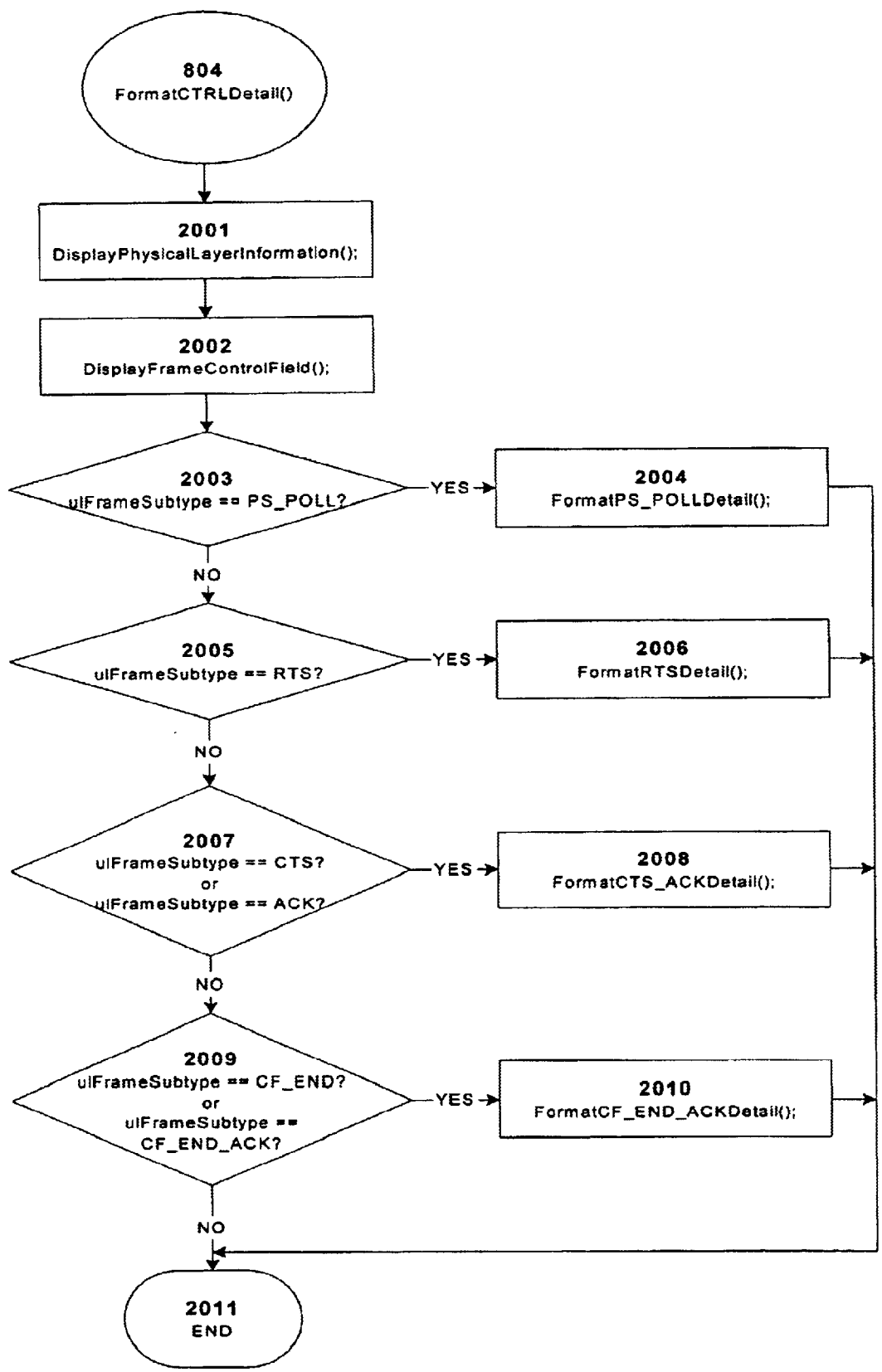
FIG. 20 shows the flowchart of a routine for formatting and displaying in detail the contents of Control frames associated with the decoding routine of the present invention.

With reference to FIG. 20, the program executes the FormatCTRLDetail( ) routine (step 804 of FIG. 8) as denoted by the steps 2001 to 2011. The role of this routine is to decode and display the information contained in the "Control" frame type. Upon initiation of step 804, the FormatCTRLDetail( ) routine is activated. The routine then proceeds to step 2001, where it executes the DisplayPhysicalLayerInformation( ) routine to display the physical layer related information determined by the Network Interface Card (NIC) 81 (see FIG. 1) as described in detail by the flowchart of FIG. 27. The routine proceeds to step 2002 to execute the DisplayFrameControlField( ) routine as described in detail by the flowchart of FIG. 28. It then proceeds to step 2003 to determine if the frame subtype is a "Power Save (PS)-Poll" frame. If "Yes", the routine proceeds to step 2004 to execute the FormatPS_POLLDetail( ) as described in detail by the flowchart of FIG. 21. If "No", the routine then proceeds to step 2005 to determine if the frame subtype is a "Request To Send (RTS)" frame. If "Yes", the routine proceeds to step 2006 to execute the FormatRTSDetail( ) as described in detail by the flowchart of FIG. 22. If the result of step 2005 is "No", the routine proceeds to step 2007 to determine if the frame subtype is either a "Clear To Send (CTS)" or an "Acknowledgement" frame. If "Yes", the routine proceeds to step 2008 to execute the FormatCTS_ACKDetail( )as described in detail by the flowchart of FIG. 23. If the result of step 2007 is "No", the routine then proceeds to step 2009 to determine if the frame subtype is either a "Contention Free (CF)-End" or a "CF-End+CF-Ack" frame. If "Yes", the routine proceeds to step 2010 to execute the FormatCF_END_ACKDetail( ) as described in detail by the flowchart of FIG. 24. The FormnatCTRLDetail( ) routine terminates at step 2011 from Step 2010, or from Step 2009 if "No."

Figure 21:
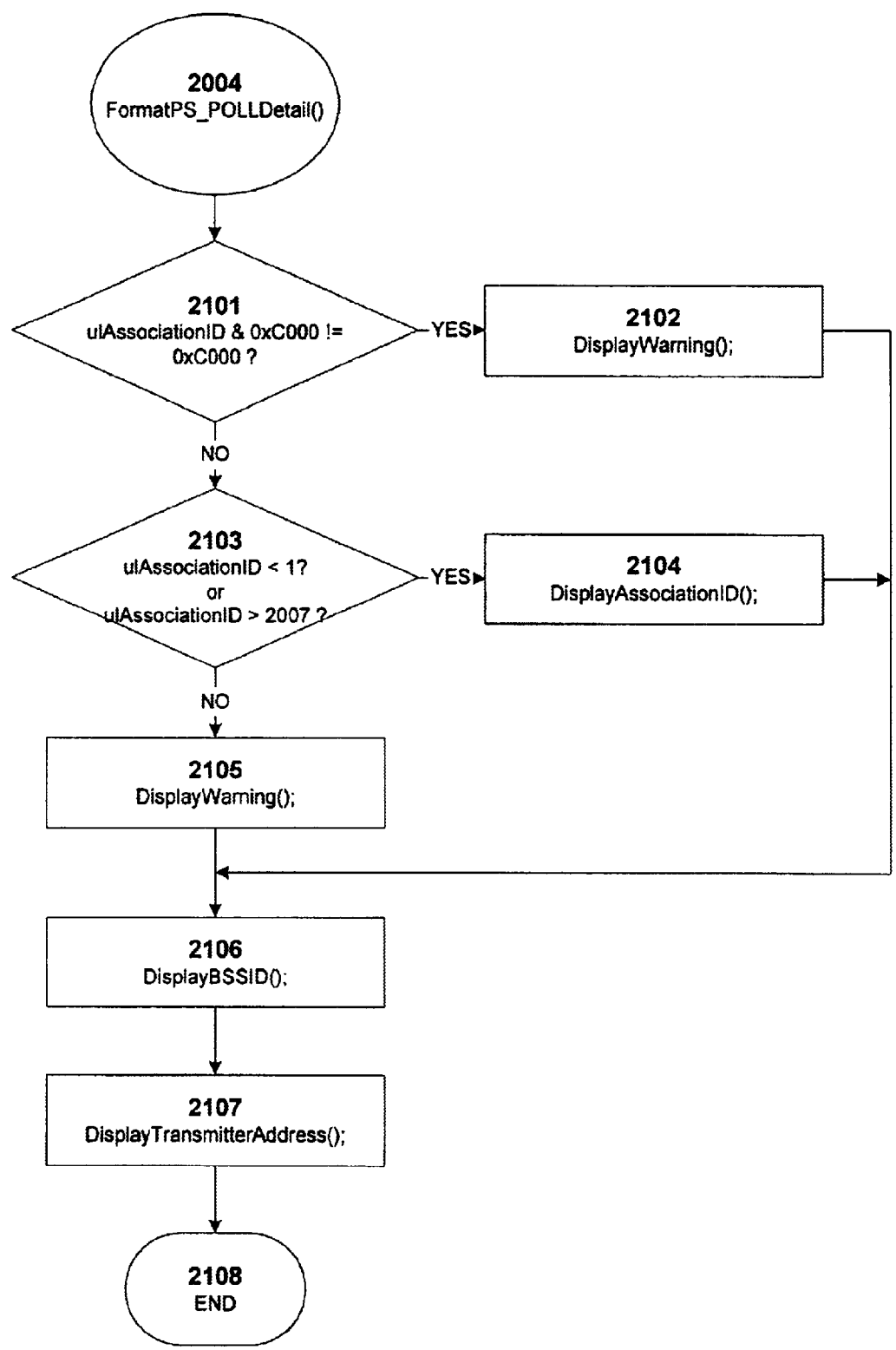
FIG. 21 shows the flowchart of a routine for formatting and displaying in detail the contents of Power Save Poll frames associated with the decoding routine of the present invention.

As shown in FIG. 21, the program executes the FormatPS_POLLDetail( ) subroutine 2004 generally shown in FIG. 20. The task of this routine is to decode and display the information contained in the "Power Save (PS)—Poll" frame. The routine is activated at step 2004, and it proceeds to step 2101 to determine if the two most significant bits of the "Association ID" field 30 are not set to one, because the IEEE802.11 standard requires these bits to be set to one. If "Yes", then the routine proceeds to step 2102 where it displays a warning message "2 MSB bits of Association ID field should be 1". If the result of step 2101 is "No", then it proceeds to step 2103 to check if the 2 octet little endian number in the "Association ID" field 30 is between 1 and 2007. If "Yes", then the routine displays the contents of the "Association ID" field 30 as an unsigned integer of two octets in length at step 2104. If the result of step 2103 is "No", then the routine displays a warning message "Association ID should be in range 1 to 2007" at step 2105. The routine then proceeds to step 2106 to execute the DisplayBSSID( ) routine as described in detail by the flowchart of FIG. 31. It then proceeds to step 2107, where it executes the DisplayTransmitterAddress( ) routine as described in detail by the flowchart of FIG. 33. The FormatPS_POLLDetail( ) routine terminates at step 2108. Display of a typical "Power Save (PS)-Poll" frame is shown in FIG. 62.

Figure 22:
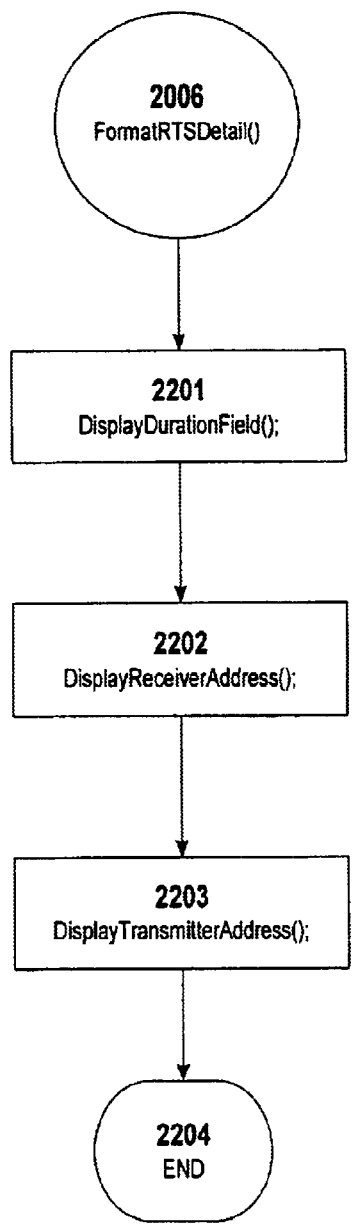
FIG. 22 shows the flowchart of a routine for formatting and displaying in detail the contents of Request To Send frames associated with the decoding routine of the present invention.
Figure 63:
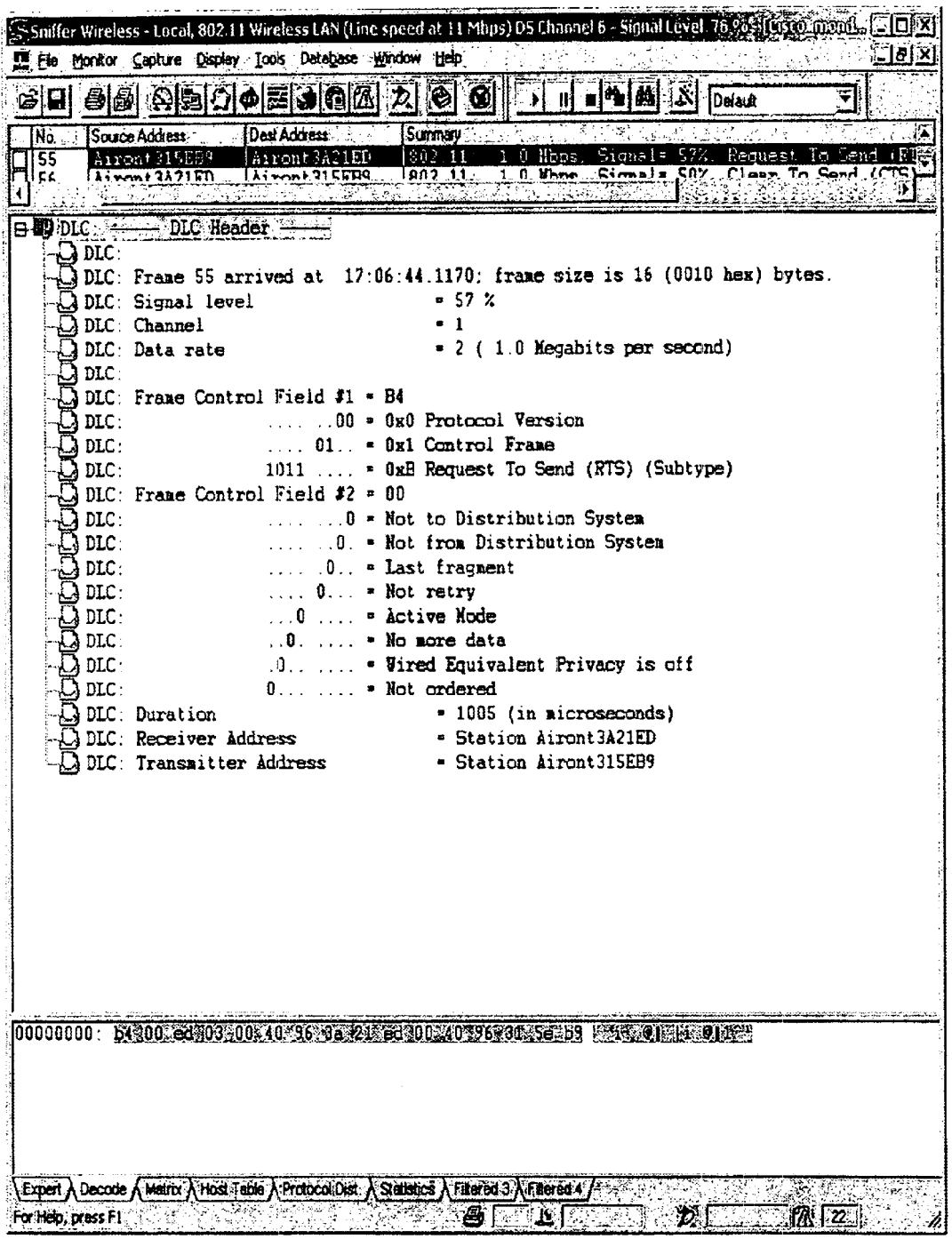

As shown FIG. 22, the program executes the FormatRTSDetail( ) subroutine 2006 generally shown in FIG. 20. The task of this routine is to decode and display the information contained in the "Request To Send (RTS)" frame. The routine is activated at step 2006, and it proceeds to step 2201 where it displays the contents of the duration field 30. It treats the contents of the duration field as a little-endian unsigned integer of two octets in length. The value in "Duration" field 30 corresponds to the amount of time in microseconds that the medium is reserved by the sending station. The routine then proceeds to step 2202 to execute the DisplayReceiverAddress( ) routine as described in detail by the flowchart of FIG. 32. It then proceeds to step 2203, where it executes the DisplayTransmitterAddress( ) routine as described in detail by the flowchart of FIG. 33. The FormatRTSDetail( ) routine terminates at step 2204. Display of a typical "Request To Send (RTS)" frame is shown in FIG. 63.

Figure 23:
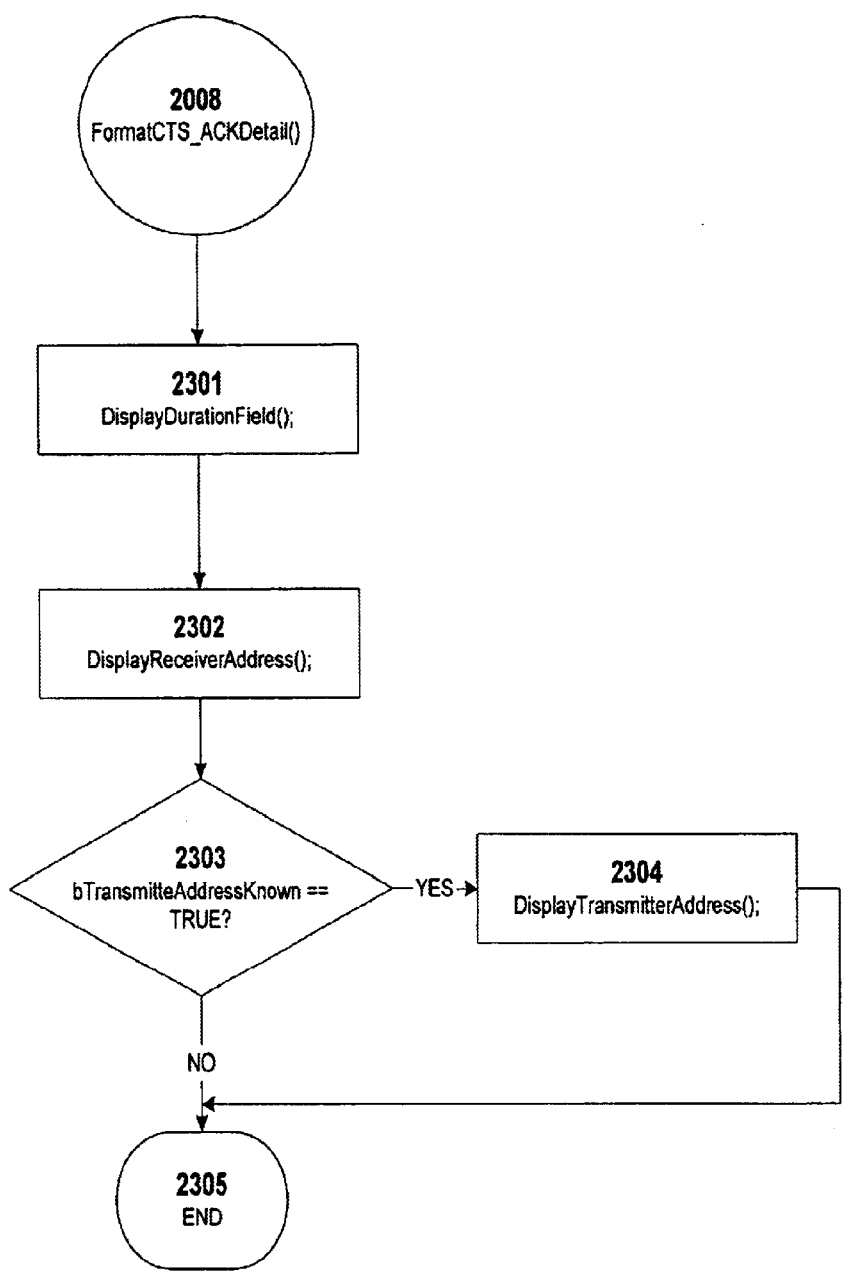
FIG. 23 shows the flowchart of a routine for formatting and displaying in detail the contents of Acknowledgement and Clear To Send frames associated with the decoding routine of the present invention.
Figure 64:
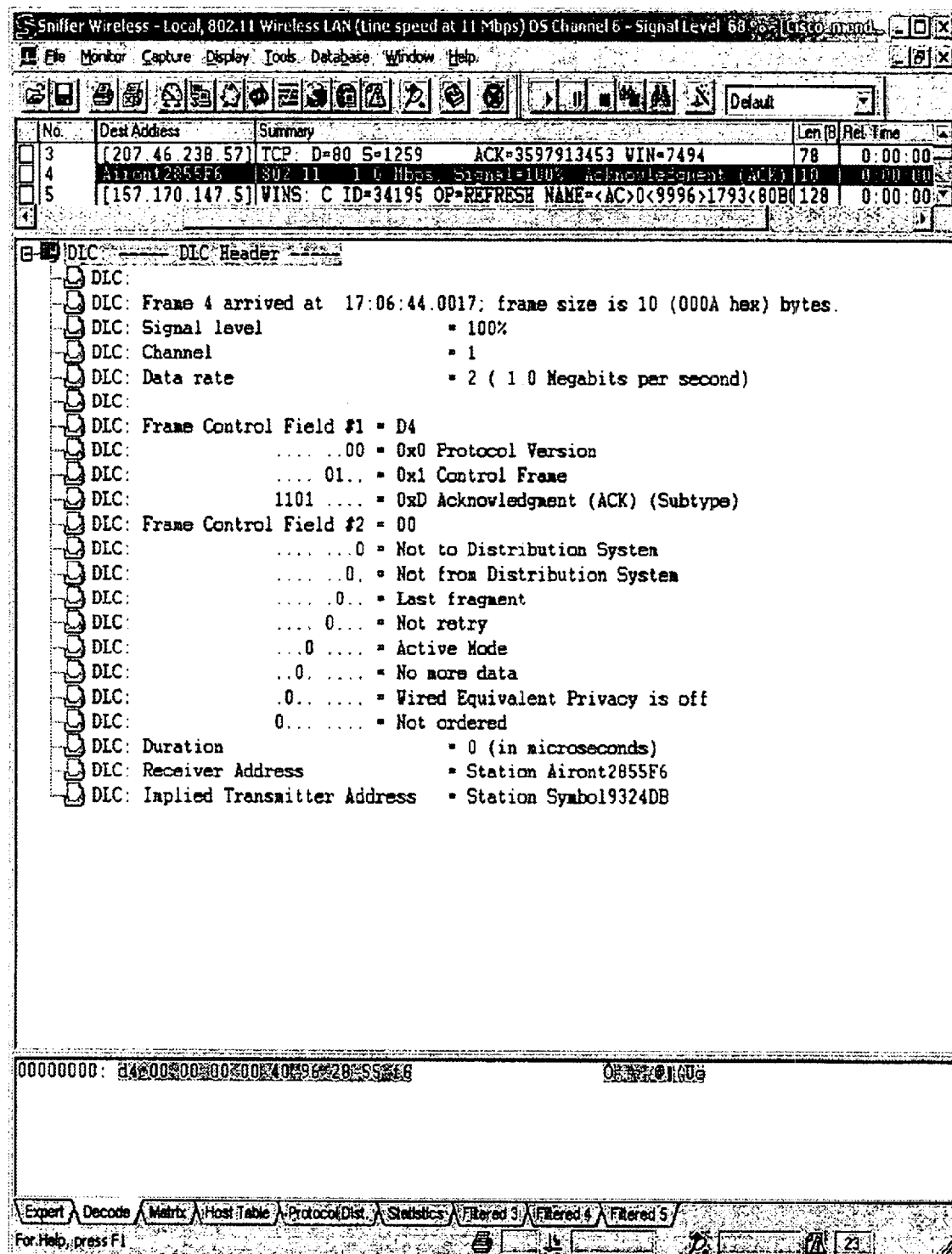
Figure 65:
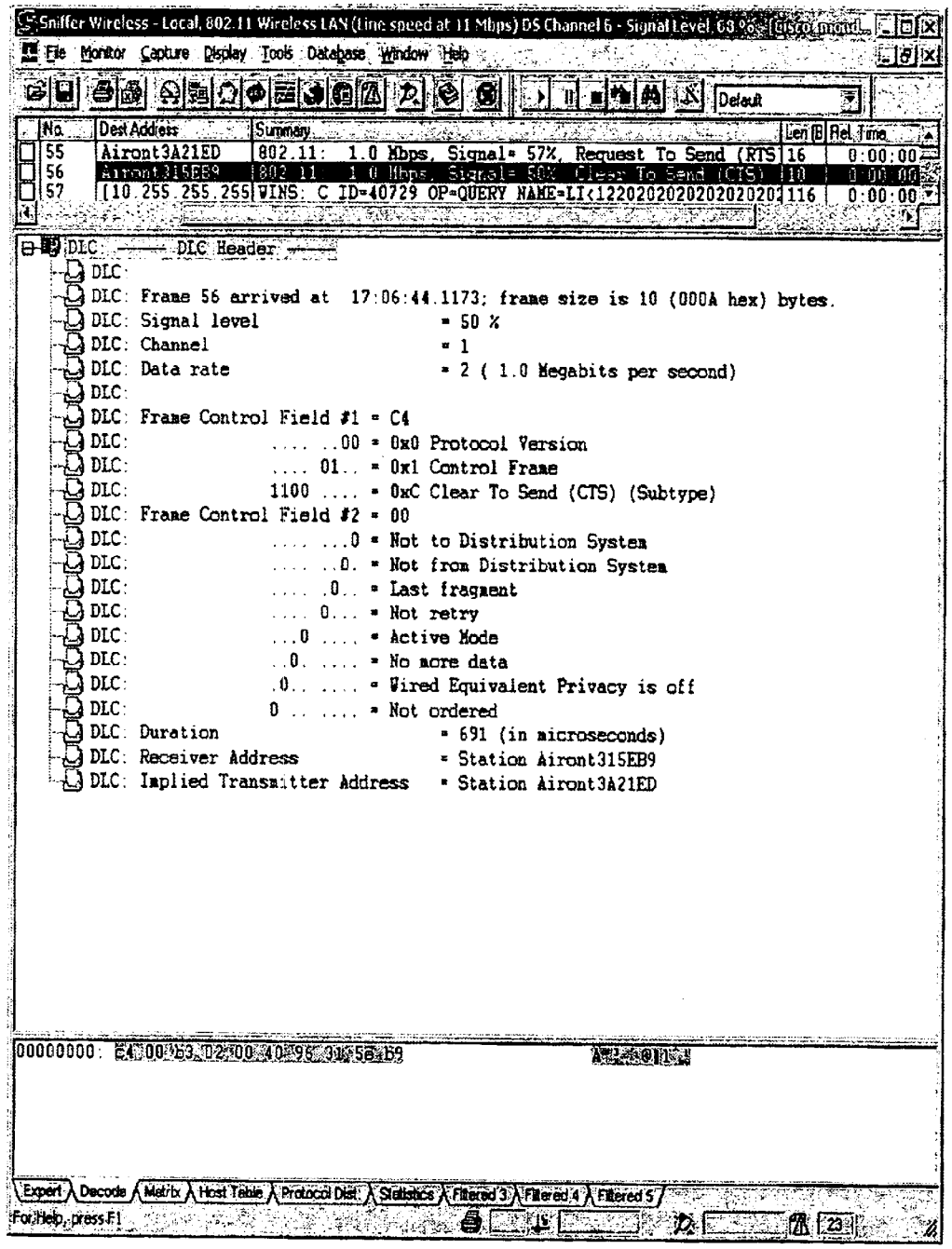

As shown FIG. 23, the program executes the FormatCTS_ACKDetail( ) subroutine 2008 generally shown in FIG. 20 via initiation step 2300. The task of this routine is to decode and display the information contained in the "Clear To Send (CTS)" and "Acknowledgement (ACK)" frames. The routine is activated at step 2008, and it proceeds to step 2301 where it displays the contents of the duration field 30. It treats the contents of the duration field as a little-endian unsigned integer of two octets in length. The value in "Duration" field 30 corresponds to the amount of time in microseconds that the medium is reserved by the sending station. The routine then proceeds to step 2302 to execute the DisplayReceiverAddress( ) routine as described in detail by the flowchart of FIG. 32. The routine then proceeds to step 2303 to determine if the transmitter address is known. The transmitter address for "ACK" and "CTS" frames cannot be determined from the contents of the frame, because these frames do not carry the Address2 field 34. If the software inside the Network Interface Card (NIC) 81 can determine the address of the transmitting station for these frame types, it sets the variable "bTransmitteAddress-Known" to "TRUE", and sets the contents of the "ImpliedTransmitterAddress" variable to the address of the transmitting station. The details of determining the transmitter address are beyond the scope of this invention, and is covered by co-pending Ser. No. 09/875,544 shown above as a Related Application. If the transmitter address is known the routine proceeds to step 2304, where it executes the DisplayTransmitterAddress( ) routine as described in detail by the flowchart of FIG. 33. The FormatCTS_ACKDetail( ) routine terminates at step 2305 from step 2304, or from step 2303 if "No." Display of a typical "Acknowledgement (ACK)" and "Clear To Send (CTS)" frames are shown in FIG. 64 and FIG. 65 respectively.

Figure 24:
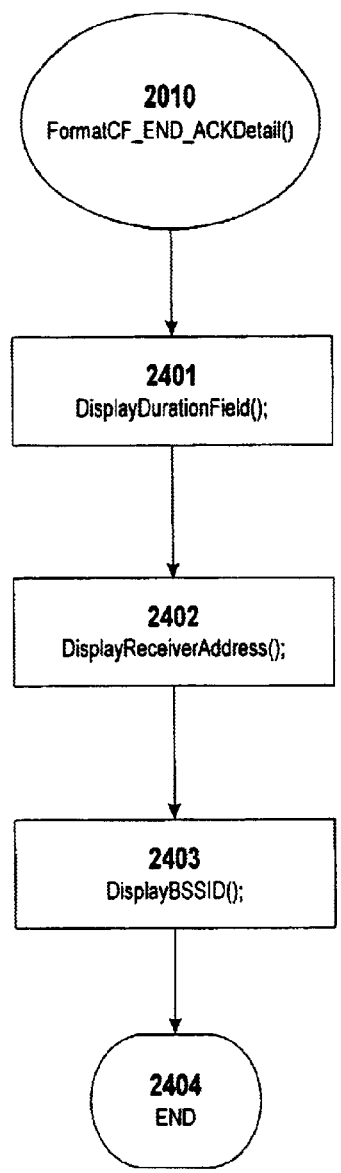
FIG. 24 shows the flowchart of a routine for formatting and displaying in detail the contents of Contention Free End (CF-End) and Contention Free End Acknowledgement (CF-End+Ack) frames associated with the decoding routine of the present invention.
Figure 66:
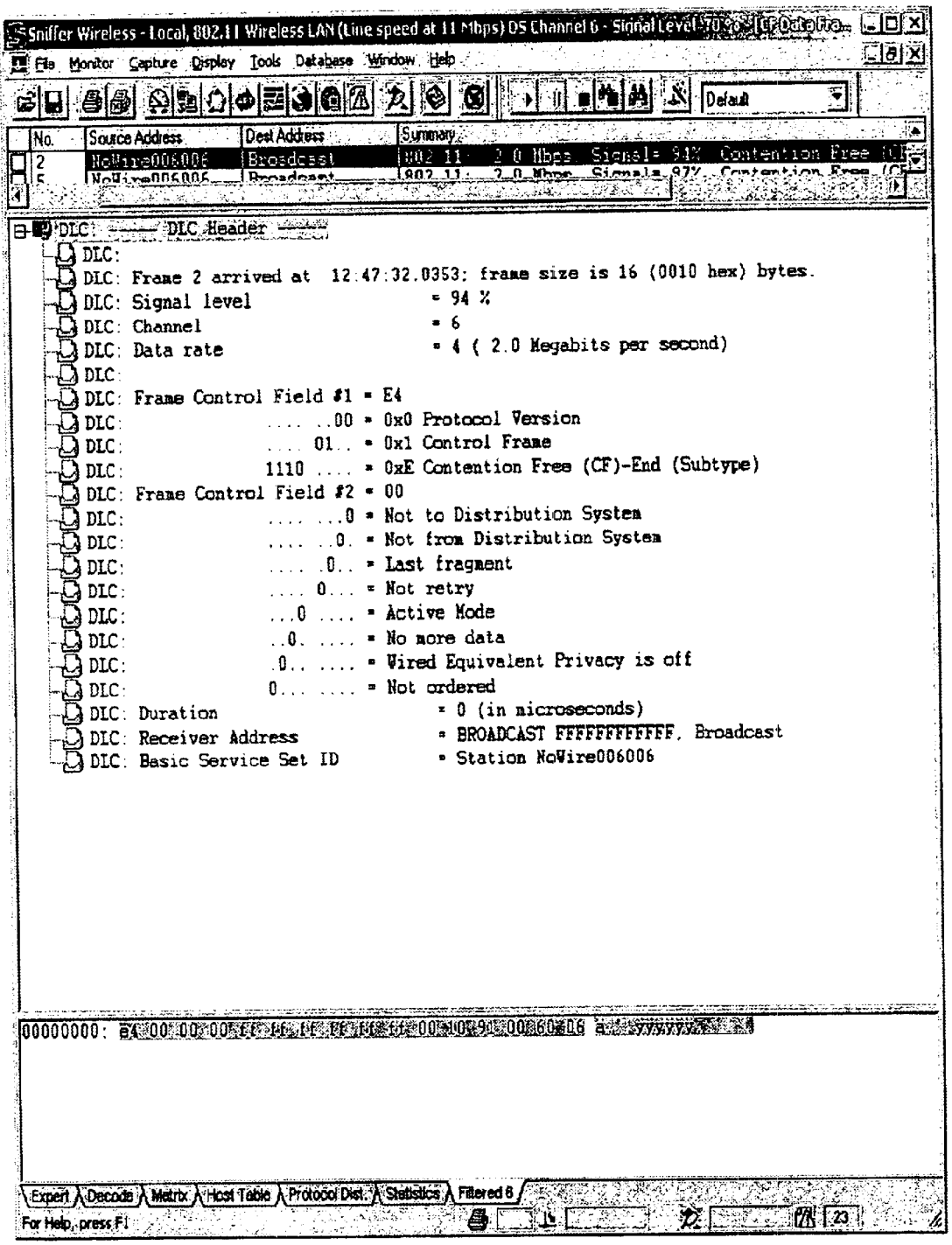

As shown in FIG. 24, the program executes the FormatCF_END_ACKDetail( ) subroutine 2010 generally shown in FIG. 20. The task of this routine is to decode and display the information contained in the "Contention Free (CF)-End" and "CF+End+CF-Ack" frames. The routine is activated at step 2010, and it proceeds to step 2401, where it displays the contents of the duration field 30. It treats the contents of the duration field as a little-endian unsigned integer of two octets in length. The value in "Duration" field 30 corresponds to the amount of time in microseconds that the medium is reserved by the sending station. The routine then proceeds to step 2402 to execute the DisplayReceiverAddress( ) routine as described in detail by the flowchart of FIG. 32. It then proceeds to step 2403, where it executes the DisplayBSSIDO routine as described in detail by the flowchart of FIG. 31. The FormatCF_END_ACKDetail( ) routine terminates at step 2404. Display of a typical "Contention Free (CF)-End" frame is shown in FIG. 66.

Figure 25:
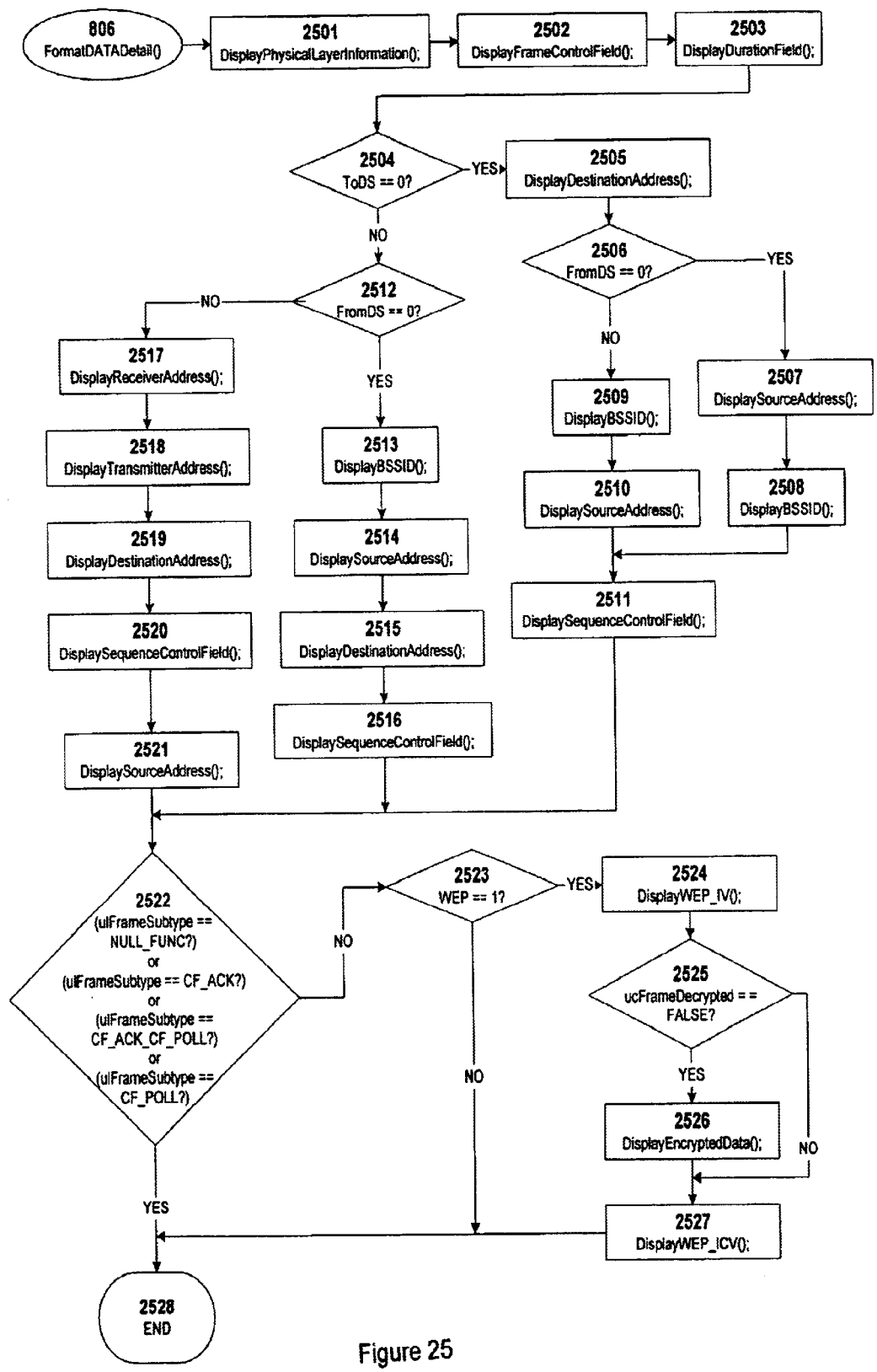
FIG. 25 shows the flowchart of a routine for formatting and displaying in detail the contents of Data frames associated with the decoding routine of the present invention.
Figure 67:
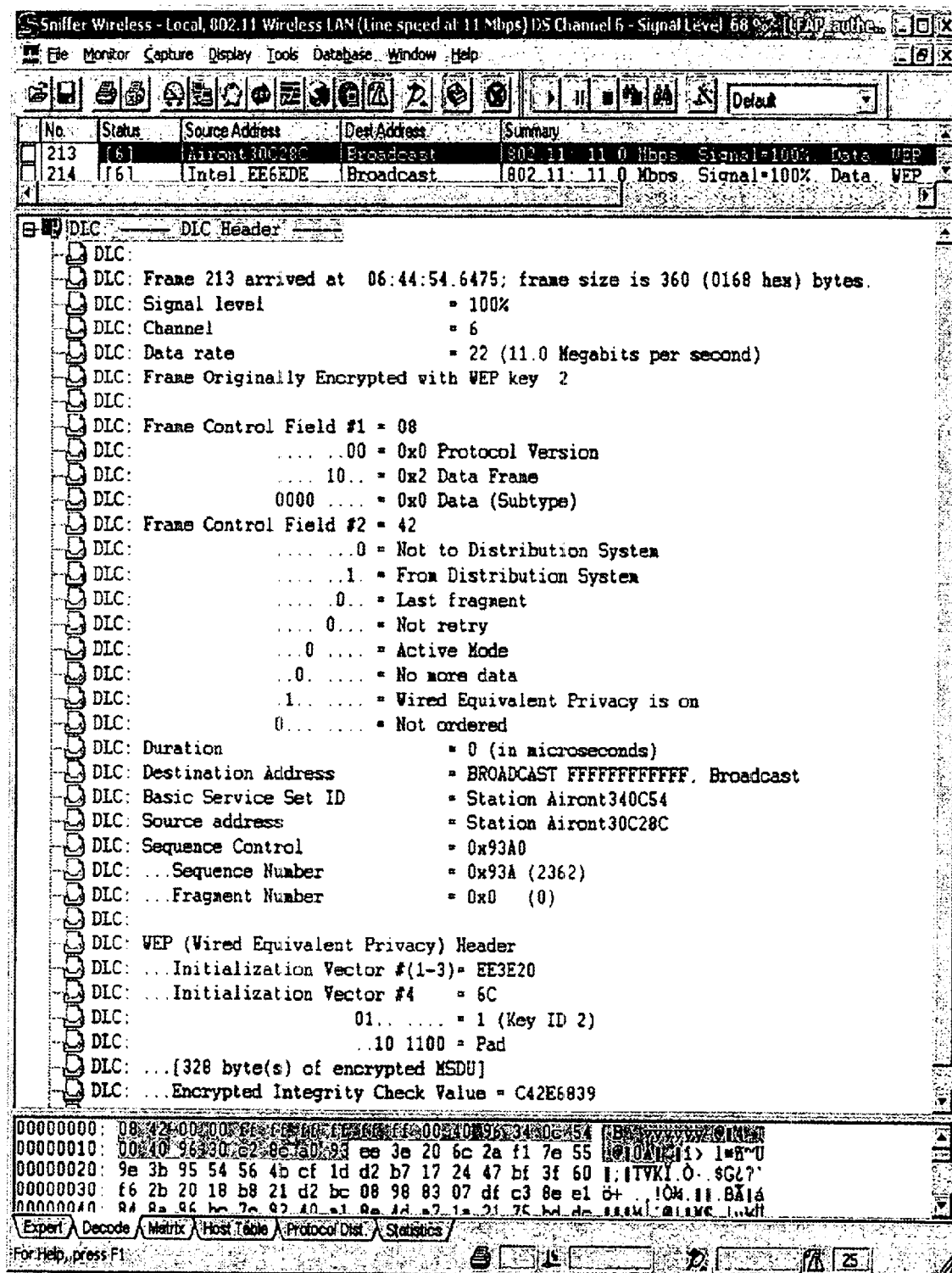
Figure 68:
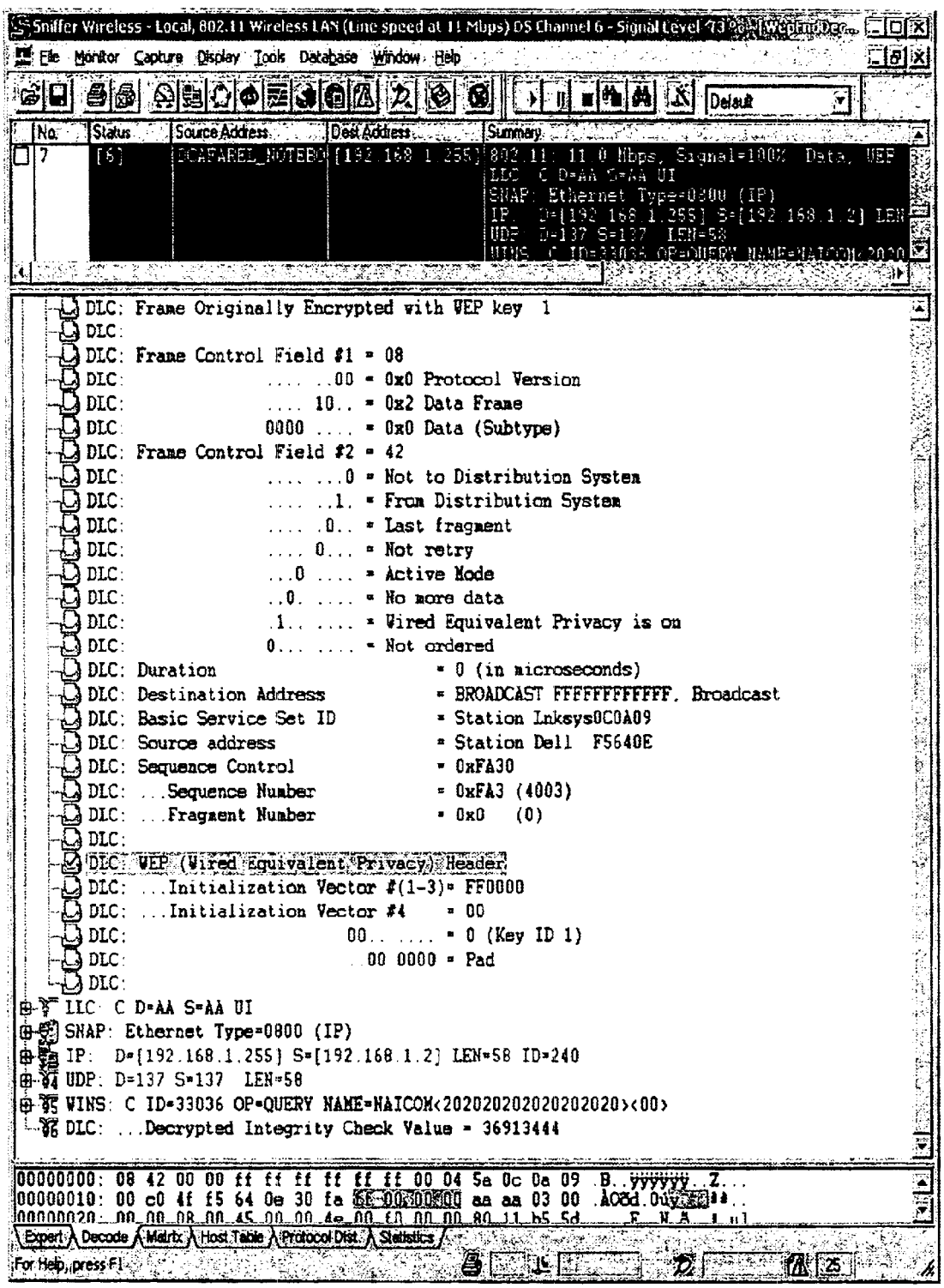

With reference to FIG. 25, the program executes the FormatDATADetail( ) routine (step 806 of FIG. 8) as denoted by the steps 2501 to 2528. The role of this routine is to decode and display the information contained in the "Data" frame type. Upon initiation of step 806, the FormatDATADetail( ) routine is activated. The routine then proceeds to step 2501, where it executes the DisplayPhysicalLayerInformation( ) routine to display the physical layer related information determined by the Network Interface Card (NIC) 81 as described in detail by the flowchart of FIG. 27. The routine proceeds to step 2502 to execute the DisplayFrameControlField( ) routine as described in detail by the flowchart of FIG. 28. The routine proceeds to step 2503, where it displays the contents of the duration field 30. It treats the contents of the duration field as a little-endian unsigned integer of two octets in length. The value of "Duration" field 30 corresponds to the amount of time in microseconds that the medium is reserved by the sending station. The routine then proceeds to step 2504 to determine if the "ToDS" bit field 48 is set to zero. If "Yes", then it proceeds to step 2505 to execute the DisplayDestinationAddress( ) routine as described in detail by the flowchart of FIG. 29. It then proceeds to step 2506 to determine if the "FromDS" bit field 50 is set to zero. If "Yes", then the routine proceeds to step 2507 to execute the DisplaySourceAddress( ) routine as described in detail by the flowchart of FIG. 30. It then proceeds to step 2508 to execute the DisplayBSSID( ) routine as described in detail by the flowchart of FIG. 31. The routine then proceeds to step 2511. If the "FromDS" bit field 50 is not set to zero in step 2506, then the routine proceeds to step 2509 to execute the DisplayBSSID( ) routine as described in detail by the flowchart of FIG. 31. The routine proceeds to step 2520 to execute the DisplaySourceAddress( ) routine as described in detail by the flowchart of FIG. 30. The routine then proceeds to step 2511 to execute the DisplaySequenceControlField( ) as described in detail by the flowchart of FIG. 34. The execution then moves to step 2522. If the "ToDS" bit field 48 is not set to zero at step 2504 the routine proceeds to step 2512 to determine if the "FromDS" bit field 50 is set to zero. If "Yes", then the routine proceeds to step 2513 to execute the DisplayBSSID( ) routine as described in detail by the flowchart of FIG. 31. The execution then moves to step 2514 to invoke the DisplaySourceAddress( ) routine as described in detail by the flowchart of FIG. 30. The routine then invokes at step 2515 the DisplayDestinationAddress( ) routine as described in detail by the flowchart of FIG. 29. The next step 2516 is the execution of the DisplaySequenceControlField( ) routine as described in detail by the flowchart of FIG. 34. The routine moves the execution to step 2522. If the "FromDS" bit field 50 is not set to zero on step 2512, the routine then proceeds to step 2517 where it executes the DisplayReceiverAddress( ) routine as described in detail by the flowchart of FIG. 32. It then proceeds to step 2518 to execute the DisplayTransmitterAddress( ) routine as described by the flowchart of FIG. 33. It then moves to step 2519 to execute DisplayDestinationAddress( ) routine as described by the flowchart of FIG. 29. The routine proceeds to step 2520 to execute the DisplaySequenceControlField( ) routine as described by the flowchart of FIG. 34. The routine next executes DisplaySourceAddress( ) at step 2521 as described by the flowchart of FIG. 30. The routine then proceeds to step 2522 to determine if the data frame subtype is one of the "Null Function (No data)", "Contention Free (CF)-Acknowledgement (No Data)", "Contention Free (CF)-Poll (No Data)" or ""Contention Free (CF)-Acknowledgement+ CF-Poll(No Data)" frames. If "Yes", the routines terminates at step 2528, because these frame subtype do not carry any data in the frame body field 24. If "No", then the routine proceeds to step 2523 for further decoding of the data frame. At step 2523 the routine determines if the "WEP" bit field 60 is set to one. If "No" the routine terminates. If the result of step 2523 is "Yes", the routine proceeds to step 2524 display the contents of the WEP-IV field 66 of length 4 octets. The first three octets contain the initialization vector for the decoding engine. The two most significant bits of the last octet holds the key number used to encrypt the data. The remaining bits of the last octet are reserved for future use. The routine then proceeds to step 2525 to determine if the contents of the originally encrypted frame is not decrypted by the Network Interface Car (NIC) 81. If "Yes" the routine then proceeds to step 2526 to execute the DisplayEncryptedData( ) routine which shows the number of encrypted octets. The routine then proceeds to step 2527 both from steps 2525 and 2526 to display the contents of the WEP-ICV field 70. The WEP-ICV field is 4 octets in length carries the "Integrity Check Value" of the data frame. The FormatDATADetail( ) routine terminates at step 2528. The display of a typical encrypted and decrypted data frames are shown in FIG. 67 and FIG. 68 respectively.

Figure 26:
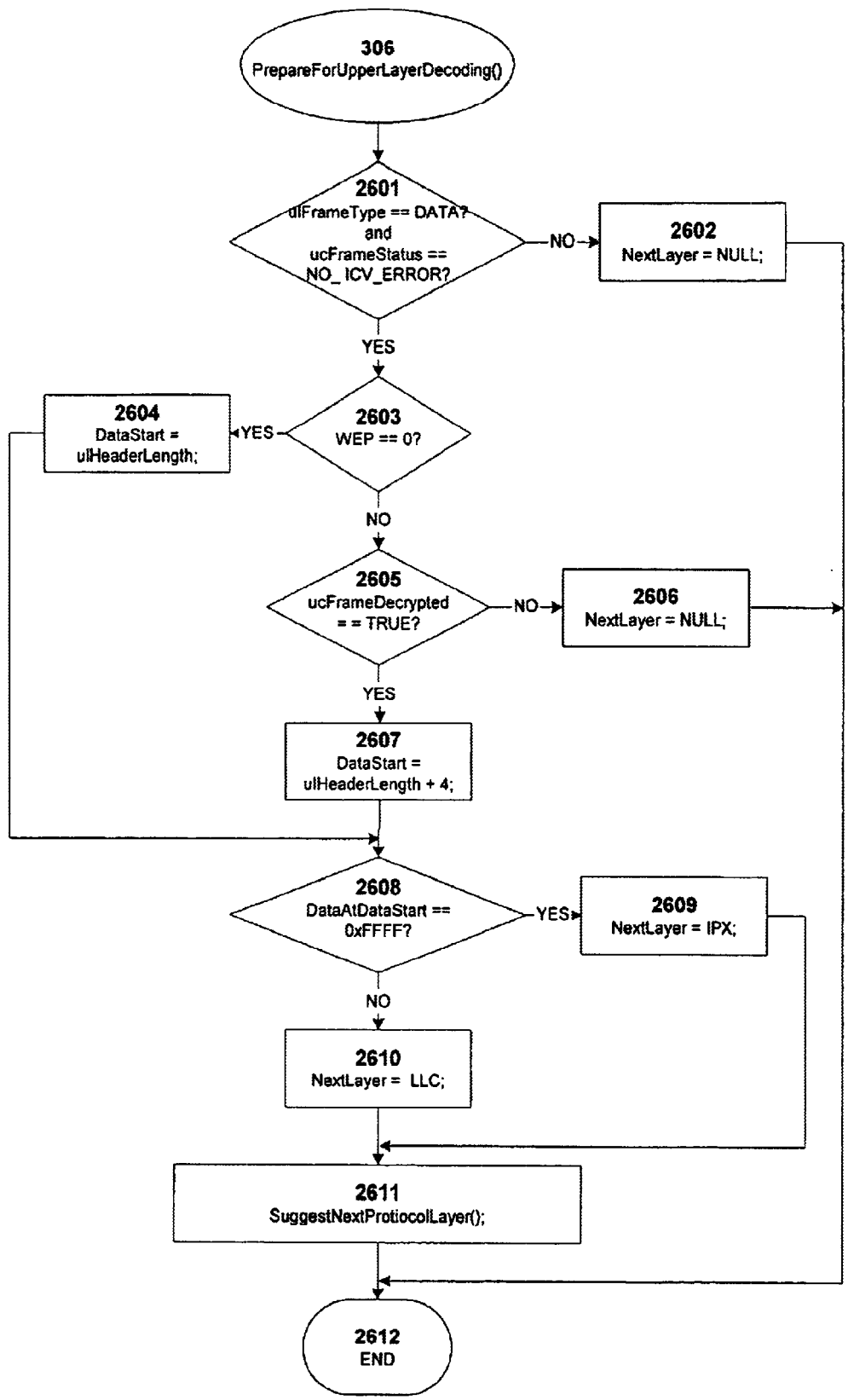
FIG. 26 shows the flowchart of a routine for determining the parameters necessary for upper layers decoding routines.

With reference to FIG. 26, the program executes the PrepareForUpperLayerDecoding( ) routine (step 306 of FIG. 3) as denoted by the steps 2601 to 2612. The role of this routine is to determine the parameters that will be necessary for upper layer decoding to be completed. The routine determines which upper layer decoding interpreter will be called next along with which data offset the new decoding routine will start decoding. Upon initiation of step 306, the PrepareForUpperLayerDecoding( ) routine is activated. The routine then proceeds to step 2601 to determine if the frame type is a "Data" frame, and whether it was received without a decryption error, because only data frames without decryption errors will have valid data. If the result of step 2601 is "No", the variable "NextLayer" will be set to NULL at step 2602, and the routine proceeds to step 2612 to terminate. If the result of step 2601 is "Yes", the routine then proceeds to step 2603 to determine if the "WEP" bit field 60 is set to zero. If "Yes", the routine proceeds to step 2604, where it sets the variable "DataStart" used by the higher layer interpreter to the length of the MAC header of the IEEE802.11 wireless standard. The routine then will proceed to step 2608. If the "WEP" bit field 60 is not set to zero at step 2603, the routine then proceeds to step 2605 to determine if the frame is decrypted. If "No", the routine proceeds to step 2606, where the variable "NextLayer" will be set to NULL, and the routine proceeds to step 2612 to terminate. If the frame is decrypted as determined at step 2605, the routine proceeds to step 2607 where the variable "DataStart" is set to the length of the MAC header of the IEEE802.11 wireless standard plus four. The extra four octets are due to the length of the WEP-IV field 66 as shown in FIG. 2C. The routine then proceeds to step 2608 to determine if the 2-octet field at the location of "DataStart" in the frame is equal to 0xFFFF in hexadecimal. If "Yes", then the variable "NextLayer" will be set to "IPX" via step 2609, which corresponds to Novell Internet Packet Exchange over Data Link Control layer. The routine then proceeds to step 2611. If the result of step 2608 is "No", then the routine proceeds to step 2610 where the variable "NextLayer" will be set to "LLC", which corresponds to Logical Link Control layer encapsulation of the data. Then the routine proceeds to step 2611 to notify the calling routine about the next layer to be called, and where the next layer will start decoding in the frame. The PrepareForUpperLayerDecoding( ) routine terminates at step 2612.

Figure 27:
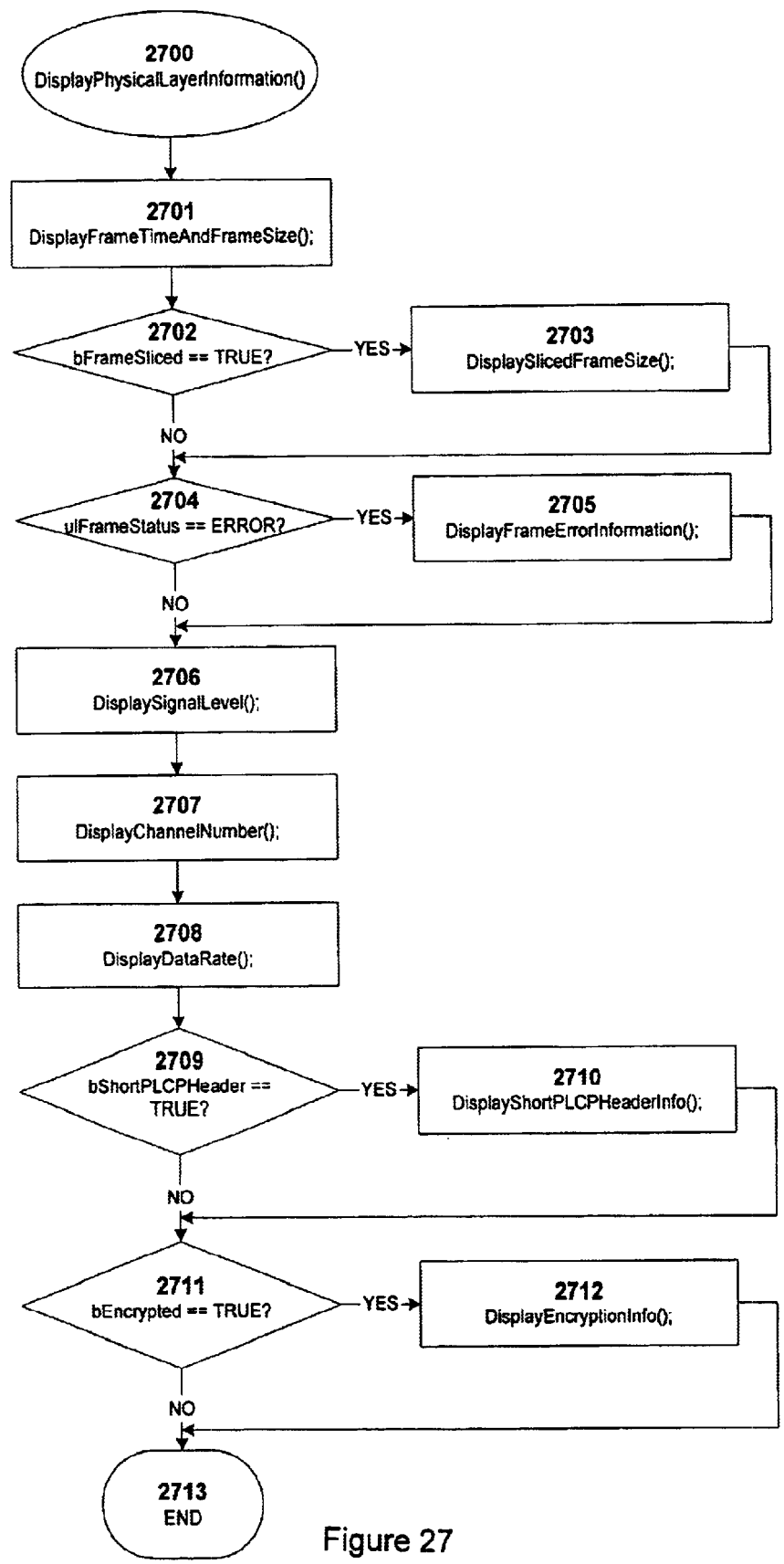
FIG. 27 shows the flowchart of a routine for formatting and displaying in detail the physical layer information of the frames associated with the decoding routine of the present invention.
Figure 69:
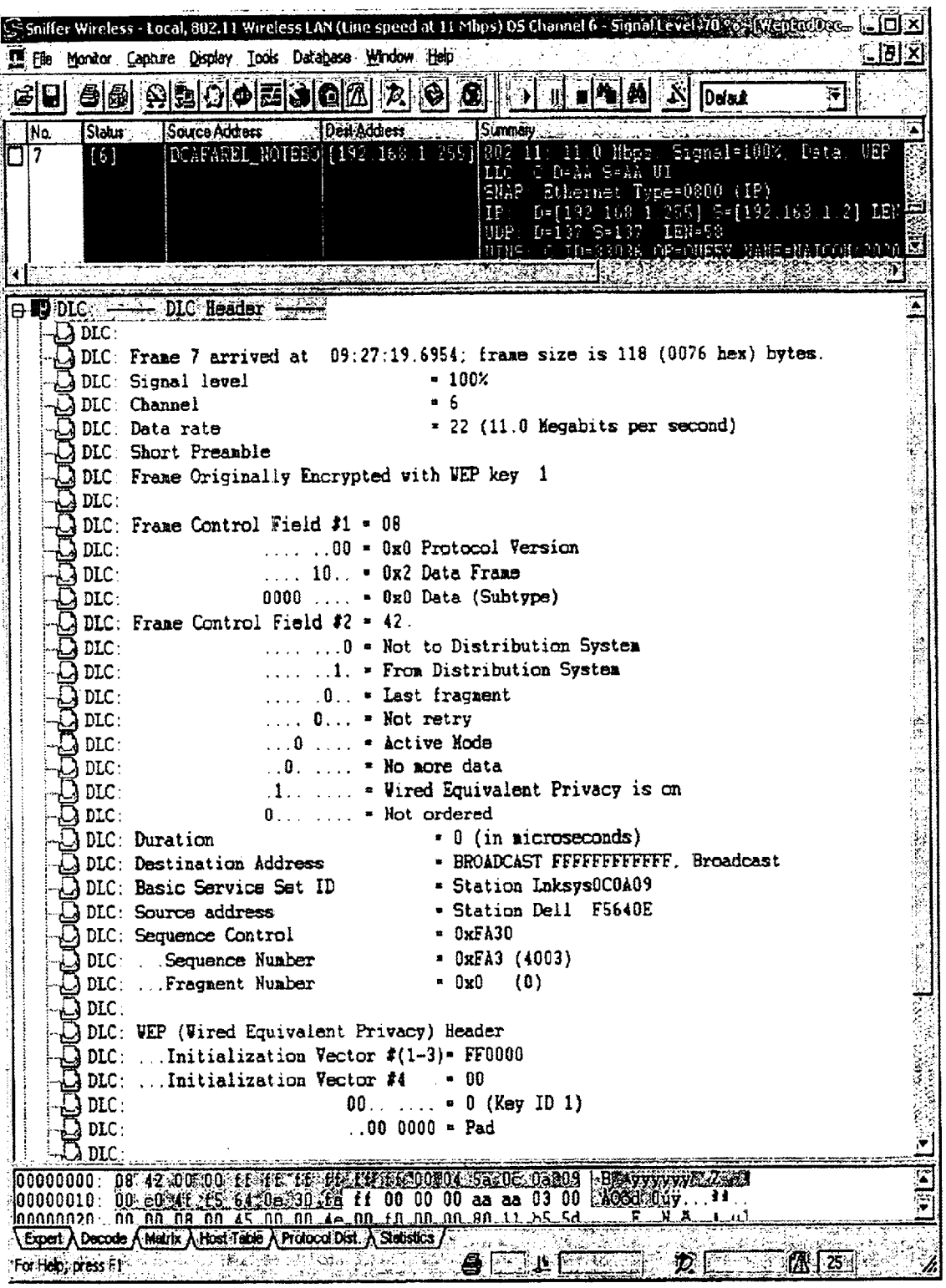

With reference to FIG. 27, the program executes the DisplayPhysicalLayerInformation( ) routine as denoted by the steps 2700 to 2713. The role of this routine is to display the physical characteristics of the frame, determined by the Network Analysis Tool 80 when the frame is captured. The physical characteristics of the frame are stored in the capture buffer along with the frame data. The information stored relates to characteristics such as frame number in the capture buffer, frame size, frame error if any, radio signal strength, the channel that the signal is received, data rate, if the frame is transmitted using short physical header, and encryption information such as encryption key used to decode the encrypted frame. Upon activation at step 2700, the routine proceeds to step 2701 to display the time the frame is captured and the size of the frame in octets. The Network Analysis Tool 80 can be configured by the user in such a way that the number of octets stored in the capture buffer can be limited to a user selected number. This allows the user to capture a lot more frames for a fixed size of the capture buffer 83. However, some information at the higher layers will be lost when the user wants to analyze the captured frames offline. The routine proceeds to step 2702 to determine if the frame is sliced during the capture. If "Yes", the routine proceeds to step 2703 and displays the sliced size of the captured frame. The routine proceeds to step 2704 either from step 2703, or from step 2702 if "No," to determine if the captured frame contains any error. If "Yes", the routine proceeds to step 2705 to display the error information. The error types the frames can have:

i) Bad CRC (Cyclic Redundancy Check)
ii) PLCP (Physical Layer Control Protocol) error
iii) WEP-ICV (Wired Equivalent Privacy Integrity Value) error
iv) Undersize frame error
v) Oversize frame error The routine proceeds to step 2706 either from step 2705, or from step 2704 if"No," to display the strength of the radio signal in percentage when the frame is received. At step 2707, the routine displays the channel number on which the frame is received. At step 2708, the routine displays the data rate in terms of Mbits per second. The routine then proceeds to step 2709 to determine if the frame is transmitted using short physical layer control protocol (PLCP) header. If "Yes", the routine proceeds to step 2710, where it displays information to the user that the frame is received with a short PLCP header. It then proceeds to step 2711, either from step 2710, or from step 2709 if "No," to determine if the frame is originally encrypted. If "Yes", then the routine proceeds to step 2712 to display the key number used for the encryption if it does not have any decryption error. If it has a decryption error then it simply displays via step 2712 information that notifies the user that frame was originally encrypted. The routine terminates at step 2713, either from steo 2712, or from step 2711 if "No". A typical output of the DisplayPhysicalLayerInformation( ) routine is shown in FIG. 69.

Figure 28:
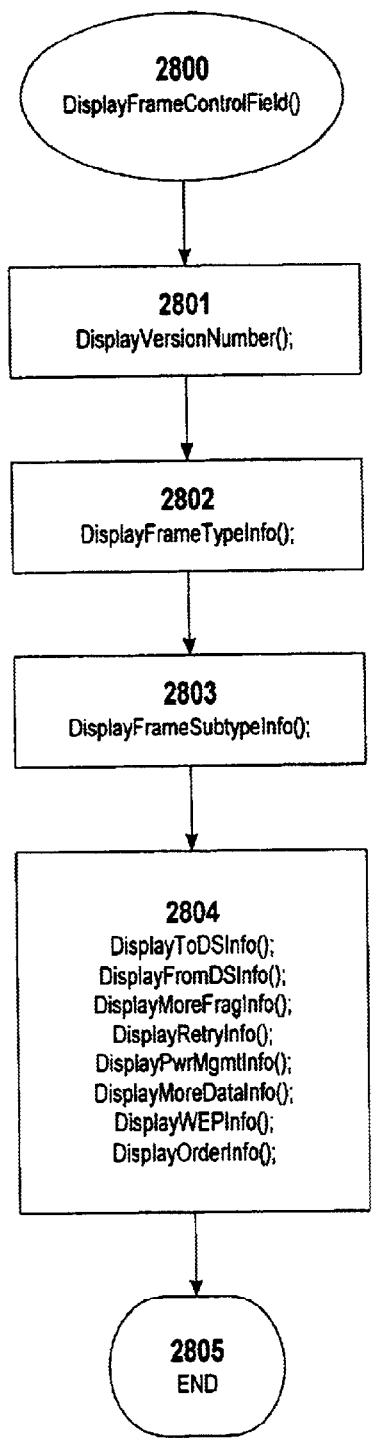
FIG. 28 shows the flowchart of a routine for formatting and displaying in detail the contents of a Frame Control Field associated with the decoding routine of the present invention.

With reference to FIG. 28, the program executes the DisplayFrameControlField( ) routine as denoted by the steps 2800 to 2805. This routine displays the contents of the "Frame Control" field 20. The length of the frame control field 20 is 16 bits (2 octets) as shown in FIG. 2B. Upon activation at step 2800, the routine proceeds to step 2801 to display the version number of the protocol as determined by the IEEE802.11 standard. The protocol version field 42 is 2 bits in length, and resides in the two least significant bits (bits 0 and 1). At step 2802, the routine displays the frame type. "Frame Type" field 44 is 2 bits in length and resides in the bits B2 and B3. The program displays the frame type according to the bit values as shown in Table 1. The routine then proceeds to step 2803 to display the frame subtype. "Frame Subtype" field 46 is 4 bits in length, and it resides in bits B4 through B7. The routine displays the frame subtype according to the bit value combinations as shown in Table 1. The routine then proceeds to step 2804 to display the contents of the second octet of the "Frame Control" field 28. It displays suitable messages depending on the bit values in each bit as follows. Bit B8 of the "Frame Control" field corresponds to the "ToDS" bit field 48. "ToDS" field 48 is set to one if the frame is destined for the distribution system. Otherwise it is set to zero. The bit B9 corresponds to "FromDS" bit field 50. If the frame is from the distribution server this bit is set to one, otherwise set to zero. Bit B10 corresponds to "MoreFrag" bit field 52. If the current frame is a fragment of a larger frame and there are more fragments to follow this bit is set to one. Bit B11 corresponds to "Retry" bit field 54. It is set to one if the current frame is a retry of a previously transmitted frame. Bit B12 corresponds to the "Pwr Mgmt" bit field 56. It is set to one if the sending station will be in the power-save mode. It will be set to zero if it will be in active mode. Bit B13 corresponds to "More Data" bit field 58. It is set to one if there are more data destined at the Access Point to a station in power-save mode. It is set to zero otherwise. Bit B14 corresponds to "WEP bit field 60. It is set one if the frame is encrypted and set to zero otherwise. Bit B 15 of the "Frame Control" field 28 corresponds to "Order" bit field 62. It is set to one in any frame that contains data, which is being transferred using "Strictly Ordered" service class. After displaying the values of the bits and corresponding meaning of the bits the routine terminates at step 2805. A typical output of the DisplayFrameControlField( ) routine is shown in FIG. 69.

Figure 29:
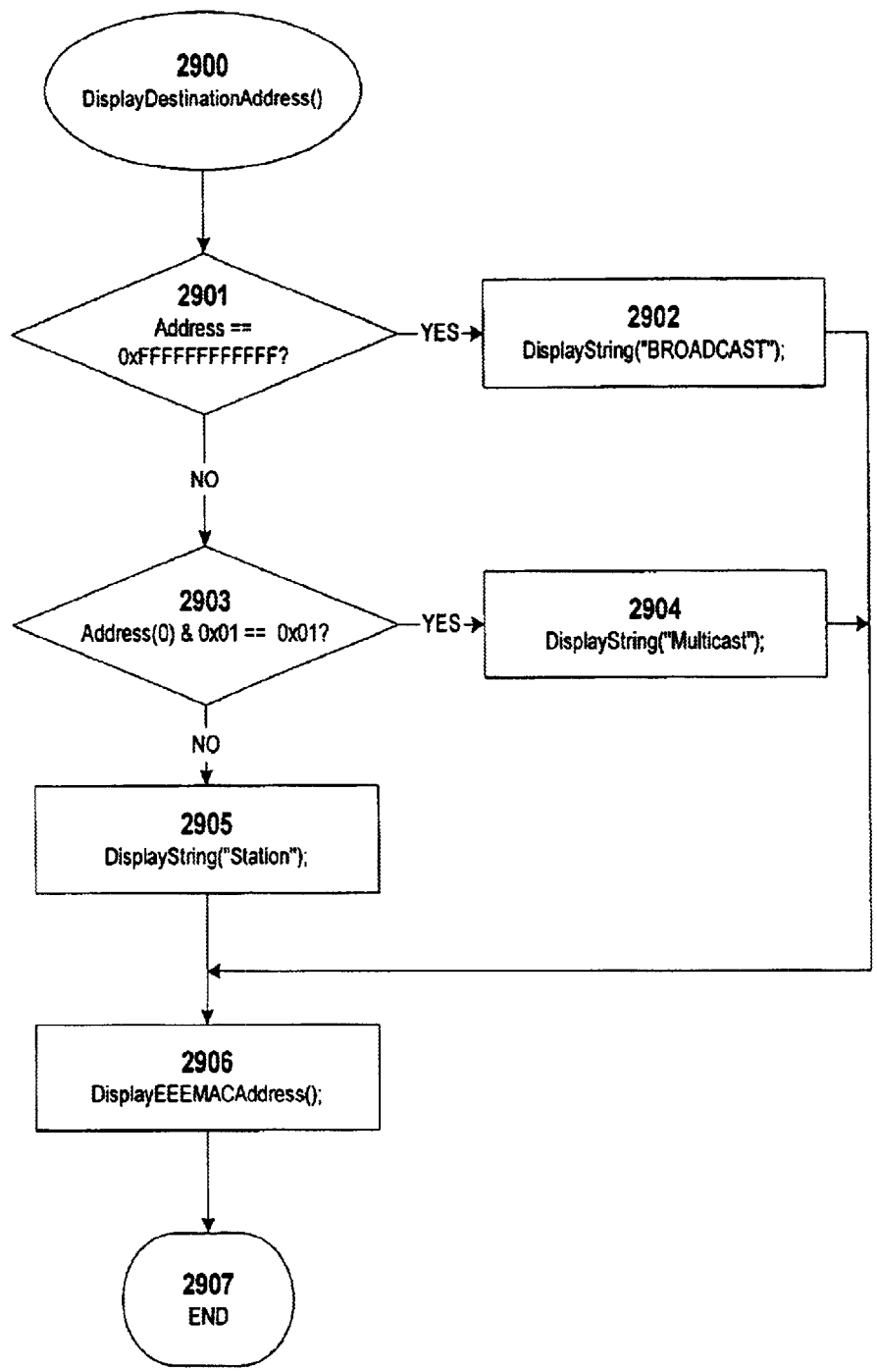
FIG. 29 shows the flowchart of a routine for formatting and displaying in detail the contents of a Destination Address Field associated with the decoding routine of the present invention.
Figure 70:
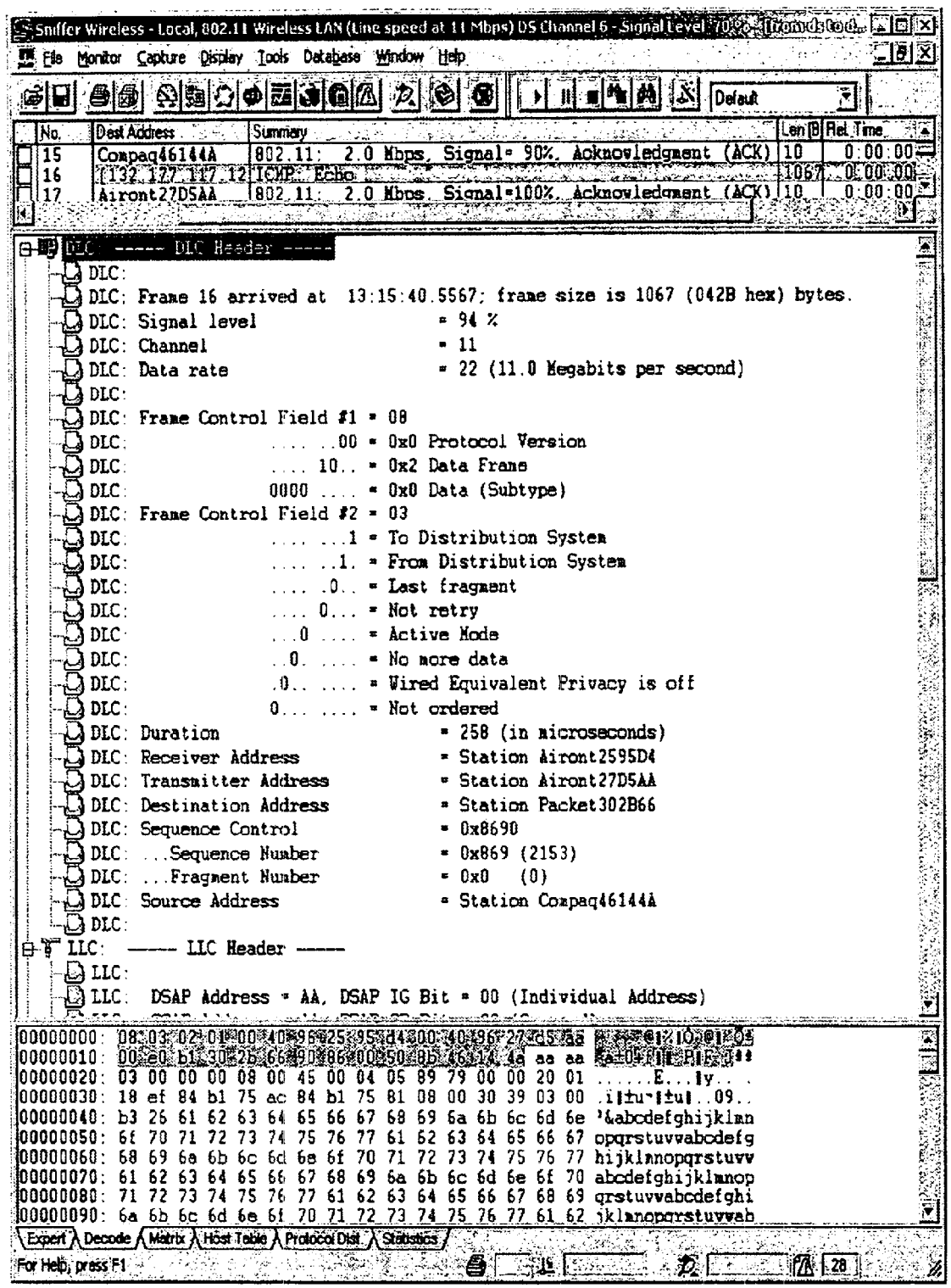

With respect to FIG. 29, the program executes the DisplayDestinationAddress( ) routine as denoted by the steps 2900 to 2907. The role of this routine is to format and to display the destination address of the frame. The Medium Access Control (MAC) addresses are 6 octets in length. If the address is destined to a single station it is referred to as a "Unicast" address. If the frame is destined to a group of stations it is referred to as "Multicast" address. If it is destined to all stations it is called a "Broadcast" address. According to IEEE802.11 standard if the MAC address field carries all ones (0xFFFFFFFFFFFF in hexadecimal) it is a broadcast address. If the least significant bit of the first octet of the MAC address is "1", it is a multicast address. Otherwise it is a unicast address. Upon activation at step 2900, the routine proceeds to step 2901 to determine if the destination address is a broadcast address. If "Yes", it proceeds to step 2902 to display "BROADCAST" string for the address. It then proceeds to step 2906. If the address is not broadcast at step 2901, the routine proceeds to step 2903 to determine if the destination address is a multicast address. If "Yes", the routine then proceeds to step 2904 to display the string "Multicast". The routine proceeds to step 2906. If the address is not a multicast at step 2903, the routine proceeds to step 2905 to display the string "Station" indicating a unicast address. The routine then proceeds to step 2606 to format and display the destination address. The first 3 octets of any unicast MAC address are unique to a manufacturer. The routine displays a 6-character abbreviation for the first three octets of the MAC address. The remaining octets are printed as hexadecimal numbers for each octet in order. The routine terminates at step 2907. A typical output of the DisplayDestinationAddress( ) routine is shown in FIG. 70.

With respect to FIG. 30, the program executes the DisplaySourceAddress( ) routine as denoted by the steps 3000 to 3007. The role of this routine is to format and to display the source address of the frame. Upon activation at step 3000, the routine proceeds to step 3001 to display the string "Station". The routine proceeds to step 3002 to format and display the source address. The first 3 octets of any unicast MAC address are unique to a manufacturer. The routine displays a 6-character abbreviation for the first three octets of the MAC address. The remaining octets are printed as hexadecimal numbers for each octet in order. The routine proceeds to step 3003 to determine if the source address is a broadcast address. If "Yes", it proceeds to step 3004 to display warning message string "(Should not be Broadcast) ", because the source address cannot be a broadcast address. It then proceeds to step 3007. If the address is not broadcast at step 3003, the routine proceeds to step 3005 to determine if the source address is a multicast address. If "Yes," it proceeds to step 3006 to display warning message string "(Should not be Multicast)", because the source address cannot be a multicast address. The routine terminates at step 3007. A typical output of the DisplaySourceAddress( ) routine is shown in FIG. 70.

Figure 31:
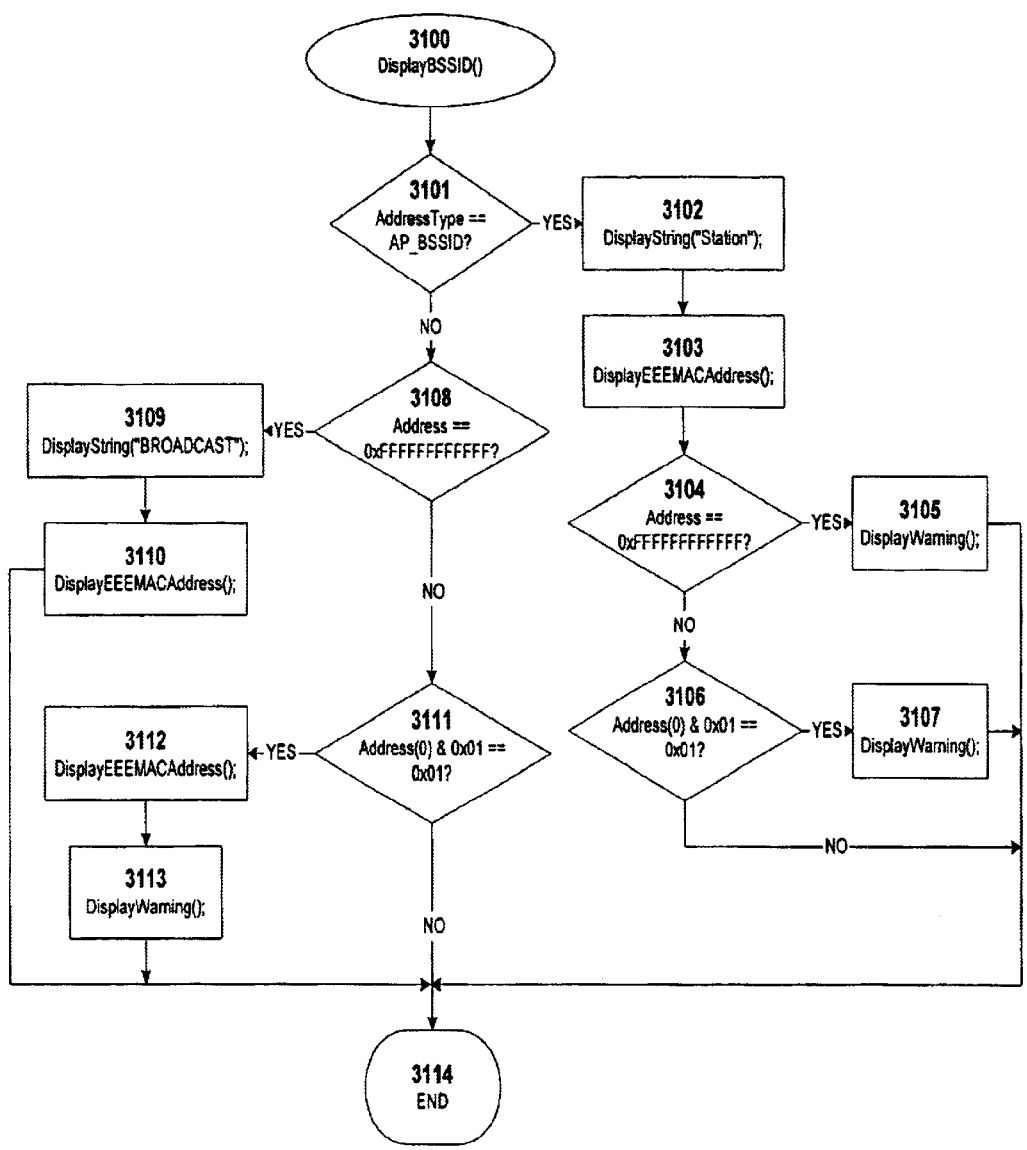
FIG. 31 shows the flowchart of a routine for formatting and displaying in detail the contents of a BSSID Field associated with the decoding routine of the present invention.

With respect to FIG. 31, the program executes the DisplayBSSID( ) routine as denoted by the steps 3100 to 3112. The role of this routine is to format and to display the Basic Service Set Identification (BSSID) of the frame. Upon activation at step 3100, the routine proceeds to step 3101 to determine if the address type in the BSSID field corresponds to BSSID of an Access Point. If "Yes", the routine proceeds to step 3102 to display the "Station" string, because the BSSID of an Access Point is the same as its MAC address; therefore, it cannot be a multicast or broadcast address. The routine proceeds to step 3103 to format and display the BSSID using the same techniques as the source and destination address. The routine proceeds to step 3104 to determine if the address in the BSSID field is a broadcast address. If "Yes", step 3105 is entered, and displays a warning message of "(Should not be Broadcast)". The routine proceeds to termination step 3114. If the address is not broadcast at step 3104, the routine proceeds to step 3106 to determine if the address is multicast. If "Yes", step 3107 is entered, and displays a warning message "(Should not be Multicast)". The routine proceeds to step 3114. If the BSSID type at step 3101 is not an Access Point BSSID, the routine then proceeds to step 3108 to determine if the address type is broadcast. If "Yes", it proceeds to step 3109 to display "BROADCAST". The routine then proceeds to step 3110 to format and display the BSSID as if it is an address as described previously. The routine proceeds to step 3114. If the address type is not broadcast at step 3108, the routine proceeds to step 3111 to determine if the address is multicast. If "Yes", the routine proceeds to step 3112 to format and display the BSSID as a MAC address. The routine then proceeds to step 3113 to display a warning message ""(Should not be Multicast)". The routine terminates at step 3114. A typical output of the DisplayBSSID( ) routine is shown in FIG. 69.

Figure 32:
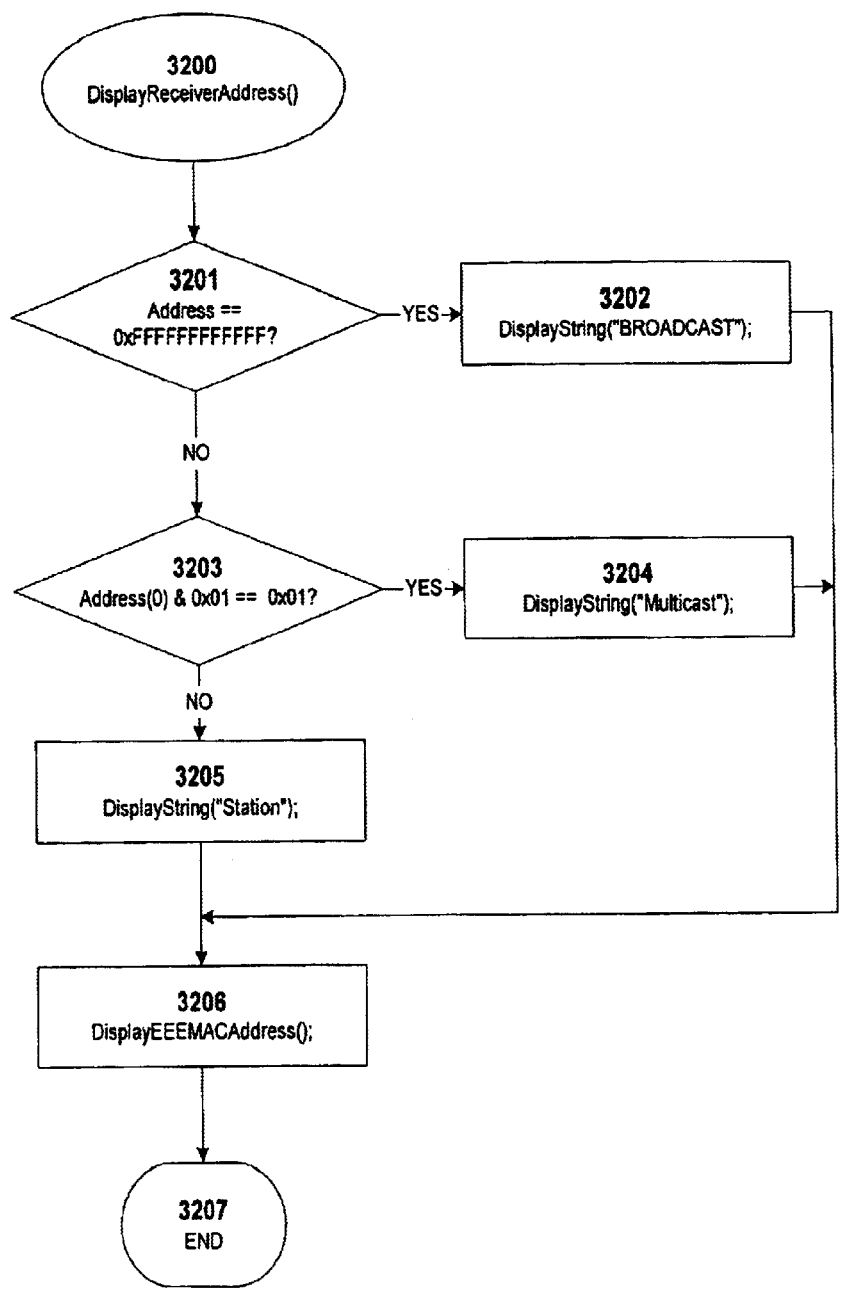
FIG. 32 shows the flowchart of a routine for formatting and displaying in detail the contents of a Receiver Address Field associated with the decoding routine of the present invention.

With respect to FIG. 32, the program executes the DisplayReceiverAddress( ) routine as denoted by the steps 3200 to 3207. The role of this routine is to format and to display the to determine if the receiver address is a broadcast address. If "Yes", it proceeds to step 3202 to display "BROADCAST" string for the address. It then proceeds to step 3206. If the address is not broadcast at step 3201, the routine proceeds to step 3203 to determine if the receiver address is a multicast address. If "Yes", the routine then proceeds to step 3204 to display the string "Multicast". The routine proceeds to step 3206. If the address is not a multicast at step 3203, the routine proceeds to step 3205 to display the string "Station" indicating a unicast address. The routine then proceeds to step 3206 to format and display the receiver address. The first 3 octets of any unicast MAC address are unique to a manufacturer. The routine displays a 6-character abbreviation for the first three octets of the MAC address. The remaining octets are printed as hexadecimal numbers for each octet in order. The routine terminates at step 3207. A typical output of the DisplayReceiverAddress( ) routine is shown in FIG. 70.

Figure 33:
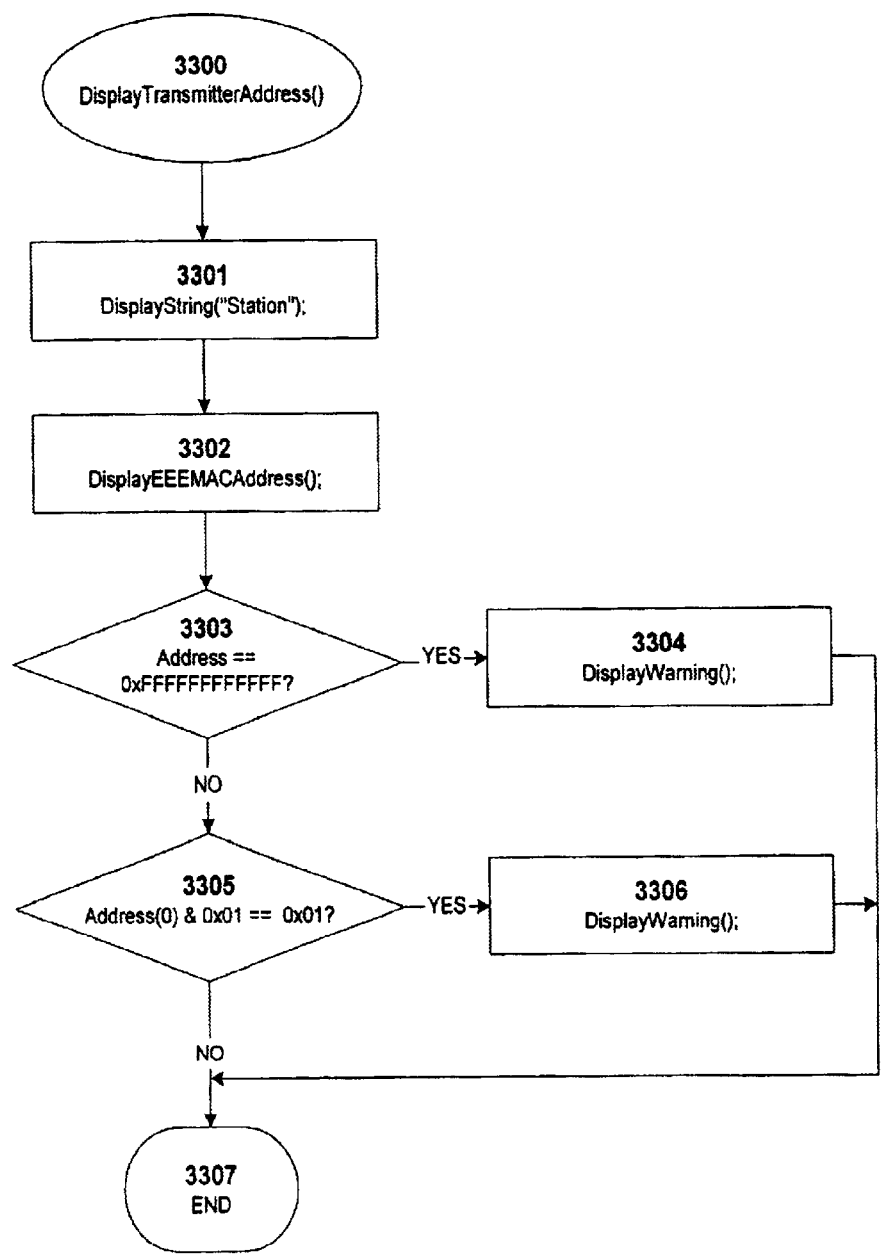
FIG. 33 shows the flowchart of a routine for formatting and displaying in detail the contents of a Transmitter Address Field associated with the decoding routine of the present invention.

With respect to FIG. 33, the program executes the DisplayTransmitterAddress( ) routine as denoted by the steps 3000 to 3007. The role of this routine is to format and to display the transmitter address of the frame. Upon activation at step 3300, the routine proceeds to step 3301 to display the string "Station". The routine proceeds to step 3202 to format and display the transmitter address. The first 3 octets of any unicast MAC address are unique to a manufacturer. The routine displays a 6-character abbreviation for the first three octets of the MAC address. The remaining octets are printed as hexadecimal numbers for each octet in order. The routine proceeds to step 3303 to determine if the transmitter address is a broadcast address. If "Yes", it proceeds to step 3304 to display warning message string "(Should not be Broadcast)", because the transmitter address cannot be a broadcast address. It then proceeds to termination step 3307. If the address is not broadcast at step 3003, the routine proceeds to step 3305 to determine if the transmitter address is a multicast address. If "Yes," it proceeds to step 3306 to display warning message string "(Should not be Multicast)", because the transmitter address cannot be a multicast address, and then proceeds to step 3307. If "No," the routine terminates at step 3307. A typical output of the DisplayTransmitterAddress( ) routine is shown in FIG. 70.

Figure 34:
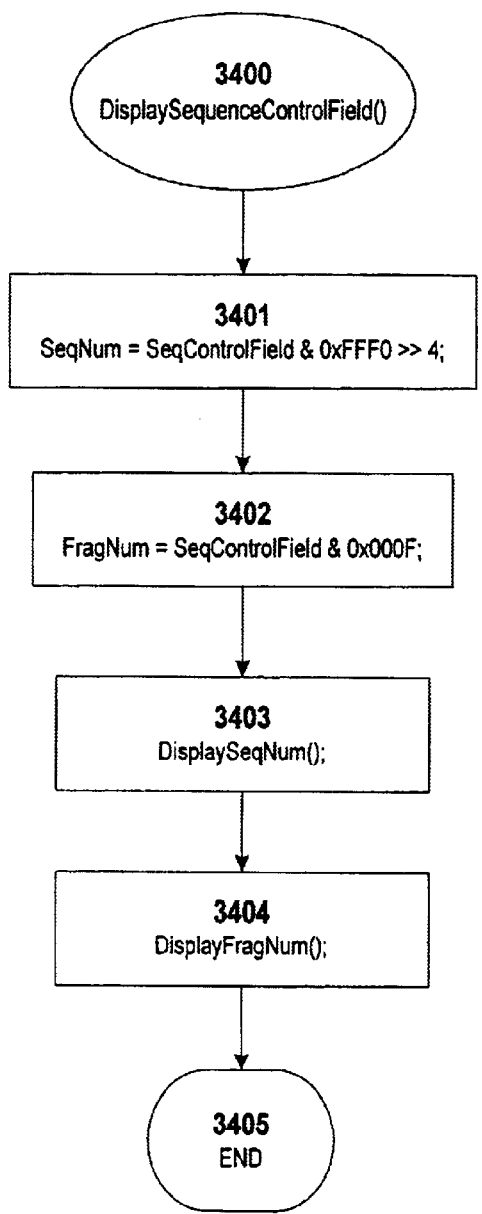
FIG. 34 shows the flowchart of a routine for formatting and displaying in detail the contents of a Sequence Control Field associated with the decoding routine of the present invention.

With respect to FIG. 34, the program executes the DisplaySequenceControlField( ) routine as denoted by the steps 3400 to 3405. The role of this routine is to format and to display the sequence and the fragment number of the frame. Upon activation at step 3400, the routine proceeds to step 3401 to determine the sequence number. The "Sequence Control" field 40 is 2 octets in length. The sequence number occupies the twelve most significant bits of the "Sequence Control" field 40. The routine first gets the twelve most significant bits of the sequence control field and shifts the result by 4 bits to right. The routine then proceeds to step 3402 to determine the fragment number which resides in the 4 least significant bits of the "Sequence Control" field 40. The routine then proceeds to step 3403 to display the sequence number, and then to step 3404 to display the fragment number. The routine terminates at step 3405. A typical output of the DisplaySequenceControlField( ) routine is shown in FIG. 69 and FIG. 70.

Figure 35:
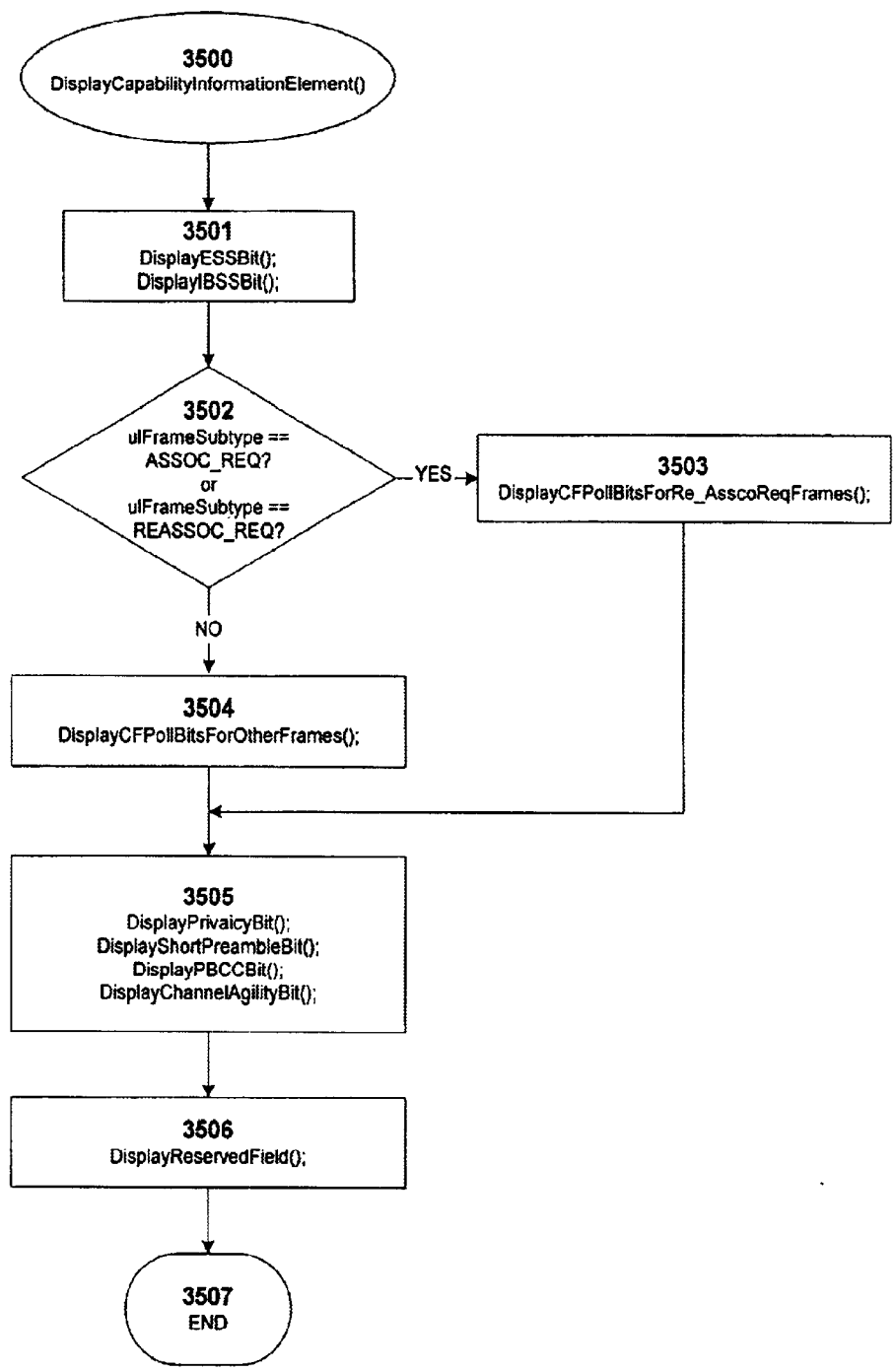
FIG. 35 shows the flowchart of a routine for formatting and displaying in detail the contents of a Capability Information Element associated with the decoding routine of the present invention.

With respect to FIG. 35, the program executes the DisplayCapabilityInformationElement( ) routine as denoted by the steps 3500 to 3507. The role of this routine is to format and to display the capability information field. The capability information element is 2 octetsin length. The structure of the Capability Information element is shown in FIG. 46B. Upon activation at step 3500, the routine proceeds to step 3501 to display the ESS bit field 4604 (bit 0). If it is set to one it means the station is operating in an Extended Service Set. It is set to zero otherwise. The routine displays the content of the IBSS bit field 4606. The IBSS bit is set to 1 if the station is running in an Independent Basic Service Set. It is set to zero otherwise. The routine proceeds to step 3502 to determine if the management frame subtype is either an "Association Request" or "Reassociation Request" frame. If "Yes", the routine proceeds to step 3503 to display the contents of the "CF-Pollable" and "CF Poll Request" bit fields 4608 and 4610, respectively, according to the bit values as shown in Table 5 (see below). If the result of the step 3502 is "No", then the routine proceeds to step 3504 to display the contents of the "CF-Pollable" and "CF Poll Request" bit fields 4608 and 4610 respectively according to the bit values as shown in Table 6 (see below). The routine then proceeds to step 3505 either from step 3503, or from step 3504, to display the contents of the remaining bits. If the "Privacy" bit field 4612 is set to one, the station is using WEP encryption. If the "Short Preamble" bit field 4614 is set to one the station is capable of running short preambles. If the Packet Binary Convolutional Coding (PBCC) is implemented, the "PBCC" bit field 4616 is set to one. It is set to zero otherwise. If the channel agility is in use the "Channel Agility" bit field 4618 is set to one. It is set to zero otherwise. The routine next displays the contents of the bits B8–B15 as reserved at step 3506. The routine terminates at step 3507. A typical output of the DisplayCapabilityInformationElement( ) routine is shown in FIG. 58.

TABLE 5

Station usage of CF-Pollable and CF-Poll Request

| CF-Pollable | CF-Poll Request | Meaning |
|---|---|---|
| 0 | 0 | Station is not CF-Pollable |
| 0 | 1 | Station is CF-Pollable, not requesting to be placed on CF-Polling List |
| 1 | 0 | Station is CF-Pollable, requesting to be placed on CF-Polling List |
| 1 | 1 | Station is CF-Pollable, requesting never to be polled |

TABLE 6

Access Point usage of CF-Pollable and CF-Poll Request

| CF-Pollable | CF-Poll Request | Meaning |
|---|---|---|
| 0 | 0 | No point coordinator at Access Point |
| 0 | 1 | Point coordinator at Access Point for delivery only (no Polling) |
| 1 | 0 | Point coordinator at Access Point for delivery and polling |
| 1 | 1 | Reserved |

Figure 36:
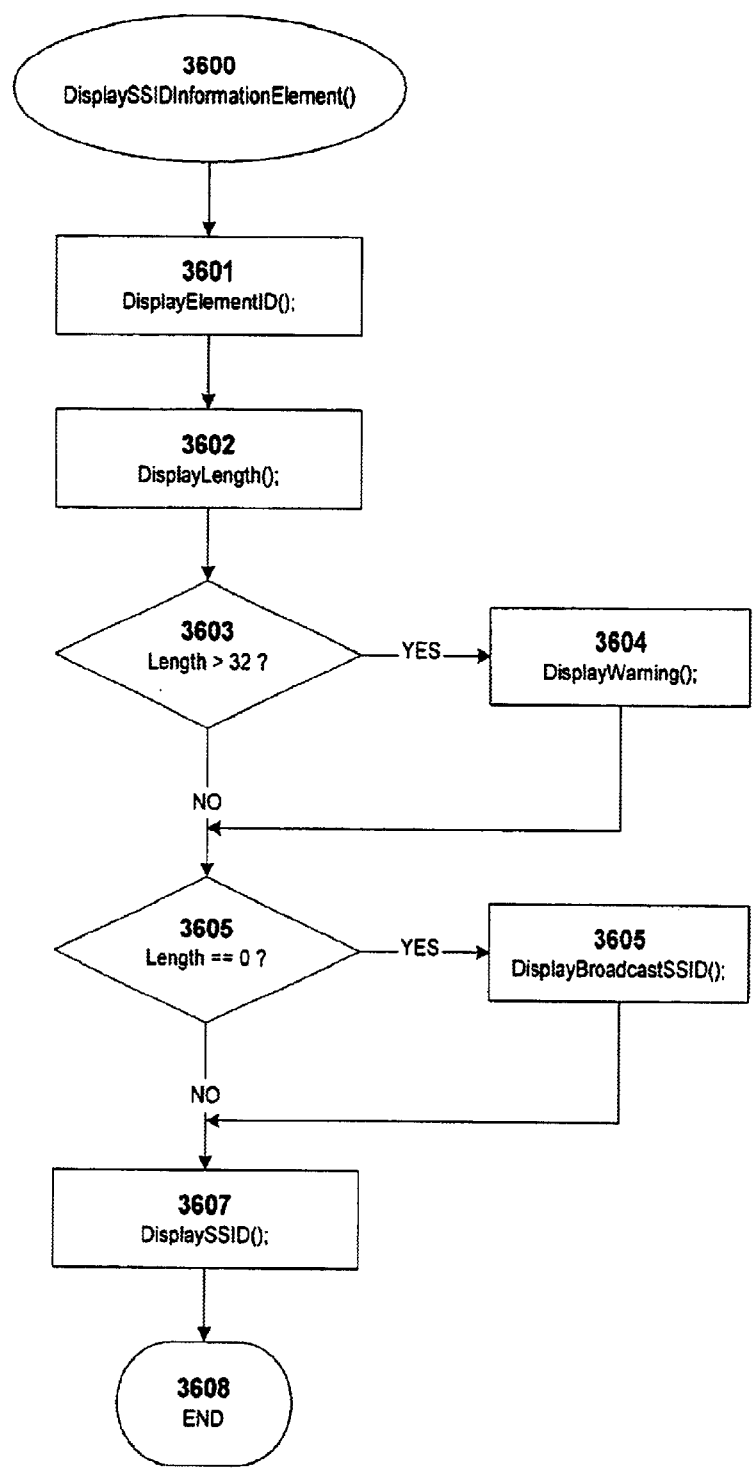
FIG. 36 shows the flowchart of a routine for formatting and displaying in detail the contents of an SSID Information Element associated with the decoding routine of the present invention.

With respect to FIG. 36, the program executes the DisplaySSIDInformationElement( ) routine as denoted by the steps 3600 to 3608. The role of this routine is to format and to display the Service Set Identification (SSID) information field 4628. The structure of the SSID information element is shown in FIG. 46C. Upon activation at step 3600, the routine proceeds to step 3601 to display the information element identification number. The information element ID for the SSID is equal to 0. The routine then proceeds to step 3602 to display the length of the SSID field 4628. The valid length of the SSID field 4628 is 0–32 octets. The routine then proceeds to step 3603 to determine if the length is greater than 32 octets. If "Yes", then the routine proceeds to step 3604 to display a warning message "(should be<=32)" indicating that the length of the SSID field should not be greater than 32 octets. The routine next proceeds to step 3605, either from step 3604 or step 3603, to determine if the length is set to zero octets. If "Yes", then the routine displays via step 3605 a message "Broadcast Service Set Identity". The routine then proceeds to step 3607 to display the contents of the SSID field 4628. The routine terminates at step 3608. A typical output of the DisplaySSIDInformationElement( ) routine is shown in FIG. 58.

Figure 37:
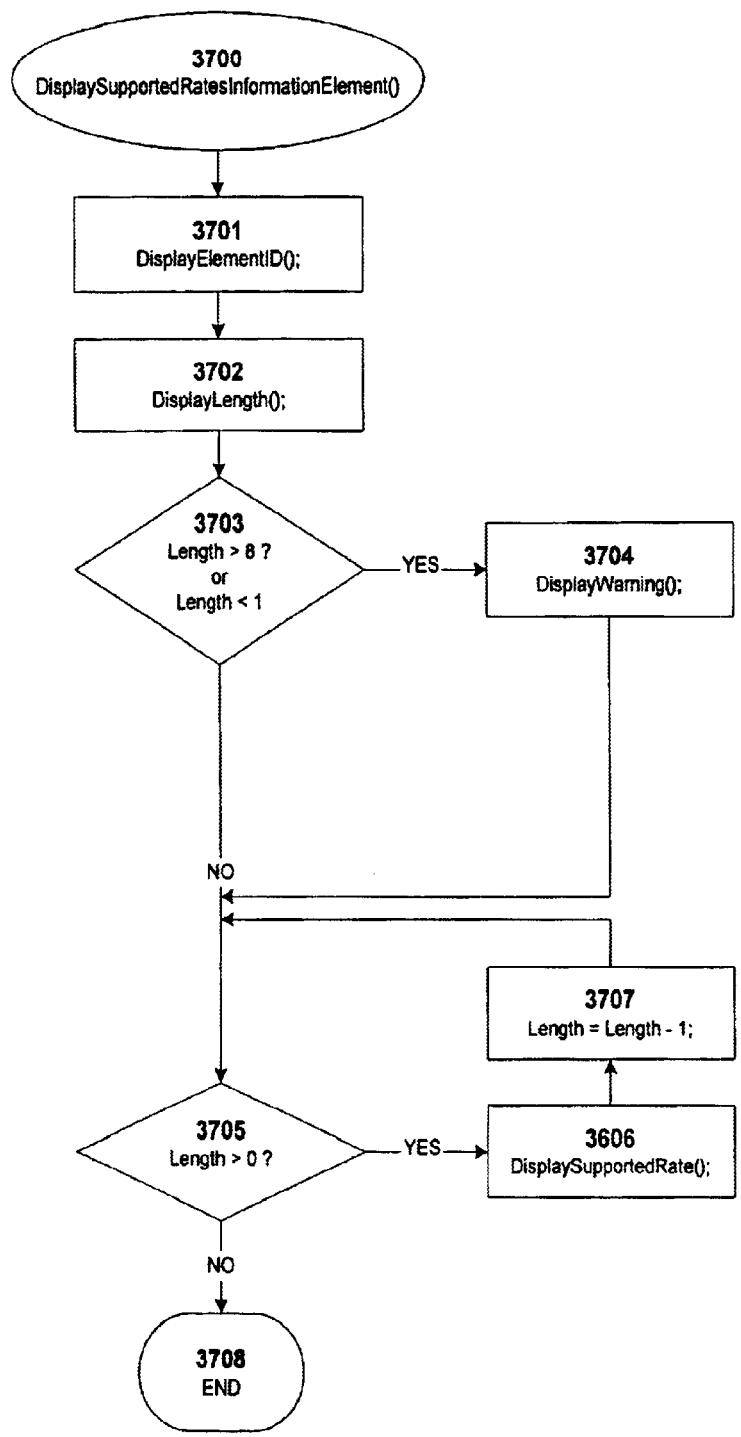
FIG. 37 shows the flowchart of a routine for formatting and displaying in detail the contents of a Supported Rates Information Element associated with the decoding routine of the present invention.

With respect to FIG. 37, the program executes the DisplaySupportedRatesInformationElement( ) routine as denoted by the steps 3700 to 3708. The role of this routine is to format and to display the "Supported Rates" information field 4706. The structure of the Supported Rates information element is shown in FIG. 47A. Upon activation at step 3700, the routine proceeds to step 3701 to display the information element identification number. The information element ID for the Supported Rates is equal to 1. The routine then proceeds to step 3702 to display the length of the Supported Rates field 4706. The valid length of the Supported Rates field 4706 is 1–8 octets. The routine then proceeds to step 3703 to determine if the length is greater than 8 octets or less than 1 octet. If "Yes", then the routine proceeds to step 3704 to display a warning message" (should be 1 to 8 octets)" indicating that the length of the Supported Rates field 4706 should be between 1 to 8 octets. The routine next proceeds to step 3705, either from step 3704 or step 3703 (if "No"), to determine if the length is greater than 0 octets, because each supported rate occupies 1 octet. If "Yes", then the routine proceeds to step 3706 to display the supported rate. If the most significant bit of each supported rate is set to one, the supported rate belongs to the Basic Service Set Basic Rate. The remaining bits describe the supported rate in units of 500 kbit/s. The routine next proceeds to step 3707 where the "Length" variable is decremented by 1. The routine returns to step 3705 to determine if there is any more rates to display. If there is not any more rates at step 3705, the routine terminates at step 3708. A typical output of the DisplaySupportedRatesInformationElement( ) routine is shown in FIG. 58.

Figure 38:
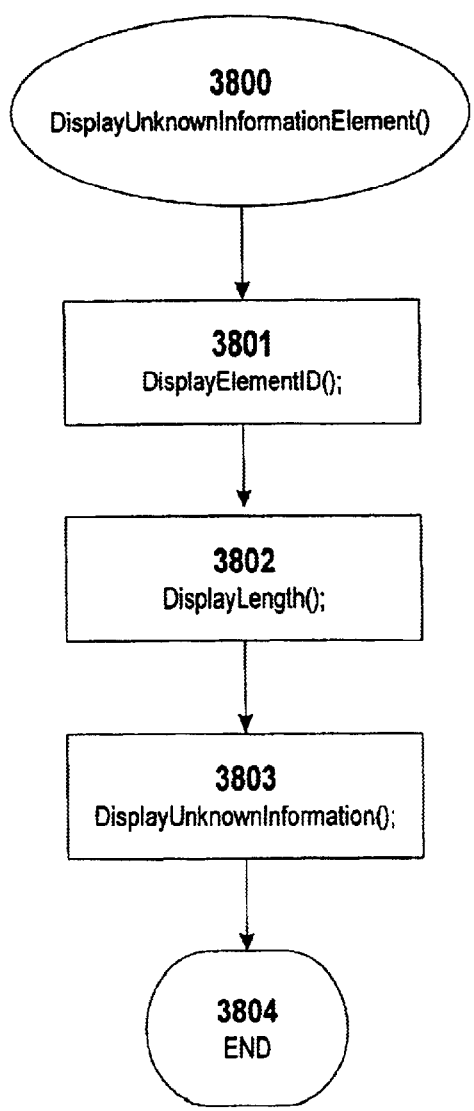
FIG. 38 shows the flowchart of a routine for formatting and displaying in detail the contents of an Unknown Information Element associated with the decoding routine of the present invention.
Figure 71:
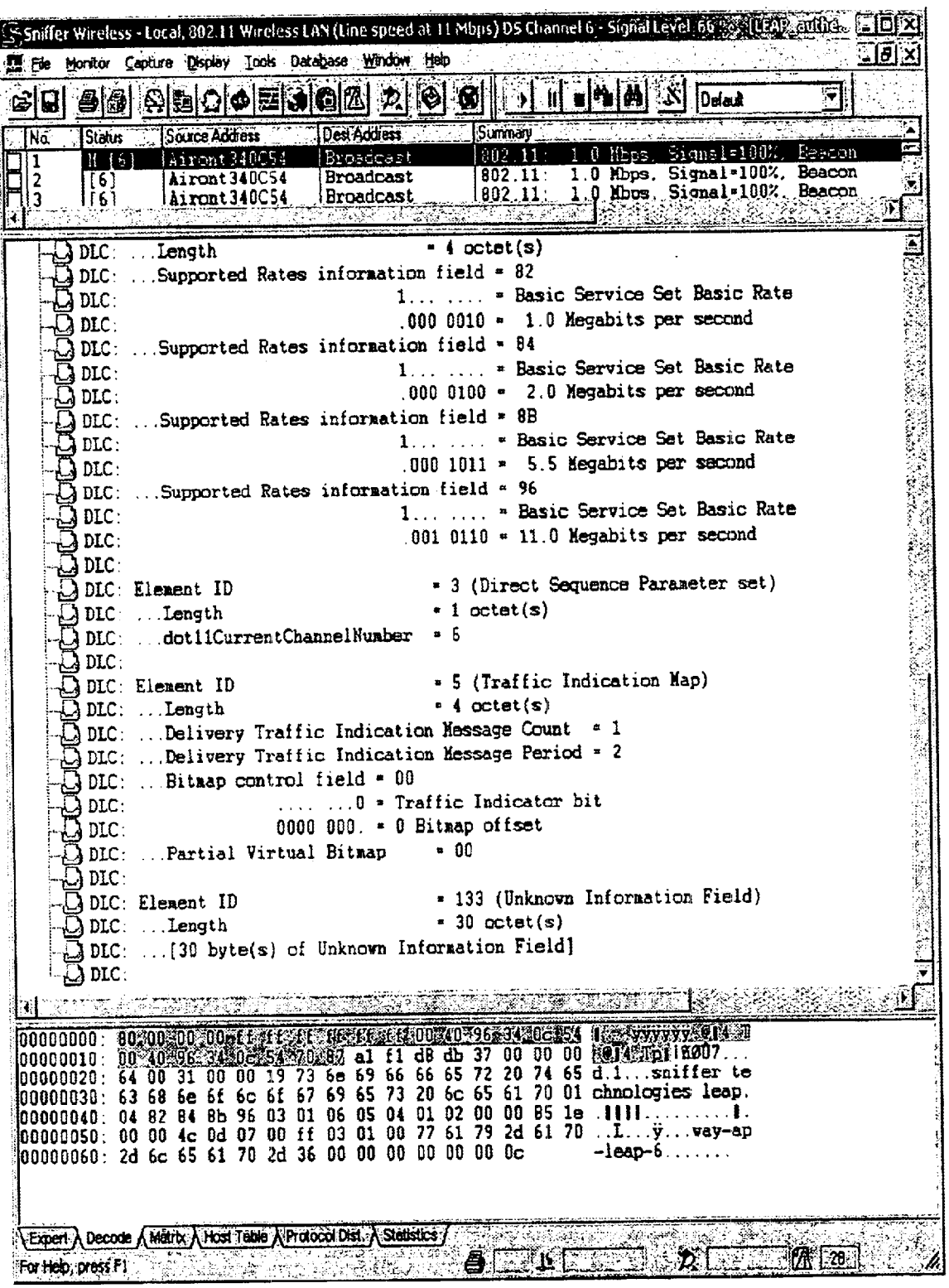

With respect to FIG. 38, the program executes the DisplayUnknownInformationElement( ) routine as denoted by the steps 3800 to 3804. The role of this routine is to format and to display the Unknown information field 4836. The structure of the Unknown information element is shown in FIG. 48D. Upon activation at step 3800, the routine proceeds to step 3801 to display the information element identification number. The information element ID for the Unknown information element is specific to the manufacturer. Manufacturers use the reserved information element ID numbers to implement vendor specific information transfer. The routine then proceeds to step 3802 to display the length of the Unknown information field 4836. The routine then proceeds to step 3803 to display the contents of the Unknown information field 4836. The routine terminates at step 3804. A typical output of the DisplayUnknownInformationElement( ) routine is shown in FIG. 71.

Figure 39:
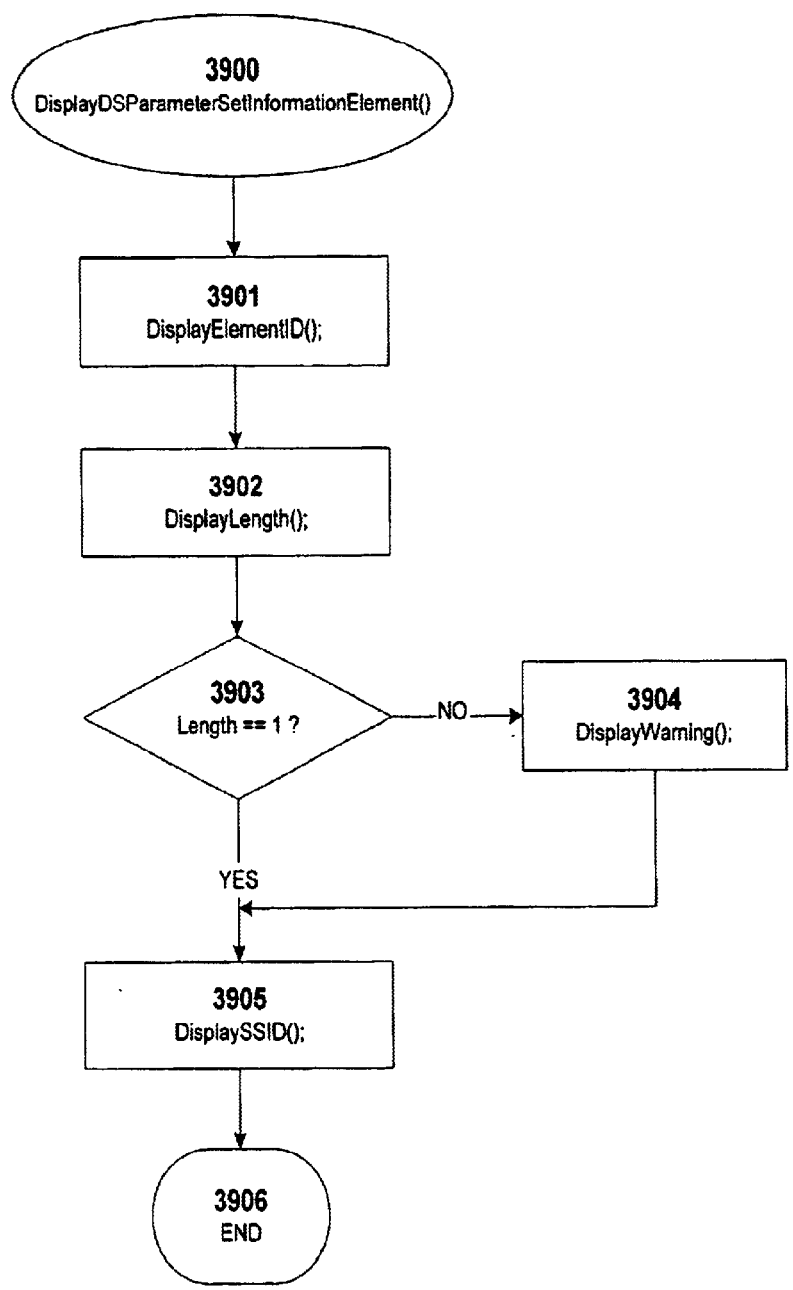
FIG. 39 shows the flowchart of a routine for formatting and displaying in detail the contents of a DS Parameter Set Information Element associated with the decoding routine of the present invention.

With respect to FIG. 39, the program executes the DisplayDSParameterSetInformationElement( ) routine as denoted by the steps 3900 to 3906. The role of this routine is to format and to display the Direct Sequence (DS) Parameter Set information element 4716. The structure of the DS Parameter Set information element is shown in FIG. 47B. The "Current Channel" field 4714 describes the channel being operated by the sending station. Upon activation at step 3900, the routine proceeds to step 3901 to display the information element identification number. The information element ID for the DS Parameter Set information element is equal to 3. The routine then proceeds to step 3902 to display the length of the "Current Channel" field 4714, which is 1 octet long. The routine then proceeds to step 3903 to determine if the length is equal to 1 octet. If "No", then the routine proceeds to step 3904 to display a warning message "(should be 1 octet)" indicating that the length of the "Current Channel" field 4714 should be equal to one octet. The routine from either step 3903 if "Yes," or from step 3904, proceeds to step 3905 to display the contents of the "Current Channel" field 4714. The routine terminates at step 3906. A typical output of the DisplayDSParameterSetInformationElement( ) routine is shown in FIG. 71.

Figure 40:
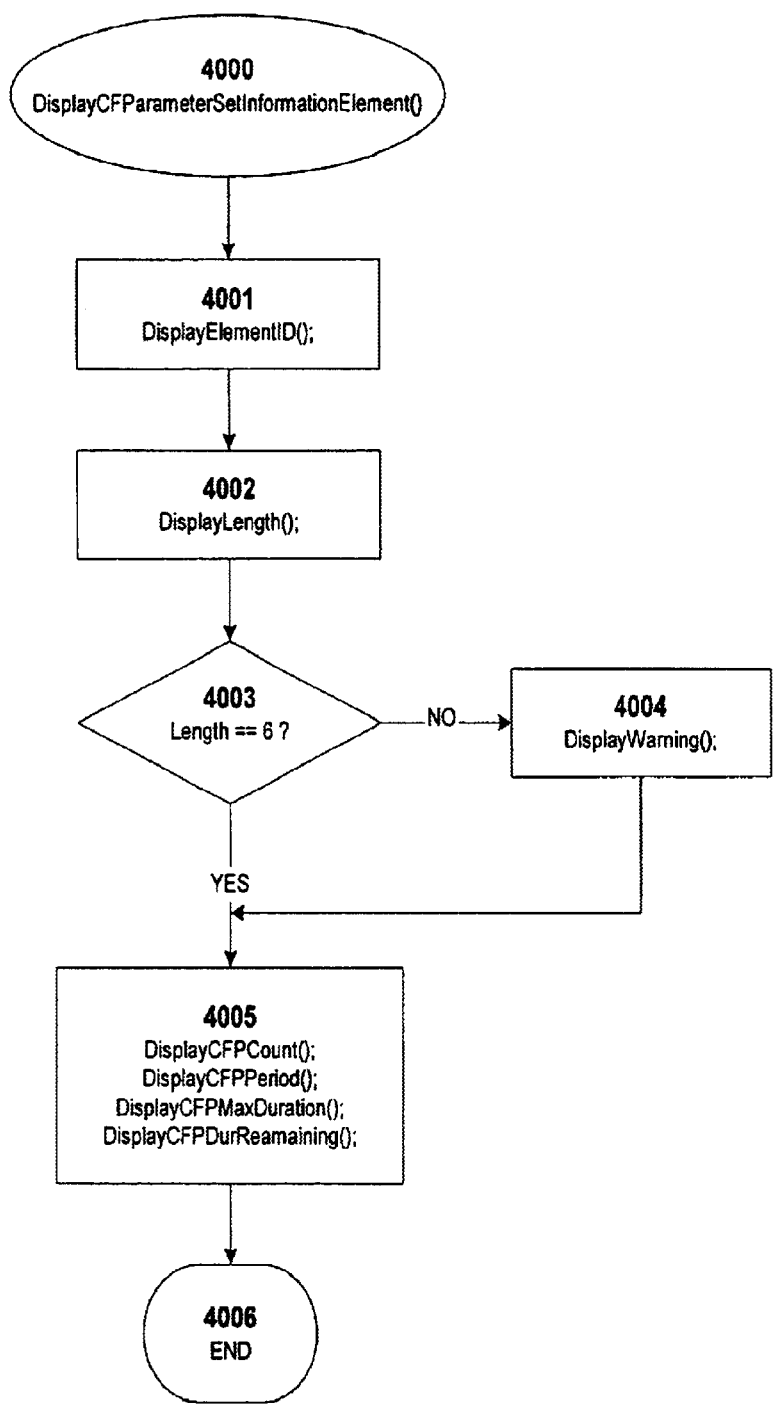
FIG. 40 shows the flowchart of a routine for formatting and displaying in detail the contents of a CF Parameter Set Information Element associated with the decoding routine of the present invention.
Figure 72:
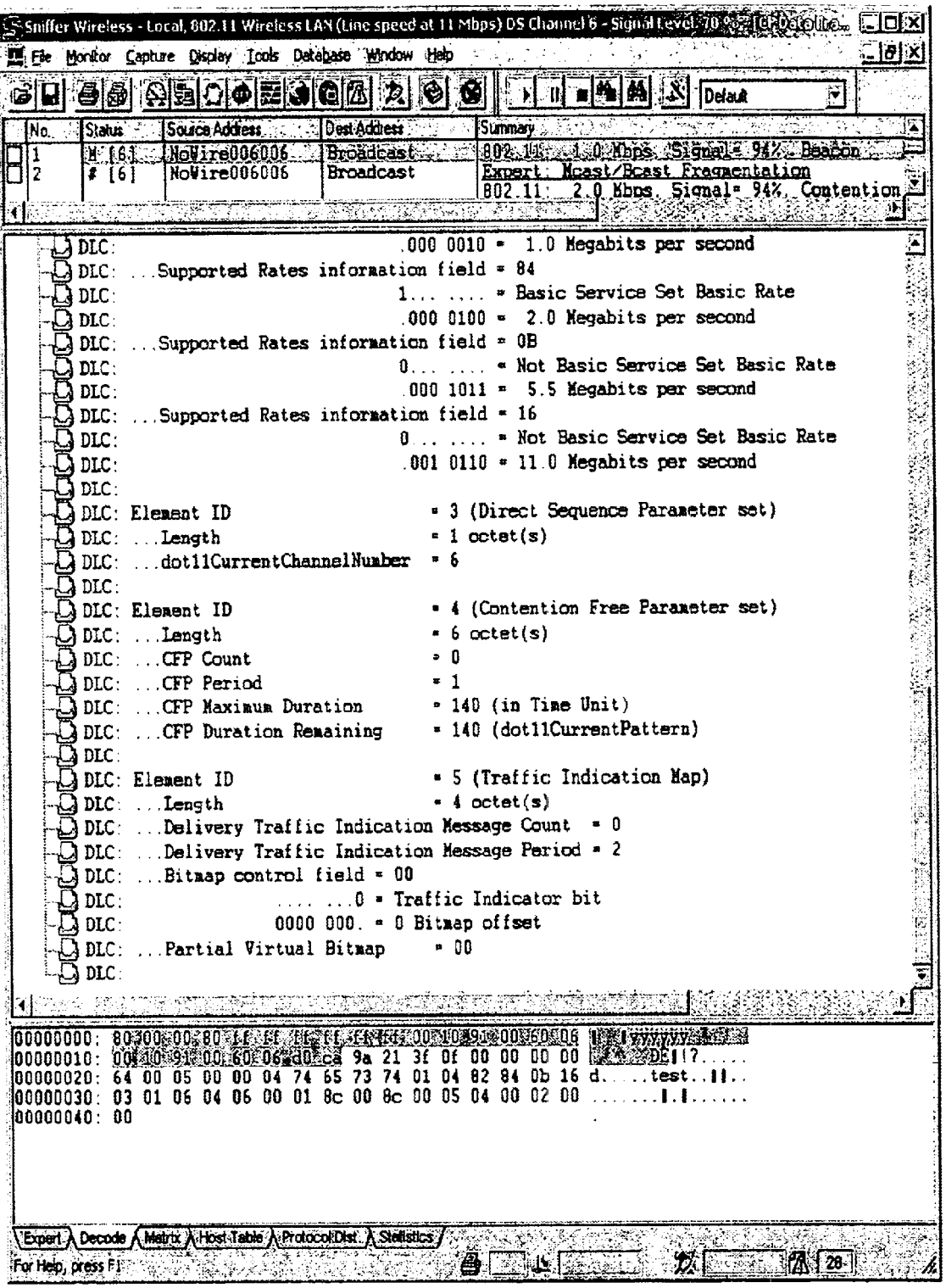

With respect to FIG. 40, the program executes the DisplayCFParameterSetInformationElement( ) routine as denoted by the steps 4000 to 4006. The role of this routine is to format and to display Contention Free (CF) Parameter Set Information element 4730. The structure of the CF Parameter Set information element is shown in FIG. 47C. Upon activation at step 4000, the routine proceeds to step 4001 to display the information element identification number. The information element ID for the CF Parameter Set information element is equal to 4. The routine then proceeds to step 4002 to display the length of the information field, which is 6 octets long. The routine then proceeds to step 4003 to determine if the length is equal to 6 octets. If "No", then the routine proceeds to step 4004 to display a warning message "(should be 6 octets)". The routine then proceeds to step 4005 from either step 4004, or from step 4003 if "Yes," to display the contents of the information field. The information field contains the CFP Count field 4722, CFP Period field 4724, CFP Maximum Duration field 4726, and CFP duration remaining field 4728. The routine first displays the CFP Count field 4722. This field contains an unsigned number 1 octet long. The routine than displays the CFP Period field 4724 that is an unsigned number of 1 octet length. The routine displays the CFP Maximum Duration field 4726, which is an unsigned integer that is 2 octetslong. The routine then displays the CFP Duration Remaining field 4728. This field is an unsigned integer that is 2 octetslong. The numbers described by the CFP Maximum Duration and CFPO Duration Remaining fields 4726 and 4728 respectively are expressed in terms of time units. The routine terminates at step 4006. A typical output of the DisplayCFParameterSetInformationElement( ) routine is shown in FIG. 72.

Figure 41:
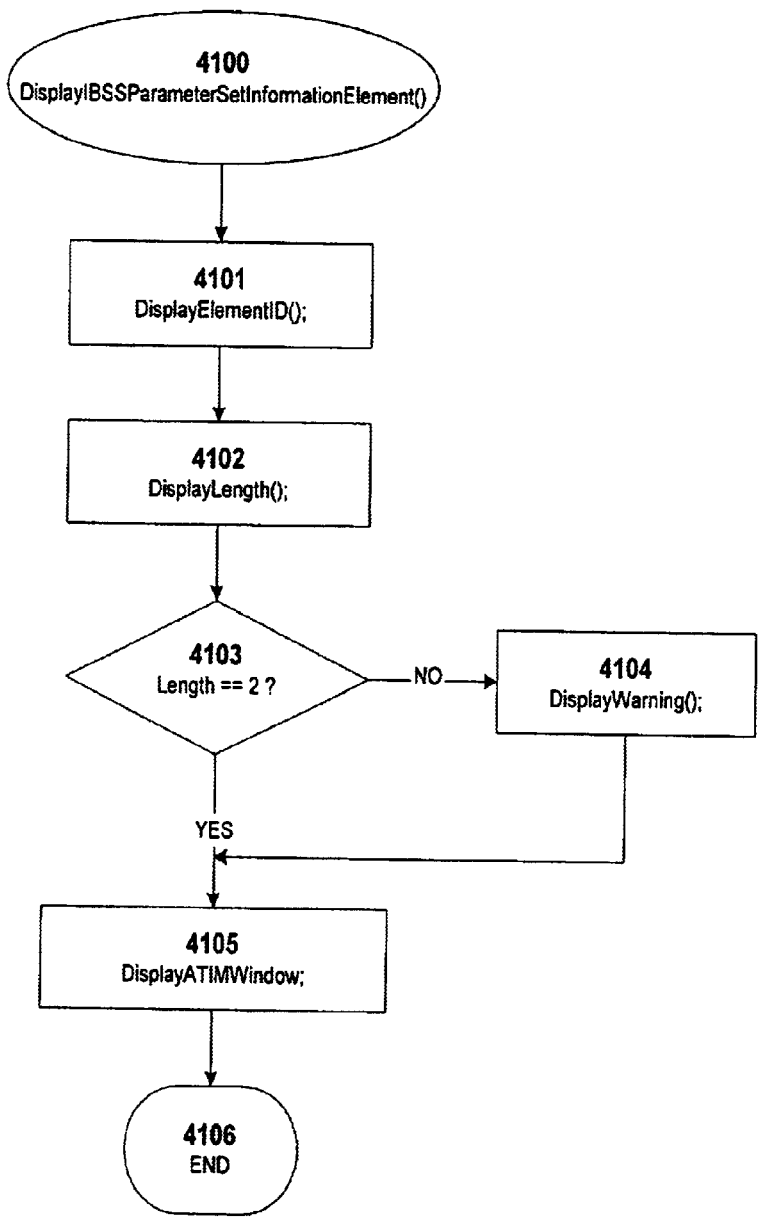
FIG. 41 shows the flowchart of a routine for formatting and displaying in detail the contents of aft IBSS Parameter Set Information Element associated with the decoding routine of the present invention.

With respect to FIG. 41, the program executes the DisplayIBSSParameterSetInformationElement( ) routine as denoted by the steps 4100 to 4106. The role of this routine is to format and to display the Independed Basic Service Set (IBSS) information element 4822. The structure of the IBSS information element is shown in FIG. 48B. The "Announcement Traffic Indication Message (ATIM) Window" field 4820 describes the ATIM window length in time units (TU). Upon activation at step 4100, the routine proceeds to step 4101 to display the information element identification number. The information element ID for the IBSS information element is equal to 6. The routine then proceeds to step 4102 to display the length of the "ATIM Window" field 4820, which is 2 octets long. The routine then proceeds to step 4103 to determine if the length is equal to 2 octets. If "No", then the routine proceeds to step 4104 to display a warning message "(should be 2 octets)". The routine then proceeds to step 4105 either from step 4104, or from step 4103 if "Yes," to display the contents of the "ATIM Window" field 4820. The routine terminates at step 4106. A typical output of the DisplayIBSSParameterSetInformationElement( ) routine is shown in FIG. 57.

Figure 42:
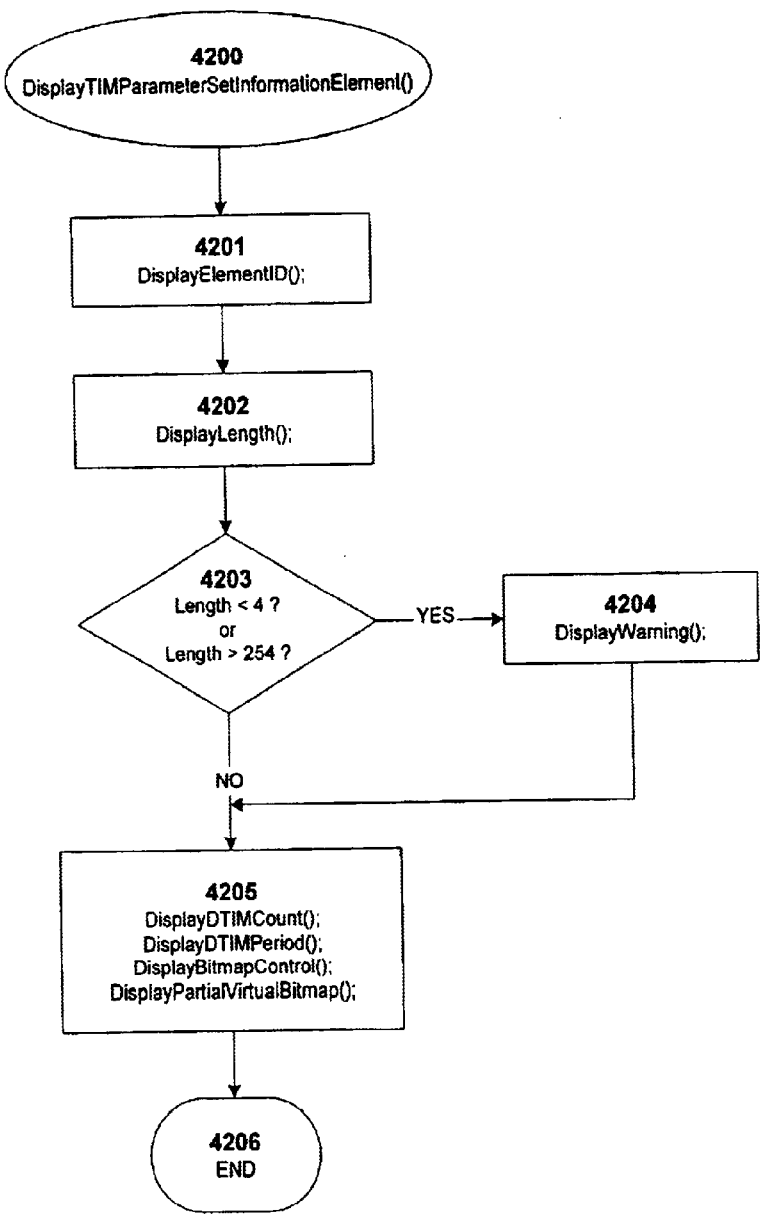
FIG. 42 shows the flowchart of a routine for formatting and displaying in detail the contents of a TIM Parameter Set Information Element associated with the decoding routine of the present invention.

With respect to FIG. 42, the program executes the DisplayTIMParameterSetInformationElement( ) routine as denoted by the steps 4200 to 4206. The role of this routine is to format and to display the Traffic Indication Message (TIM) information element 4814. The structure of the TIM information element is shown in FIG. 48A. Upon activation at step 4200, the routine proceeds to step 4201 to display the information element identification number. The information element ID for the TIM information element is equal to 5. The routine then proceeds to step 4202 to display the length of the information field, which is between 4 and 254 octets long. The routine then proceeds to step 4203 to determine if the length is less than 4 or greater than 254 octets. If "Yes", then the routine proceeds to step 4204 to display a warning message "(should be 4 to 254 octets)". The routine then proceeds from either step 4204, or from step 4203 if "No,"

from either step 4204, or from step 4203 if "No," to step 4205 to display the contents of the information element. The information element contains the Delivery Traffic Indication Message (DTIM) Count field 4806, DTIM Period field 4808, Bitmap Control field 4810, and Partial Virtual Bitmap field 4812. The routine first displays the DTIM Count field 4806. This field is 1 octet long, and it contains an unsigned number. The routine next displays the DTIM Period field 4808. The DTIM Period field 4808 is 1 octet long, and also contains an unsigned number. The Bitmap Control field 4810 is a single octet. The least significant bit (bit 0) of this field contains the Traffic Indicator bit associated with Association ID 0. This bit is set to 1 whenever there is Multicast or Broadcast frames buffered at the Access Point. The remaining bits of the Bitmap Control field 4810 describes the bitmap offset of the Partial Virtual Bitmap field 4812. The routine then displays the contents of the Partial Virtual Bitmap field 4812. The routine terminates at step 4206. A typical output of the DisplayTIMParameterSetInformationElement( ) routine is shown in FIG. 71.

Figure 43:
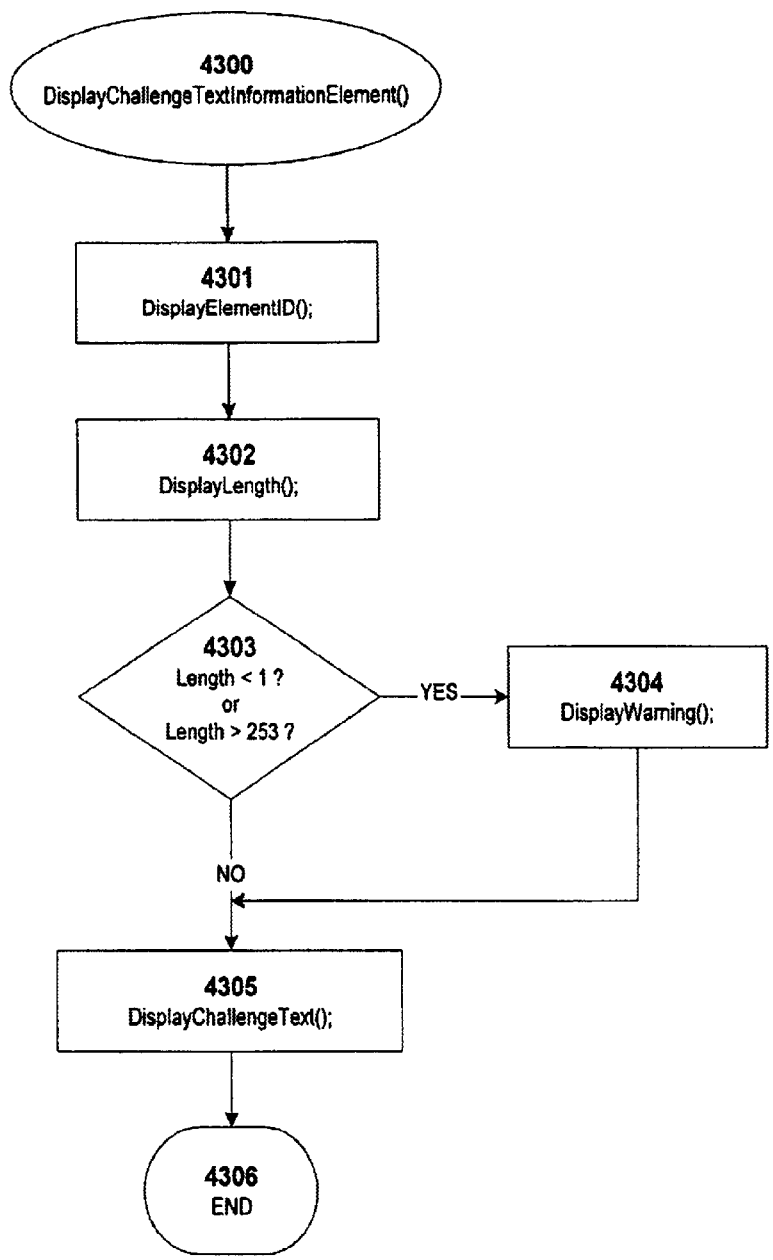
FIG. 43 shows the flowchart of a routine for formatting and displaying in detail the contents of a Challenge Text Information Element associated with the decoding routine of the present invention.
Figure 73:
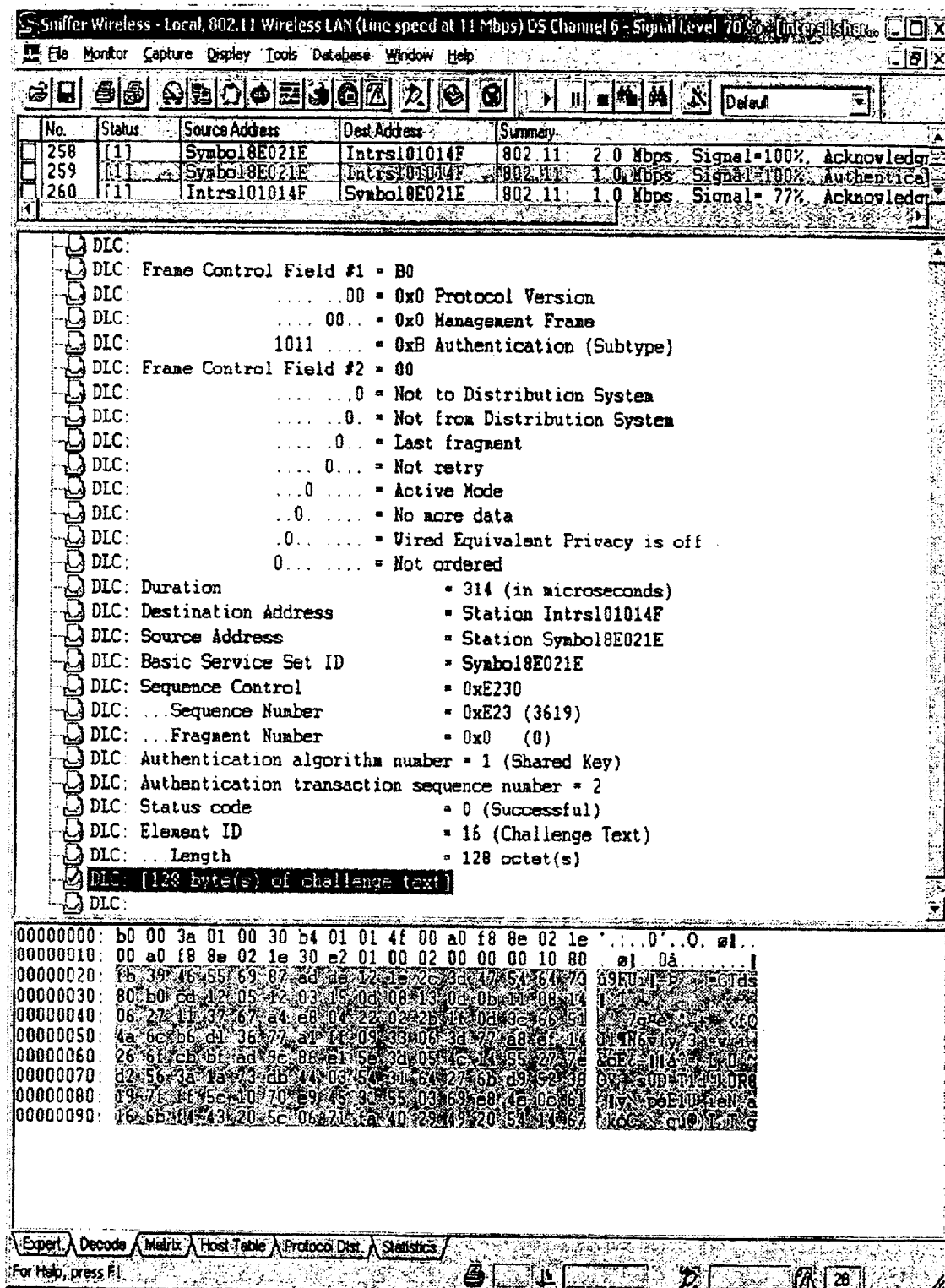

With respect to FIG. 43, the program executes the DisplayChallengeTextInformationElement( ) routine as denoted by the steps 4300 to 4306. The role of this routine is to format and to display "Challenge Text" information element 4830. The structure of the "Challenge Text" information element is shown in FIG. 48C. The "Challenge Text" field 4828 contains random information that is sent from the responding station to the requesting station in authentication frame exchange sequence. The requesting station then encrypts the next authentication frame and sends it back. The responding station decrypts the contents of the authentication frame body and compares it with the random information it has sent. If they are the same then the requesting station is authenticated. Upon activation at step 4300, the routine proceeds to step 4301 to display the information element identification number. The information element ID for the Challenge Text information element is equal to 16. The routine then proceeds to step 4302 to display the length of the "Challenge Text" field 4828, which is between 1 to 253 octets long. The routine then proceeds to step 4303 to determine if the length is less than 1 octet or greater than 253 octets. If "Yes", then the routine proceeds to step 4304 to display a warning message "(should be 1–253 octets)". The routine then proceeds either from step 4304, or from step 4303 if "No," to step 4305 to display the contents of the "Challenge Text" field 4828. The routine terminates at step 4306. A typical output of the DisplayChallengeTextInformationElement( ) routine is shown in FIG. 73. Note that as previously mentioned, FIGS. 49 through 73 show display screens for various embodiments of the invention, respectively.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A method for decoding information contained in an IEEE 802.11 header of data packets or frames transmitted between stations in a wireless Local Area Network (LAN), said method comprising:

establishing a direct wireless logical connection with the wireless communications network;

receiving wirelessly, in real-time, data packets or frames transmitted in the wireless communication network;

storing in a memory storage device, the data packets or frames captured; and decoding and displaying the information contained in the respective IEEE 802.11 headers of the data packets or frames;

wherein said decoding and displaying includes:

displaying a menu to a user to permit the user to select a captured file containing frames or data packets; and analyzing in detail each bit of the IEEE 802.11 header of each frame of the captured file in the order they are stored in a capture buffer memory;

wherein said analyzing further includes:

determining parameters necessary to decode the associated IEEE 802.11 header of a current frame being analyzed;

determining if the current frame is a portion of a larger fragmented frame;

reassembling the current frame if it is determined it is a portion of a larger fragmented frame;

determining the source and destination addresses of the current frame;

displaying the source and destination addresses of the current frame;

executing a summary routine for determining short concise summary information relative to the current frame;

displaying said summary information about the contents of the current frame;

decoding individually for each layer the information contained in the current frame; and displaying the decoded information.

2. The method of claim 1, wherein said decoding step further includes the steps of:

determining the parameters required to decode the information in the current frame;

determining the frame type and subtype of the current frame;

storing in memory the frame type and subtype of the current frame; and displaying the frame type and subtype.

3. The method of claim 2, wherein said step of determining the frame type and subtype of the current frame, further includes the steps of:

determining if the current frame is a "Management frame";

determining, if not a management frame, if the current frame is a "Control" frame;

determining, if not a Control frame, if the current frame subtype is either an "Acknowledgment (ACK)" or "Clear to Send (CTS)" frame;

determining, if not an ACK or CTS frame, if the current frame is a "Data" frame;

determining, when the frame is a "Data" frame, if both ToDS and FromDS fields are set to one; and setting the value of a variable "ulHeader Length" to a value indicative of the determined frame type and subtype of the current frame.

4. The method of claim 1, wherein said steps of reassembling the current frame, further includes for determining the parameters required to reassemble a fragmented frame, the steps of:

determining whether the current frame is one of a "Control" frame or a frame with an error, or an encrypted frame, and if "Yes", disable its reassembly;

determining, if "No" in the previous step, if the current frame is originally decrypted, and if so increase its length by 4 octets, but if not, set a data offset to the length of a MAC header, and the current frame's length to u ulFragmentLength;

determining if "More Flag" field of the current frame is set to one, said step further including if "Yes" determining if the fragment of the current frame is zero, and if "Yes," set the fragment type to "First Fragment", set a data effort to zero, and enable reassembly, whereas if the fragment is not zero, set the fragment type to "Middle Fragment", reduce the fragment length of the current frame by the data offset, and enable reassembly;

detennining, in response to the "More Flag" being set to zero, if the fragment number is zero, said step further including if "Yes" disabling reassembly of the current frame, whereas if "No," set the fragment type to "Last Fragment," reduce the fragment length by the data offset, and enable reassembly; and determining if the current frame is a decrypted frame, if "Yes," increase the fragment length by 4 octets.

5. The method of claim 1, wherein said step of determining the source and destination addresses of the current frame includes the steps of:

determining if the current frame type is a "Control" frame;

determining, if "Yes" in the immediately previous step, if the current frame subtype is either an "Acknowledgment (ACK)" or "Clear To Send (CTS)" frame, and if "Yes" set a variable "DestAddr" to the contents of an "Address 1" field, followed by determining if a transmitter address is known, if so, set the contents of an "Implied Transmitter Address" variable to the address of a transmitting station;

determining, in response to the current frame type not being a "Control" frame, if the frame type is a "Management" frame, and if "Yes," set "DestAddr" and "SrcAddr" variables to the contents of "Address 1" and "Address2" fields, respectively;

determining, in response to the current frame type not being a "Management" frame, whether the current frame type is a "Data" frame; and determining, in response to the current frame being a "Data" frame, if a "ToDS" bit field is set to zero, and if "Yes," set a "DestAddr" variable to the contents of an "Address 1" field, followed by the steps of determining if a "FromDS" bit field is set to zero, and if "Yes", set a variable "SrcAddr" to the contents of an "Address2" field, whereas if "No", set the variable "SrcAddr" to the contents of an "Address3", whereas if the "ToDS: bit field is not set to zero, set the variable "DestAddr" to the contents of the "Address3" field 36, followed by determining if "FromDS" bit field is now set to zero, and if "Yes", set the variable "SrcAddr" to the contents of the "Address2" field, whereas if the "FromDS" bit field is not set to zero, set the variable "SrcAddr" to the contents of an "Address4" field.

6. The method of claim 2, wherein said summary routine includes the steps of:

initializing a string to be used in a summary line for display;

formatting a data rate and signal strength level provided by a Network QuInterface Card (NIC);

using a bit value indicative of the subtype of the current frame, as obtained from said step for determining the subtype, to format the name of the frame subtype from a table established to correlate bit values to frame subtype-names, respectively;

determining if a wired equivalent privacy (WEP) bit field is set to one, and if "Yes," add a WEP string to said summary line; and determining if a "Retry" bit field is set to one, and if "Yes," add a "Retry" string to said summary line.

7. The method of claim 2, wherein said step of decoding further includes the step of:

determining if the frame type is a "Management Frame";

executing a FormatManagementDetail( ) subroutine in response to determining a "Management" frame;

determining if the frame type is a "Control" frame, in response to it not being a "Management" frame;

executing a FormatControlDetail( ) subroutine, in response to the frame being a "Control" frame;

determining, in response to the frame not being a "Control" frame, if it is a "Data" frame; and executing a FormatControlDetail( ) subroutine in response to the frame being a "Data" frame.

8. The method of claim 7, wherein said FormatManagementDetail( ) subroutine includes the steps of:

determining via a Network Interface Card (NIC) physical layer related information;

executing a DisplayPhysicalLayerInformation( ) routine to display said physical layer related information;

executing a DisplayFrameControlField( ) routine;

displaying the contents of a duration field as a little-endian unsigned integer of two octets in lengths;

executing a DisplayDestinationAddress( ) routine to display a destination address;

executing a DisplaySourceAddress( ) routine to display a source address;

executing a DisplayBSSID( ) routine to display Basic Service Set Identification information;

executing a DisplaySequenceControlField( ) routine to display fragment and sequence numbers for the current frame; and executing a FormatManagementFrameSubtype( ) to a decode and display information contained in a frame body section specific to management frame subtypes.

9. The method of claim 8, wherein said FormatManagementFrameSubtype( ) includes the steps of:

determining if the frame subtype is an "Association Request" frame;

executing, in response to the frame being an "Association Request, a DisplayAssociationRequestFrameDetail( ) for displaying the frame details;

determining, in response to "No" for the immediately precoding determining step, if the frame subtype is a Reassociation Request" frame;

if "Yes", execute a DisplayReassociationRequestFrameDetail( ) routine;

if "No", determine if the frame subtype is either an "Association Response" or "Reassociation Response" frame;

if "Yes", execute a DisplayReassociationResponseFrameDetail( );

if "No", determine if the frame subtype is a "Probe Request" frame;

if "Yes", execute a DiplayProbeRequestFrameDetail( ) routine;

if "No", determine if the frame subtype is a "Probe Response" frame;

if "Yes", execute a DisplayProbeResponseFrameDetail( ) routine;

if the frame subtype is not a "Probe Response," determine if the frame subtype is a "Beacon" frame;

if "Yes", execute a DisplayBeaconFrameDetail( ) routine;

if "No", determine if the frame subtype is a "Disassociation" frame;

if "Yes", execute a DisplayDisassociationFrameDetail( ) routine;

if "No", determine if the frame subtype is an "Authentication" frame;

if "Yes", execute a DisplayAuthenticationFrameDetail( ) routine;

if "No", determine if the frame type is a "Deauthentication" frame; and if "Yes", execute a DisplayDeauthenticationFrameDetail( ) routine.

10. The method of claim 9, wherein said DisplayAssociationRequestFrameDetail( ) routine includes the steps of:

display the contents of a "Listen Interval" field 4408, to indicate to a current Access Point how often a station wakes to listen to Beacon management frames;

display a MAC address of the current Access Point;

display a current AP address field 4508 by executing a DisplaySourceAddress( ) routine;

execute a DisplaySSIDInformationElement( ) routine;

execute a DisplaySupportedRatesInformationElemnent( ) routine;

determine if there is an unknown information element at the end of the frame; and if "Yes", execute a DisplayUnknownInformationElement( ) routine.

11. The method of claim 9, wherein said DisplayRe__associationResponseFrameDetail( ) routine includes the steps of:

execute a DisplayCapabilityInformationElement( ) routine;

display the contents of a "Status Code" field 4506 obtained from a table of code values;

display the contents of an "Association ID" field 4504 as an unsigned integer;

set the two most significant bits of an association ID field 4504 to ones;

execute a DisplaySupportedRatesInformationelement( ) routine;

determine if there is an unknown information element at the end of the current frame; and if "Yes", execute a DisplayUnknownInformationElement( ) routine.

12. The method of claim 9, wherein said DisplayProbeRequestFrameDetail( ) routine includes the steps of:

execute a DisplaySSIDInformationElement( ) routine;

execute a DisplaySupportedRatesInformationElement( ) routine;

determine if there is an unknown information element at the end of the current frame; and if "Yes", execute a DisplayUnknownInformationElement( ) routine.

13. The method of claim 9, wherein said DisplayProbeResponseFrameDetail( ) routine includes the steps of:

display a "Time stamp field 4602 as an unsigned little endian integer;

display a "Beacon Interval" field 4406 representing the number of time units between target beacon transmission times;

execute a DisplayCapabilityInformationElement( ) routine;

execute a DisplaySSIDInformationElement( ) routine;

execute a DisplaySupportedRatesInformationElement( ) routine;

execute a DisplayDSParameterSetInformationElement( ) routine;

determine if the frame contains a "CF Parameter Set" information element as transmitted by Access Points supporting a Point Coordination Function, and if so execute a DisplayCFParameterSetInformationElement( ) routine;

determine if a sending station is operating in an Independent Basic Service Set, and if so execute a DisplayIBSSParameterSetInformationElement( ) routine;

determine if there is an unknown information element at the end of the frame; and if "Yes", execute a DisplayUnknosvnInformationElement( ) routine.

14. The method of claim 9, wherein said DisplayBeaconFrameDetail( ) routine includes the steps:

display a "Timestamp" field 4602;

display a "Beacon Interval" field 4406 representing the number of time units between target beacon transmission times;

executing a DisplayCapabilityInformationelement( ) routine;

execute a DisplaySSIDInformationElement( ) routine;

execute a DisplaySupportedRatesInformationElement( ) routine;

execute a DisplayDSParameterSetInformationElement( ) routine; determine if the frame contains a "CF Parameter Set" information element as transmitted by Access Points supporting a Point Coordination Function, and if so, execute a DisplayCFParameterSetInformationElement( ) routine;

determine if an associated sending station is operating in an Independent Basic Service Set, and if so, execute a DisplayIBSSParameterSetInformationElement( ) routine;

execute a DisplayTIMParameterSetInformationElement( ) routine;

determine if there is an unknown information element at the end of the frame, and if "Yes", execute a DisplayUnknownInformationElement( ) routine.

15. The method of claim 9, wherein said DisplayDisassociationFrameDetail( ) includes the steps:

display the contents of a "Reason Code" field 4502;

display a message corresponding to a "Reason Code" field 4502; and determine if there is an unknown information element at the end of the frame, and if "Yes," execute a DisplayUnknownInformationElement( ).

16. The method of claim 9, wherein said DisplayAuthenticationFrameDetail( ) routine includes the steps of:

determine if a "WEP" bit field is set to one, and if "Yes", the frame is originally encrypted;

display, if "Yes," the contents of a WEP-IV field;
determine if the frame is decrypted, and if "No," display the contents of the encrypted data;
display the contents of a WEP-ICV field that carries an "Integrity Check Value" of encrypted data;
if the frame is not originally encrypted or the frame is decrypted, display the contents of an "Authentication Algorithm Number" field that is an unsigned number for which allowed values are 0, which corresponds to Open System Authentication, and 1, which corresponds to Shared Key Authentication;
display the contents of an "Authentication Transaction Sequence Number" field that is an unsigned number used to identify the frame number used in an authentication exchange sequence;
display the contents of a "Status Code" field 4506;
determine whether the "Authentication Algorithm Number" is equal to 1 (Shared Key), and a transaction sequence number is either 2 or 3, and if "Yes" execute a DisplayChallengeTextInformationElement( ) routine;
determine if there is an unknown information element at the end of the frame, and if "Yes", execute a DisplayUnknownInformationElement( ) routine; and
determine if the frame is a decrypted frame, and if "Yes", display the contents of a WEP-ICV field.

17. The method of claim 9, wherein said DisplayAuthorizationFrameDetail( ) routine is for decoding and displaying information contained in a frame body field of a "Deauthentication" management frame subtype, includes the steps:
display the contents of a "Reason Code" field 4502 that is an unsigned number;
display a message corresponding to the "Reason Code" field 4502; and
determine if there is an unknown information element at the end of the frame, and if "Yes," execute a DisplayUnknownInformationElement( ) routine.

18. The method of claim 7, wherein said FormatCTRLDetail( ) routine for decoding and displaying information contained in a "Control" frame type includes the steps:
execute a DisplayPhysicalLayerInformation( ) routine to display physical layer related information determined by a Network Interface Card (NIC);
execute a DisplayFrameControlField( ) routine;
determine if the frame subtype is a "Power Save (PS)-Poll" frame, and if "Yes" execute a FormatPS_POLLDetail( ) routine;
determine, if "No" in the immediately previous step, whether the frame subtype is a "Request To Send" (RTS) frame, execute a FormatRTSDetail( ), if "Yes" in the immediately previous step;
if the result of the immediately previous "determine" step is "No", determine if the frame subtype is not RTS, whether the frame subtype is either a "Clear To Send (CTS)" or an "Acknowledgment (ACK) frame, and if "Yes", execute a FormatCTS_ACKDetail( ); and
if the frame subtype is not CTS or ACK, determine whether the frame subtype is either a "Contention Free (CF)-End" or a "CF-End+CF-Ack" frame, and if "Yes", execute a FormatCF_END_ACKDetail( ) routine.

19. The method of claim 18, wherein said FormatPS_POLLDetail( ) routine for decoding and displaying information container in said Power Save (PS)-Poll frame, includes the steps:
determine if the two most significant bits of an "Association ID" field are not set to one, because the IEEE 802.11 standard requires these bits to be set to one, and if "Yes", display a warning message "2 MSB bits of Association ID field should be 1";
if "No" for the previous step, check if a little-endian number in the "Association ID" field is between 1 and 2007, and if "Yes", display the contents of the "Association ID field" as an uasigned integer;
if the result of the immediately previous step is "No", display a warning message "Association ID should be in range 1 to 2007";
execute a DisplayBSS( ) routine; and
execute a DisplayTransmitterAddress( ) routine.

20. The method of claim 18, wherein said FormatRTSDetail( ) routine for decoding and displaying information contained in said RTS frame, includes the steps:
display the contents of a duration field as a little-endian unsigned integer;
execute a DisplayReceiverAddrcss( ) routine; and
execute a DisplayTransmitterAddress( ) routine.

21. The method of claim 18, wherein said FormatCTS_ACKDetail( ) routine for decoding and displaying information contained in said CTS and ACK frames, includes the steps:
display the contents of a duration field as a little-endian unsigned integer;
execute a DisplayReceiverAddress( ) routine;
determine if a transmitter address is known; and
if the transmitter address is known, execute a DisplayTransmitterAddress( ) routine.

* * * * *